United States Patent
Tomotake et al.

(10) Patent No.: US 7,328,992 B2
(45) Date of Patent: *Feb. 12, 2008

(54) INKJET RECORDING METHOD AND INKJET RECORDING APPARATUS

(75) Inventors: Atsushi Tomotake, Hino (JP); Takahiro Matsuzawa, Hachioji (JP); Kenzo Nakazawa, Sakai (JP); Miyako Sugihara, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 254 days.

This patent is subject to a terminal disclaimer.

(21) Appl. No.: 11/006,097

(22) Filed: Dec. 6, 2004

(65) Prior Publication Data

US 2005/0195256 A1 Sep. 8, 2005

(30) Foreign Application Priority Data

Mar. 2, 2004 (JP) ............................. 2004-057315
Sep. 13, 2004 (JP) ............................. 2004-264776

(51) Int. Cl.
*G01D 11/00* (2006.01)

(52) U.S. Cl. .................... 347/100; 347/95; 347/101; 106/31.6; 523/160

(58) Field of Classification Search ................ 347/100, 347/95, 96, 101; 106/31.6, 31.27, 31.13; 523/160
See application file for complete search history.

(56) References Cited

U.S. PATENT DOCUMENTS 5,818,474 A 10/1998 Takahashi et al.
6,127,549 A * 10/2000 Hao et al. .................... 548/457
6,562,117 B2 * 5/2003 Sano et al. ................... 347/100
6,601,939 B2 8/2003 Fujita et al.
6,669,318 B2 12/2003 Ushiroda
7,216,967 B2 * 5/2007 Matsuzawa et al. ......... 347/101

FOREIGN PATENT DOCUMENTS

| JP | 05-155040 A | 6/1993 |
| JP | 07-052390 A | 2/1995 |
| JP | 09-316376 A | 12/1997 |
| JP | 11-277876 A | 10/1999 |
| JP | 2001-164158 A | 6/2001 |
| JP | 2002-20673 A | 1/2002 |

(Continued)

*Primary Examiner*—Manish S. Shah
(74) *Attorney, Agent, or Firm*—Frishauf, Holtz, Goodman & Chick, P.C.

(57) ABSTRACT

An inkjet recording method includes: generating image data for forming a thinned-out image according to a thinning-out pattern without regularity; and printing a color image with respective inks, by scanning a recording head multiple times on a same recording area and forming the thinned-out image in each scanning, the recording head having a plurality of nozzle sections for jetting inks, wherein the nozzle pitch thereof is from 10 to 50 μm, the respective inks contains pigments, at least one organic solvent with high boiling point and water, a surface tension of the respective inks is from 30 to 50 mN/m, the pigments are dispersed by a polymeric dispersant, a transferred amount at 0.04 sec of time by Bristow method is 10 ml/m$^2$ or more, and the recording medium has a micro-porous layer containing inorganic fine particles with a mean particle size of 15 to 100 nm and a hydrophilic binder.

30 Claims, 23 Drawing Sheets

FOREIGN PATENT DOCUMENTS

| | | |
|---|---|---|
| JP | 2002-096461 A | 4/2002 |
| JP | 2002-137374 A | 5/2002 |
| JP | 2002-144552 A | 5/2002 |
| JP | 2003-094792 A | 4/2003 |
| JP | 2003-136836 A | 5/2003 |
| JP | 2003-213179 A | 7/2003 |
| JP | 2003-253177 A | 9/2003 |
| JP | 2003-312133 A | 11/2003 |

* cited by examiner

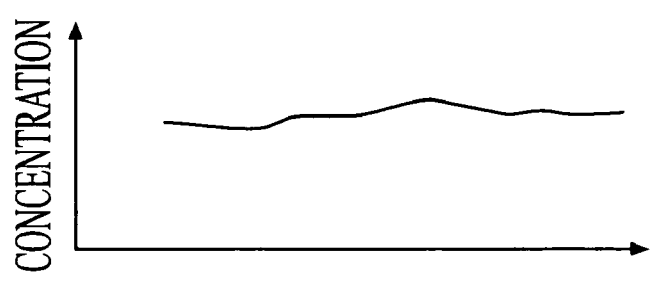
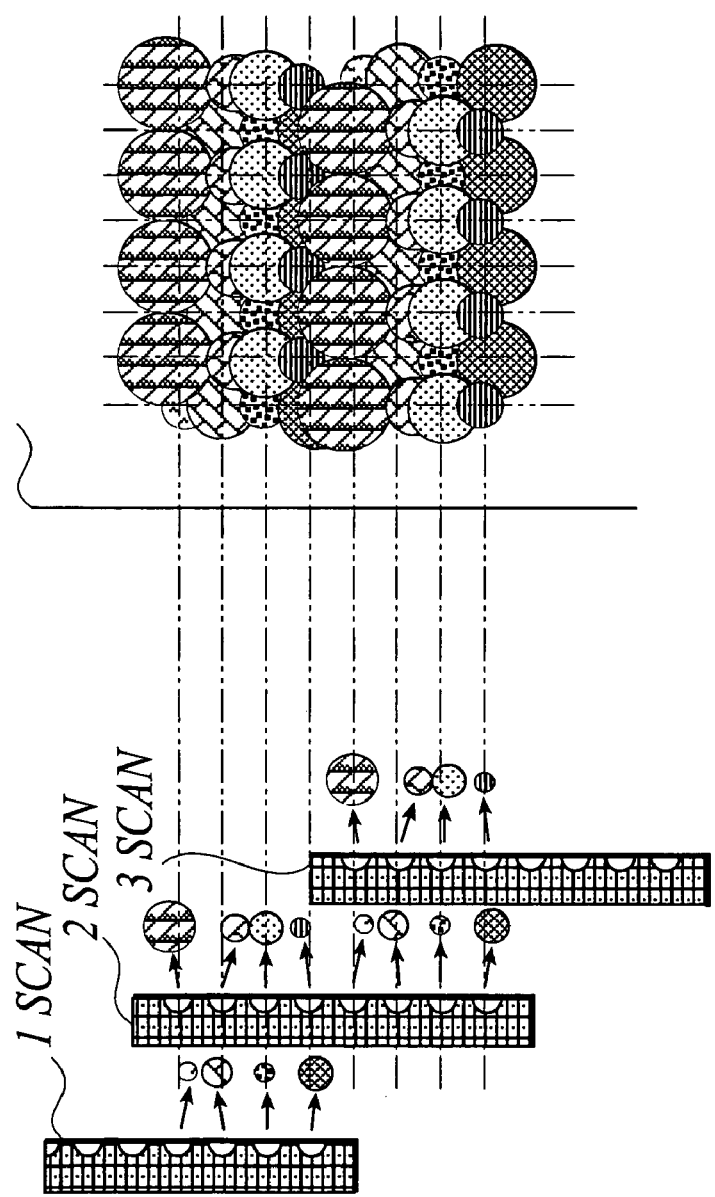

⊗ STAGGERED ROW
○ DOUBLE STAGGERED ROW

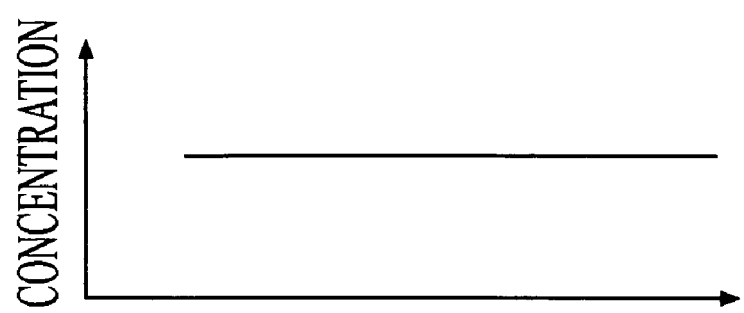
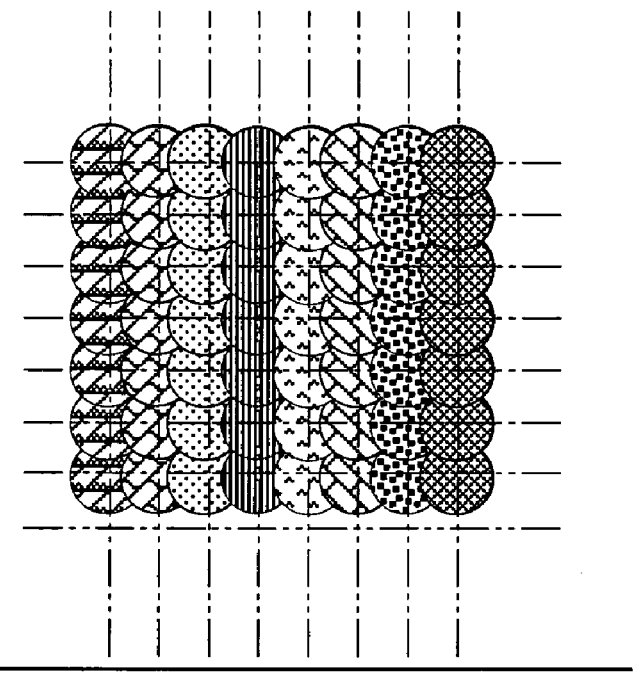
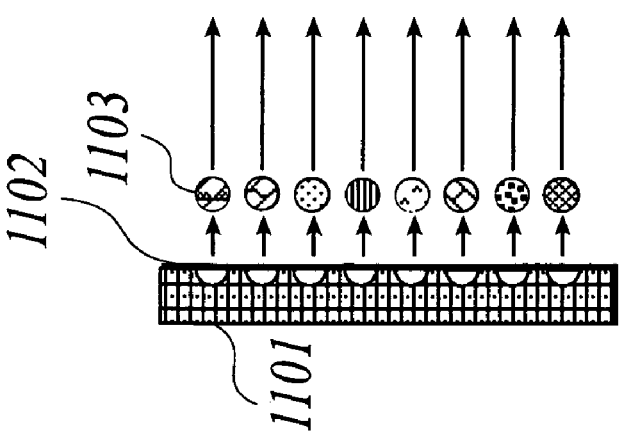

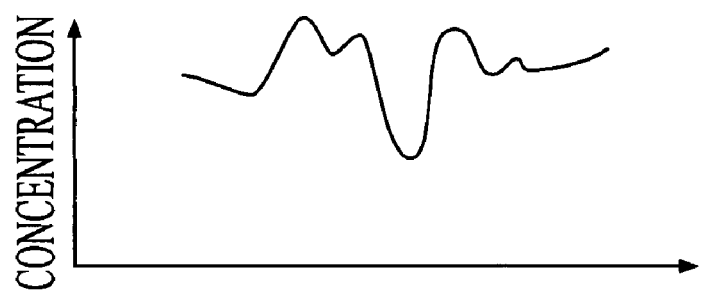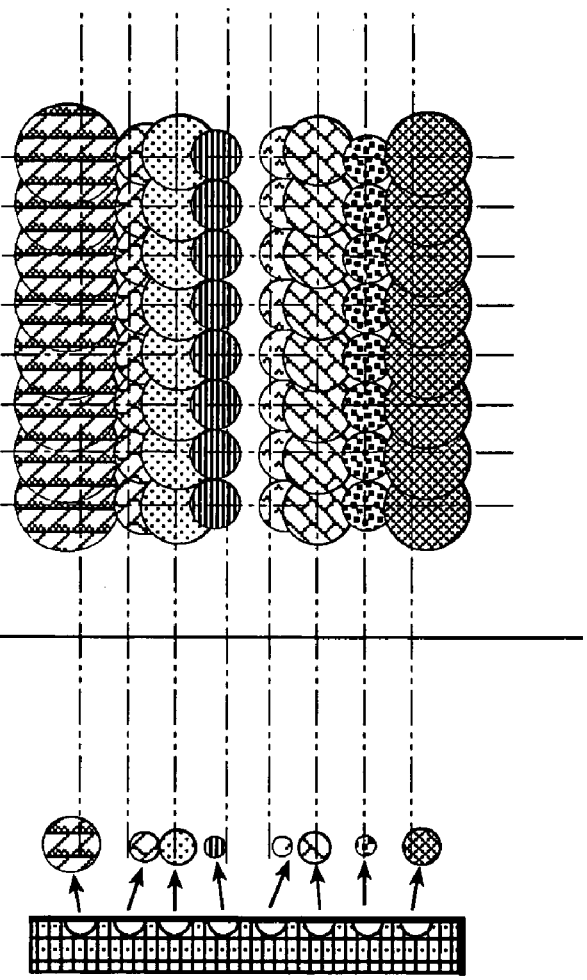

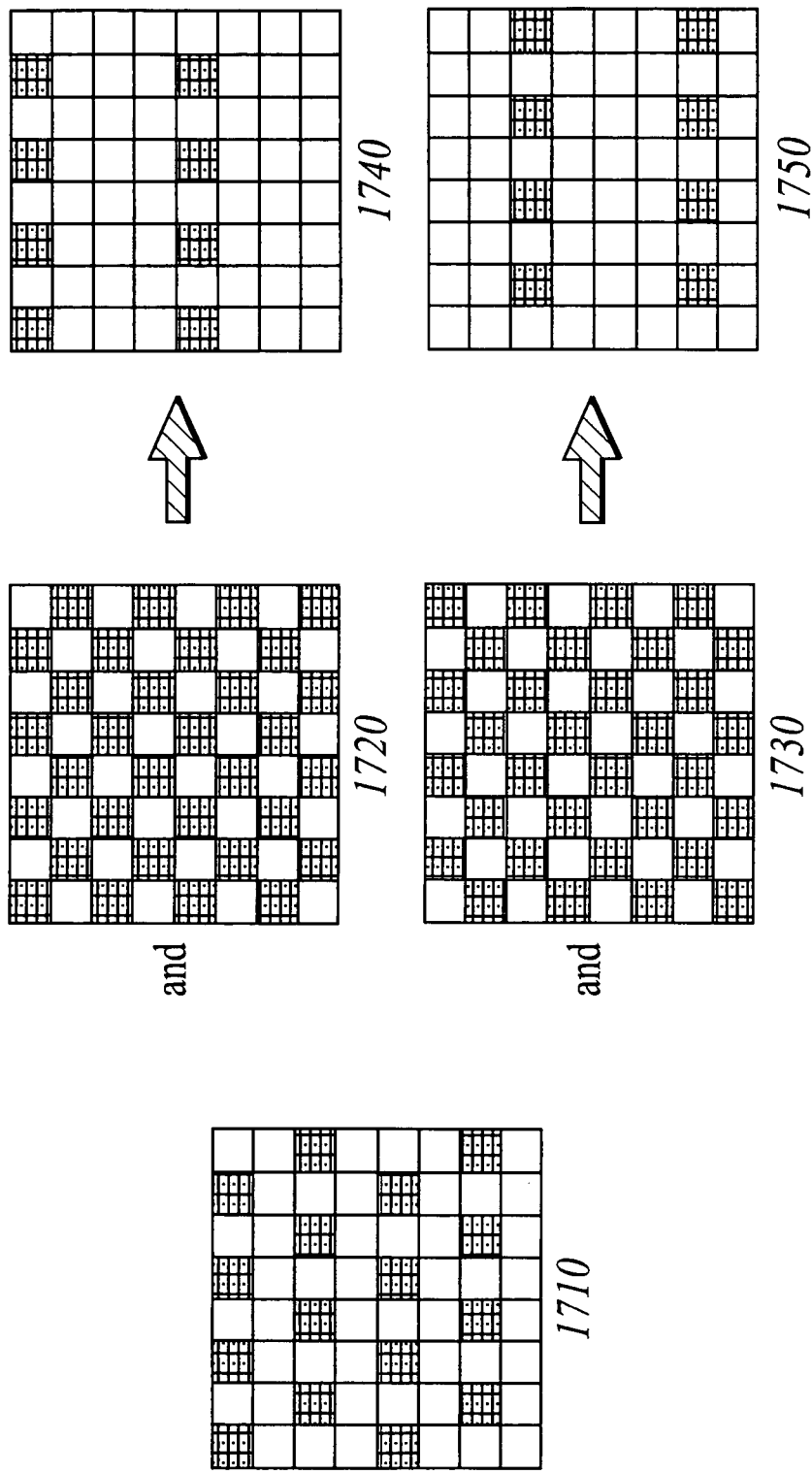

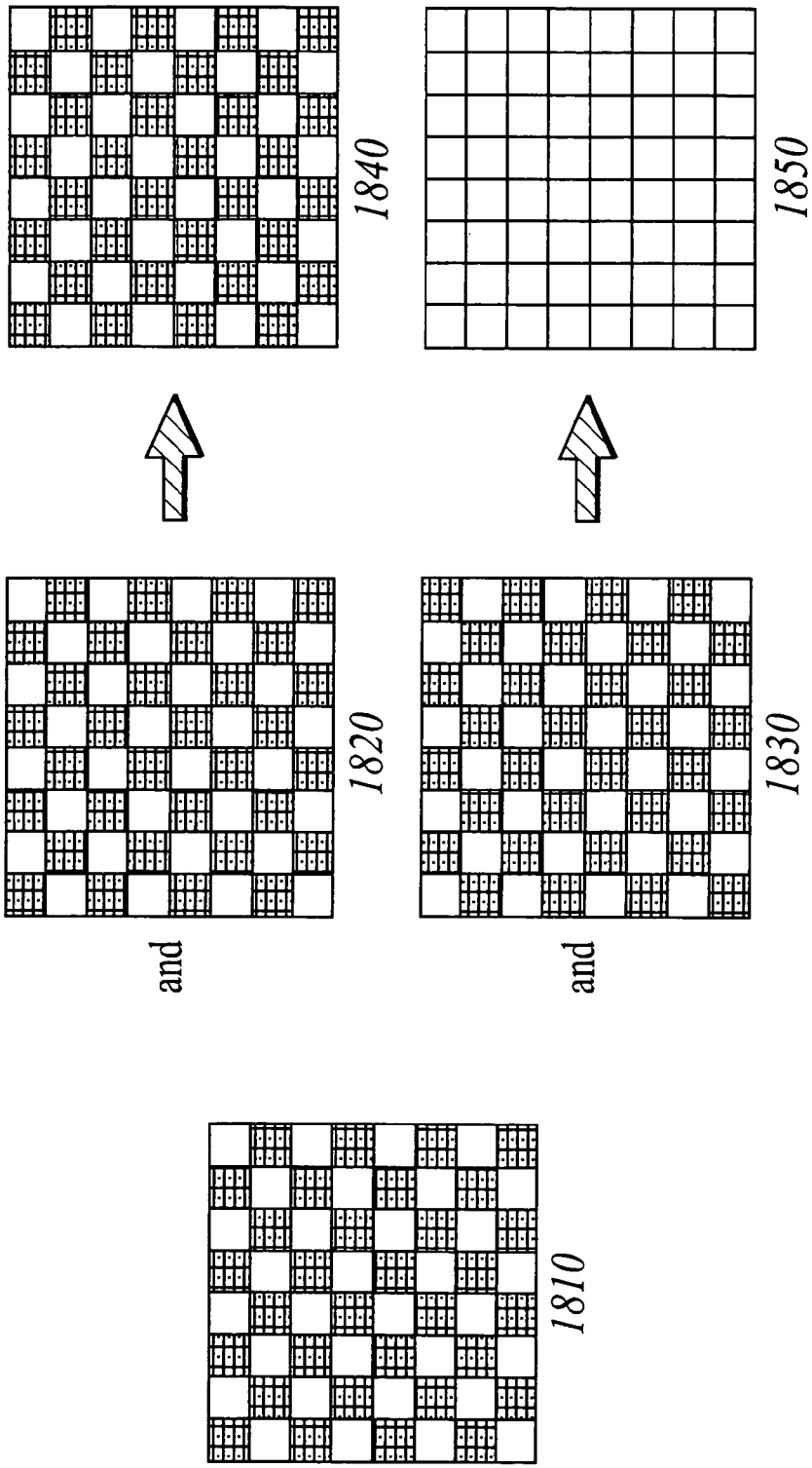

FIG.13A      FIG.13B
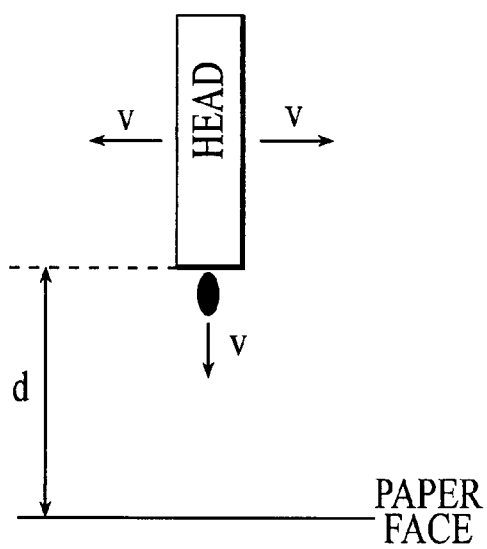 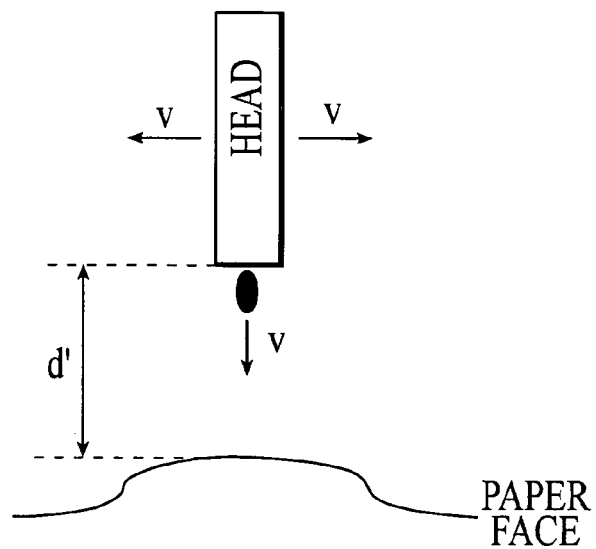
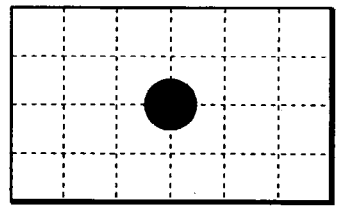 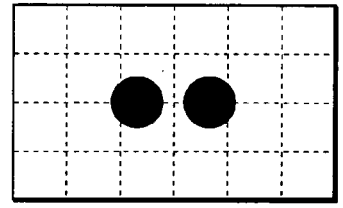

FIG.18
B4C3D2A1
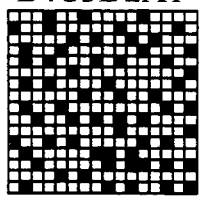
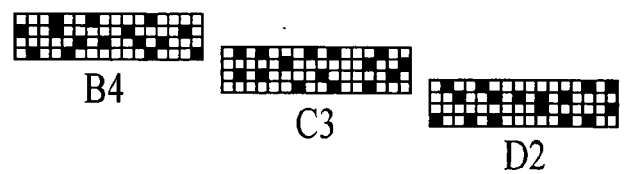
A1  B4  C3  D2
C4D3A2B1
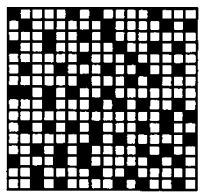
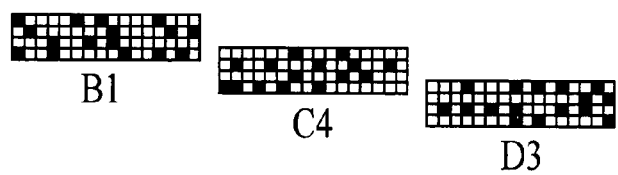
A2  B1  C4  D3
D4A3B2C1
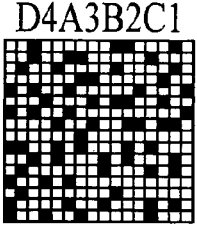
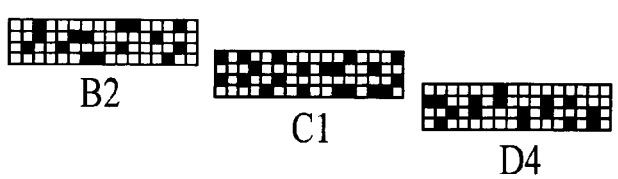
A3  B2  C1  D4
A4B3C2D1
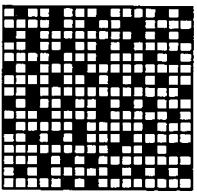
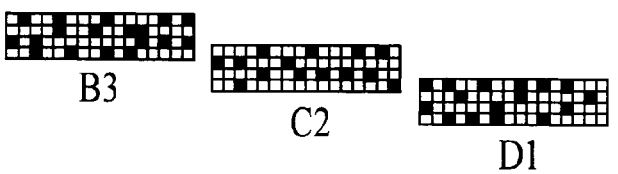
A4  B3  C2  D1

FIG. 19

| 43 | 184 | 141 | 244 | 37 | 163 | 8 | 179 | 26 | 165 | 78 | 168 | 58 | 146 | 75 | 138 |
|---|---|---|---|---|---|---|---|---|---|---|---|---|---|---|---|
| 109 | 170 | 125 | 51 | 242 | 139 | 176 | 35 | 183 | 189 | 144 | 89 | 227 | 200 | 112 | 151 |
| 23 | 147 | 101 | 167 | 19 | 18 | 225 | 3 | 98 | 180 | 83 | 255 | 49 | 76 | 207 | 15 |
| 223 | 32 | 61 | 162 | 182 | 90 | 213 | 158 | 160 | 62 | 70 | 188 | 215 | 164 | 31 | 218 |
| 251 | 47 | 231 | 142 | 45 | 181 | 64 | 249 | 107 | 187 | 137 | 52 | 41 | 149 | 24 | 86 |
| 150 | 174 | 42 | 99 | 102 | 214 | 133 | 97 | 232 | 57 | 17 | 208 | 60 | 228 | 194 | 253 |
| 245 | 209 | 117 | 131 | 205 | 72 | 63 | 121 | 229 | 114 | 210 | 4 | 171 | 53 | 71 | 85 |
| 94 | 68 | 5 | 128 | 126 | 236 | 169 | 134 | 36 | 240 | 81 | 185 | 34 | 204 | 156 | 20 |
| 177 | 135 | 93 | 250 | 77 | 159 | 87 | 157 | 12 | 48 | 203 | 122 | 243 | 130 | 80 | 235 |
| 119 | 95 | 238 | 120 | 153 | 88 | 252 | 29 | 152 | 145 | 212 | 233 | 113 | 103 | 202 | 7 |
| 0 | 247 | 55 | 254 | 115 | 11 | 217 | 123 | 198 | 69 | 116 | 30 | 230 | 175 | 106 | 206 |
| 191 | 33 | 110 | 193 | 178 | 190 | 50 | 148 | 118 | 127 | 221 | 132 | 21 | 155 | 108 | 234 |
| 124 | 219 | 172 | 56 | 84 | 40 | 150 | 224 | 73 | 25 | 195 | 1 | 136 | 54 | 105 | 74 |
| 161 | 39 | 92 | 192 | 16 | 248 | 27 | 140 | 91 | 211 | 22 | 143 | 104 | 222 | 216 | 173 |
| 10 | 199 | 13 | 241 | 226 | 79 | 201 | 59 | 237 | 46 | 166 | 6 | 196 | 67 | 66 | 28 |
| 220 | 65 | 154 | 2 | 9 | 99 | 129 | 111 | 197 | 82 | 14 | 186 | 44 | 246 | 38 | 239 |

FIG.20

| 43 | 184 | 141 | 244 | 37 | 163 | 8 | 179 | 26 | 165 | 78 | 168 | 58 | 146 | 75 | 138 |
|---|---|---|---|---|---|---|---|---|---|---|---|---|---|---|---|
| 109 | 170 | 125 | 51 | 242 | 139 | 176 | 35 | 183 | 189 | 144 | 89 | 227 | 200 | 112 | 151 |
| 23 | 147 | 101 | 167 | 19 | 18 | 225 | 3 | 98 | 180 | 83 | 255 | 49 | 76 | 207 | 15 |
| 223 | 32 | 61 | 162 | 182 | 90 | 213 | 158 | 160 | 62 | 70 | 188 | 215 | 164 | 31 | 218 |
| 251 | 47 | 231 | 142 | 45 | 181 | 64 | 249 | 107 | 187 | 137 | 52 | 41 | 149 | 24 | 86 |
| 150 | 174 | 42 | 99 | 102 | 214 | 133 | 97 | 232 | 57 | 17 | 208 | 60 | 228 | 194 | 253 |
| 245 | 209 | 117 | 131 | 205 | 72 | 63 | 121 | 229 | 114 | 210 | 4 | 171 | 53 | 71 | 85 |
| 94 | 68 | 5 | 128 | 126 | 236 | 169 | 134 | 36 | 240 | 81 | 185 | 34 | 204 | 156 | 20 |
| 177 | 135 | 93 | 250 | 77 | 159 | 87 | 157 | 12 | 48 | 203 | 122 | 243 | 130 | 80 | 235 |
| 119 | 95 | 238 | 120 | 153 | 88 | 252 | 29 | 152 | 145 | 212 | 233 | 113 | 103 | 202 | 7 |
| 0 | 247 | 55 | 254 | 115 | 11 | 217 | 123 | 198 | 69 | 116 | 30 | 230 | 175 | 106 | 206 |
| 191 | 33 | 110 | 193 | 178 | 190 | 50 | 148 | 118 | 127 | 221 | 132 | 21 | 155 | 108 | 234 |
| 124 | 219 | 172 | 56 | 84 | 40 | 150 | 224 | 73 | 25 | 195 | 1 | 136 | 54 | 105 | 74 |
| 161 | 39 | 92 | 192 | 16 | 248 | 27 | 140 | 91 | 211 | 22 | 143 | 104 | 222 | 216 | 173 |
| 10 | 199 | 13 | 241 | 226 | 79 | 201 | 59 | 237 | 46 | 166 | 6 | 196 | 67 | 66 | 28 |
| 220 | 65 | 154 | 2 | 9 | 99 | 129 | 111 | 197 | 82 | 14 | 186 | 44 | 246 | 38 | 239 |

| 43 | 184 | 141 | 244 | 37 | 163 | 8 | 179 | 26 | 165 | 78 | 168 | 58 | 146 | 75 | 138 |
|---|---|---|---|---|---|---|---|---|---|---|---|---|---|---|---|
| 109 | 170 | 125 | 51 | 242 | 139 | 176 | 35 | 183 | 189 | 144 | 89 | 227 | 200 | 112 | 151 |
| 23 | 147 | 101 | 167 | 19 | 18 | 225 | 3 | 98 | 180 | 83 | 255 | 49 | 76 | 207 | 15 |
| 223 | 32 | 61 | 162 | 182 | 90 | 213 | 158 | 160 | 62 | 70 | 188 | 215 | 164 | 31 | 218 |
| 251 | 47 | 231 | 142 | 45 | 181 | 64 | 249 | 107 | 187 | 137 | 52 | 41 | 149 | 24 | 86 |
| 150 | 174 | 42 | 99 | 102 | 214 | 133 | 97 | 232 | 57 | 17 | 208 | 60 | 228 | 194 | 253 |
| 245 | 209 | 117 | 131 | 205 | 72 | 63 | 121 | 229 | 114 | 210 | 4 | 171 | 53 | 71 | 85 |
| 94 | 68 | 5 | 128 | 126 | 236 | 169 | 134 | 36 | 240 | 81 | 185 | 34 | 204 | 156 | 20 |
| 177 | 135 | 93 | 250 | 77 | 159 | 87 | 157 | 12 | 48 | 203 | 122 | 243 | 130 | 80 | 235 |
| 119 | 95 | 238 | 120 | 153 | 88 | 252 | 29 | 152 | 145 | 212 | 233 | 113 | 103 | 202 | 7 |
| 0 | 247 | 55 | 254 | 115 | 11 | 217 | 123 | 198 | 69 | 116 | 30 | 230 | 175 | 106 | 206 |
| 191 | 33 | 110 | 193 | 178 | 190 | 50 | 148 | 118 | 127 | 221 | 132 | 21 | 155 | 108 | 234 |
| 124 | 219 | 172 | 56 | 84 | 40 | 150 | 224 | 73 | 25 | 195 | 1 | 136 | 54 | 105 | 74 |
| 161 | 39 | 92 | 192 | 16 | 248 | 27 | 140 | 91 | 211 | 22 | 143 | 104 | 222 | 216 | 173 |
| 10 | 199 | 13 | 241 | 226 | 79 | 201 | 59 | 237 | 46 | 166 | 6 | 196 | 67 | 66 | 28 |
| 220 | 65 | 154 | 2 | 9 | 99 | 129 | 111 | 197 | 82 | 14 | 186 | 44 | 246 | 38 | 239 |

FIG. 21

| 43 | 184 | 141 | 244 | 37 | 163 | 8 | 179 | 26 | 165 | 78 | 168 | 58 | 146 | 75 | 138 |
|---|---|---|---|---|---|---|---|---|---|---|---|---|---|---|---|
| 109 | 170 | 125 | 51 | 242 | 139 | 176 | 35 | 183 | 189 | 144 | 89 | 227 | 200 | 112 | 151 |
| 23 | 147 | 101 | 167 | 19 | 18 | 225 | 3 | 98 | 180 | 83 | 255 | 49 | 76 | 207 | 15 |
| 223 | 32 | 61 | 162 | 182 | 90 | 213 | 158 | 160 | 62 | 70 | 188 | 215 | 164 | 31 | 218 |
| 251 | 47 | 231 | 142 | 45 | 181 | 64 | 249 | 107 | 187 | 137 | 52 | 41 | 149 | 24 | 86 |
| 150 | 174 | 42 | 99 | 102 | 214 | 133 | 97 | 232 | 57 | 17 | 208 | 60 | 228 | 194 | 253 |
| 245 | 209 | 117 | 131 | 205 | 72 | 63 | 121 | 229 | 114 | 210 | 4 | 171 | 53 | 71 | 85 |
| 94 | 68 | 5 | 128 | 126 | 236 | 169 | 134 | 36 | 240 | 81 | 185 | 34 | 204 | 156 | 20 |
| 177 | 135 | 93 | 250 | 77 | 159 | 87 | 157 | 12 | 48 | 203 | 122 | 243 | 130 | 80 | 235 |
| 119 | 95 | 238 | 120 | 153 | 88 | 252 | 29 | 152 | 145 | 212 | 233 | 113 | 103 | 202 | 7 |
| 0 | 247 | 55 | 254 | 115 | 11 | 217 | 123 | 198 | 69 | 116 | 30 | 230 | 175 | 106 | 206 |
| 191 | 33 | 110 | 193 | 178 | 190 | 50 | 148 | 118 | 127 | 221 | 132 | 21 | 155 | 108 | 234 |
| 124 | 219 | 172 | 56 | 84 | 40 | 150 | 224 | 73 | 25 | 195 | 1 | 136 | 54 | 105 | 74 |
| 161 | 39 | 92 | 192 | 16 | 248 | 27 | 140 | 91 | 211 | 22 | 143 | 104 | 222 | 216 | 173 |
| 10 | 199 | 13 | 241 | 226 | 79 | 201 | 59 | 237 | 46 | 166 | 6 | 196 | 67 | 66 | 28 |
| 220 | 65 | 154 | 2 | 9 | 99 | 129 | 111 | 197 | 82 | 14 | 186 | 44 | 246 | 38 | 239 |

| 43 | 184 | 141 | 244 | 37 | 163 | 8 | 179 | 26 | 165 | 78 | 168 | 58 | 146 | 75 | 138 |
|---|---|---|---|---|---|---|---|---|---|---|---|---|---|---|---|
| 109 | 170 | 125 | 51 | 242 | 139 | 176 | 35 | 183 | 189 | 144 | 89 | 227 | 200 | 112 | 151 |
| 23 | 147 | 101 | 167 | 19 | 18 | 225 | 3 | 98 | 180 | 83 | 255 | 49 | 76 | 207 | 15 |
| 223 | 32 | 61 | 162 | 182 | 90 | 213 | 158 | 160 | 62 | 70 | 188 | 215 | 164 | 31 | 218 |
| 251 | 47 | 231 | 142 | 45 | 181 | 64 | 249 | 107 | 187 | 137 | 52 | 41 | 149 | 24 | 86 |
| 150 | 174 | 42 | 99 | 102 | 214 | 133 | 97 | 232 | 57 | 17 | 208 | 60 | 228 | 194 | 253 |
| 245 | 209 | 117 | 131 | 205 | 72 | 63 | 121 | 229 | 114 | 210 | 4 | 171 | 53 | 71 | 85 |
| 94 | 68 | 5 | 128 | 126 | 236 | 169 | 134 | 36 | 240 | 81 | 185 | 34 | 204 | 156 | 20 |
| 177 | 135 | 93 | 250 | 77 | 159 | 87 | 157 | 12 | 48 | 203 | 122 | 243 | 130 | 80 | 235 |
| 119 | 95 | 238 | 120 | 153 | 88 | 252 | 29 | 152 | 145 | 212 | 233 | 113 | 103 | 202 | 7 |
| 0 | 247 | 55 | 254 | 115 | 11 | 217 | 123 | 198 | 69 | 116 | 30 | 230 | 175 | 106 | 206 |
| 191 | 33 | 110 | 193 | 178 | 190 | 50 | 148 | 118 | 127 | 221 | 132 | 21 | 155 | 108 | 234 |
| 124 | 219 | 172 | 56 | 84 | 40 | 150 | 224 | 73 | 25 | 195 | 1 | 136 | 54 | 105 | 74 |
| 161 | 39 | 92 | 192 | 16 | 248 | 27 | 140 | 91 | 211 | 22 | 143 | 104 | 222 | 216 | 173 |
| 10 | 199 | 13 | 241 | 226 | 79 | 201 | 59 | 237 | 46 | 166 | 6 | 196 | 67 | 66 | 28 |
| 220 | 65 | 154 | 2 | 9 | 99 | 129 | 111 | 197 | 82 | 14 | 186 | 44 | 246 | 38 | 239 |

FIG.23
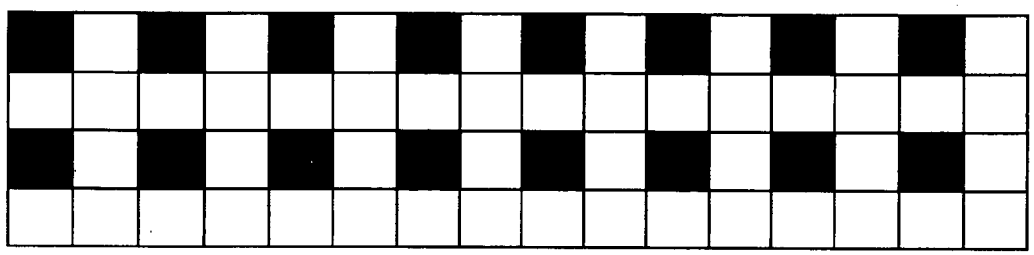 A1
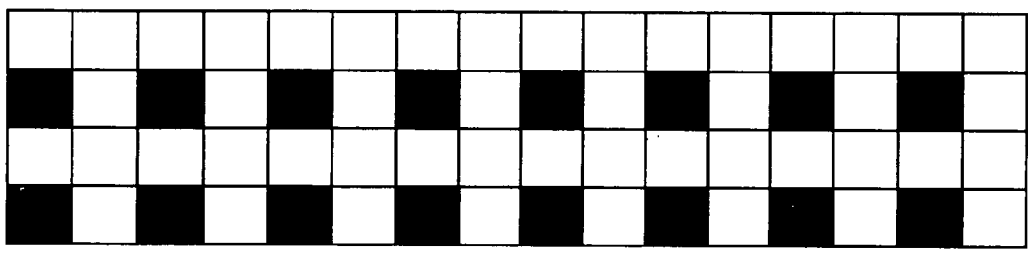 A2
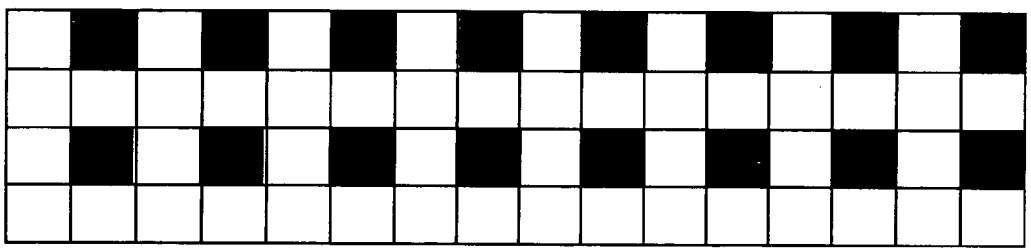 A3
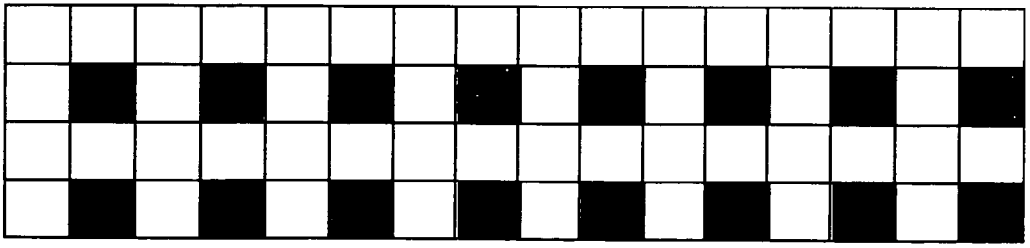 A4

INKJET RECORDING METHOD AND INKJET RECORDING APPARATUS

BACKGROUND OF THE INVENTION

1. Field of the Invention

The present invention relates to a novel inkjet recording method and inkjet recording apparatus, and particularly the inkjet recording method and the inkjet recording apparatus by which an image at high definition with no color turbidity where bronzing resistance, gloss and scratch/abrasion resistance are improved is obtained.

2. Description of Related Art

An inkjet recording mode is one for recording images and texts by flying minute droplets of ink to adhere onto a recording medium by various operation principles, and has advantages such as relatively high speed, low noise and easiness of multiple coloration. In the above inkjet recording mode, various improvements have been performed in various fields such as an ink, inkjet recording medium and inkjet recording apparatus, and at present, the mode has become rapidly popular for various fields such as various printers, facsimiles and computer terminals. In particular, recently high-quality picture technology in the printer has been improved, and its level has come at a picture quality of photograph.

As the inkjet recording apparatus used in the inkjet recording mode, for enhancing a printing speed, those where multiple ink jet openings (nozzle sections) and ink liquid paths are integrated as a recording head where multiple recording elements are integrated/arrayed (hereinafter also referred to as a multihead) are used. Additionally, as the inkjet recording apparatus for corresponding to coloration, those where multiple recording heads composed of the above configuration are comprised are frequently used. In that case, it is general that the recording heads which ejaculate inks of respective colors are disposed in parallel with a main scanning direction.

Here, when a color image picture is printed, differently from those where only characters are printed in a black-and-white printer, various factors such as color density, gradation and uniformity are important to obtain high-quality pictures. In particular, with respect to the uniformity, slight dispersion of nozzle units which occurs in difference of multihead fabrication steps influences jetting amounts and jetting directions of inks at respective nozzles, and becomes a cause which finally deteriorates image quality as uneven density of a printed image. Also, speed variation at a main scanning of a carriage where heads are loaded, variation of sub scanning paper feeding amount of the recording medium, and variation of a distance between a recording medium surface and a nozzle face on the recording medium cause deterioration of the image.

For the above problems, a so-called multi-pass recording method has been proposed where image deterioration due to the dispersion of respective nozzles and various variations is reduced by scanning multiple times the recording head having multiple nozzle sections onto the same recording area on the inkjet recording medium and forming an image of a complementary thinning-out pattern. As a mask used in this case, as described in JP-SHO 60-107975A, the method of using a complementary pattern with a constant thinning-out rate of a certain rule is the commonest.

However, as described below, when using such a regular mask, conversely uneven colors, stripe unevenness and white spots sometimes remarkably appear, and thus, the method of using a mask pattern without regularity has been proposed as an improving countermeasure of this. By forming an image thinned out of this thinning-out pattern without regularity, it is possible to prevent the uneven density and uneven colors produced due to a synergistic effect of regularity of the image and regularity of the mask, and realize high-quality picture and high speed printing to some extent (for example, refer to JP-HEI 7-52390A, JP 2002-96461A, and JP 2002-144552A.).

Whereas, the present applicant has found that when a certain inks and a recording medium is used, and in particular when high-quality printing such as silver halide photograph is required, sufficient image quality is not obtained only by the proposed thinning-out printing method. This is illustrated below.

The inks used in the inkjet recoding mode are broadly divided into dye inks where color materials are dissolved in solvents and dispersion inks where color materials, mainly pigments are dispersed in solvents. The dye dissolves in the solvents and is in a molecular state or a cluster state, which makes its absorption spectrum sharp, and develops clear color with high purity. Additionally, there is no particle pattern due to particles and no scattered light and reflected light occur, therefore it is possible to obtain an inkjet image with high translucent feeling and clear color phase. The dye has a property excellent in scratch/abrasion resistance because no color material particle is present on the surface of media. The dye, however, has drawbacks of poor light resistance because dye molecules tend to break by photochemical reaction. The reduction in dye molecular number directly reflects upon a color density. It is an actual state that the inkjet recording image using the dye inks is the high image quality but the poor image stability against light, and the technology which is superior to silver halide photographs in the light stability has not appeared yet.

As the method for solving this problem, pigment inks where the pigments with good light resistance are used as colorants have been used for the intended use where the high light stability is required.

However, when an inkjet image recording according to the thinning-out pattern without regularity is performed using the pigment inks, a dot position formed at each scanning has no regularity. Therefore, the case where the ink droplets of cyan, magenta, yellow and black are adjacently printed on the inkjet recording medium at the same scanning becomes frequent. As a result, the respective ink droplets are mixed one another, aggregation of pigment particles is caused, and a phenomenon called bronzing which is hardly caused in the dye inks occurs. A problem that the color image cannot be accurately reproduced occurs.

In particular, in order to form the image at high definition like a silver halide photograph, when the inkjet recording medium having a micro-porous layer containing inorganic fine particles with a mean particle size of 100 nm or less is used, an absorption speed of inks is fast and the aggregation of pigment particles present on the recording medium occurs more easily. Besides, it has been found that due to using the mask pattern without regularity, a probability that different color dots are adjacently printed becomes high, and the formation of image at high definition becomes difficult because the pigment particles having different color tone are mixed on the recording medium.

This is because when using the regular thinning-out pattern, the position of each ink formed on the recording medium at one scanning can be finely controlled and mixture of the dots can be effectively inhibited whereas it is difficult to perform such a control in the case without regularity. When a printing rate per scanning by the thinning-out is low, even if using the mask without regularity, the probability that the dots adjacently formed on the recording medium becomes low, and thus, the problem in image quality is reduced.

SUMMARY OF THE INVENTION

The present invention has been made in the light of the above problems. In order to solve the above problems, in accordance with a first aspect of the invention, an inkjet recording method comprises the step of:

forming a color image with respective inks of at least cyan, magenta, yellow and black on a recording medium by while scanning a recording head multiple times on a same recording area of the recording medium, forming a thinned-out image according to an thinning-out pattern without regularity in each scanning, the recording head having a plurality of nozzle sections for jetting inks, wherein a nozzle pitch of the recording head is from 10 to 50 μm, the respective inks contains pigments, at least one organic solvent with high boiling point and water, a surface tension of the respective inks is from 30 to 50 mN/m, the pigments are dispersed by a polymeric dispersant, in the recording medium, a transferred amount at 0.04 sec of time by Bristow method is 10 ml/m$^2$ or more, and the recording medium has a micro-porous layer containing inorganic fine particles with a mean particle size of 15 to 100 nm and a hydrophilic binder.

In accordance with a second aspect of the invention, an inkjet recording apparatus for forming a color image on a recording medium by jetting respective inks of at least cyan, magenta, yellow and black on a recording medium comprises:

a recording head in which a plurality of nozzle sections for jetting the inks are arrayed at a pitch of 10 to 50 μm;

a scanning section to make the recording head scan multiple times on a same recording area of the recording medium; and a control section to jet the inks from the plurality of nozzle sections such that a thinned-out image according to the thinning-out pattern without regularity in each scanning is formed on the recording medium, wherein the respective inks contains pigments, at least one organic solvent with high boiling point and water, a surface tension of the respective inks is from 30 to 50 mN/m, the pigments are dispersed by a polymeric dispersant, in the recording medium, a transferred amount at 0.04 sec of time by Bristow method is 10 ml/m$^2$ or more, and the recording medium has a micro-porous layer containing inorganic fine particles with a mean particle size of 15 to 100 nm and a hydrophilic binder.

In accordance with a third aspect of the invention, an inkjet recording apparatus for forming a color image on a recording medium by jetting respective inks of at least cyan, magenta, yellow and black on a recording medium comprises:

a recording means in which a plurality of nozzle sections for jetting the inks are arrayed at a pitch of 10 to 50 μm;

a scanning means for making the recording head scan multiple times on a same recording area of the recording medium; and a control means for jetting the inks from the plurality of nozzle sections such that a thinned-out image according to the thinning-out pattern without regularity in each scanning is formed on the recording medium, wherein the respective inks contains pigments, at least one organic solvent with high boiling point and water, a surface tension of the respective inks is from 30 to 50 mN/m, the pigments are dispersed by a polymeric dispersant, in the recording medium, a transferred amount at 0.04 sec of time by Bristow method is 10 ml/m$^2$ or more, and the recording medium has a micro-porous layer containing inorganic fine particles with a mean particle size of 15 to 100 nm and a hydrophilic binder.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 6A to 6C are schematic diagrams representing one example of multi-pass printing jet recording methods;

FIG. 8A to 8C are schematic diagrams representing one example of multi-pass printing jet recording methods;

FIG. 9A to 9C are schematic diagrams representing one example of multi-pass printing jet recording methods;

FIG. 10 is a schematic diagram representing one example of image alignment patterns arrayed regularly;

FIG. 11 is a schematic diagram representing another example of image alignment patterns arrayed regularly;

FIGS. 13A and 13B are schematic diagrams showing a condition where heads jet ink droplets on a flat face of a recording medium at a constant speed v with moving at a constant speed V in a forth or back direction;

FIG. 18 is a schematic diagram showing one example of mask patterns with blue noise property;

FIG. 19 is a schematic diagram showing one example of mask patterns;

FIG. 20 is a schematic diagram showing another example of mask patterns;

FIG. 21 is a schematic diagram showing another example of mask patterns;

FIG. 23 is a schematic diagram showing one example of mask patterns used in Comparative Examples.

DETAILED DESCRIPTION OF THE PREFERRED EMBODIMENTS

Hereinafter, the best modes for carrying out the invention are illustrated in detail, but the invention is not limited thereto.

Figure 1:
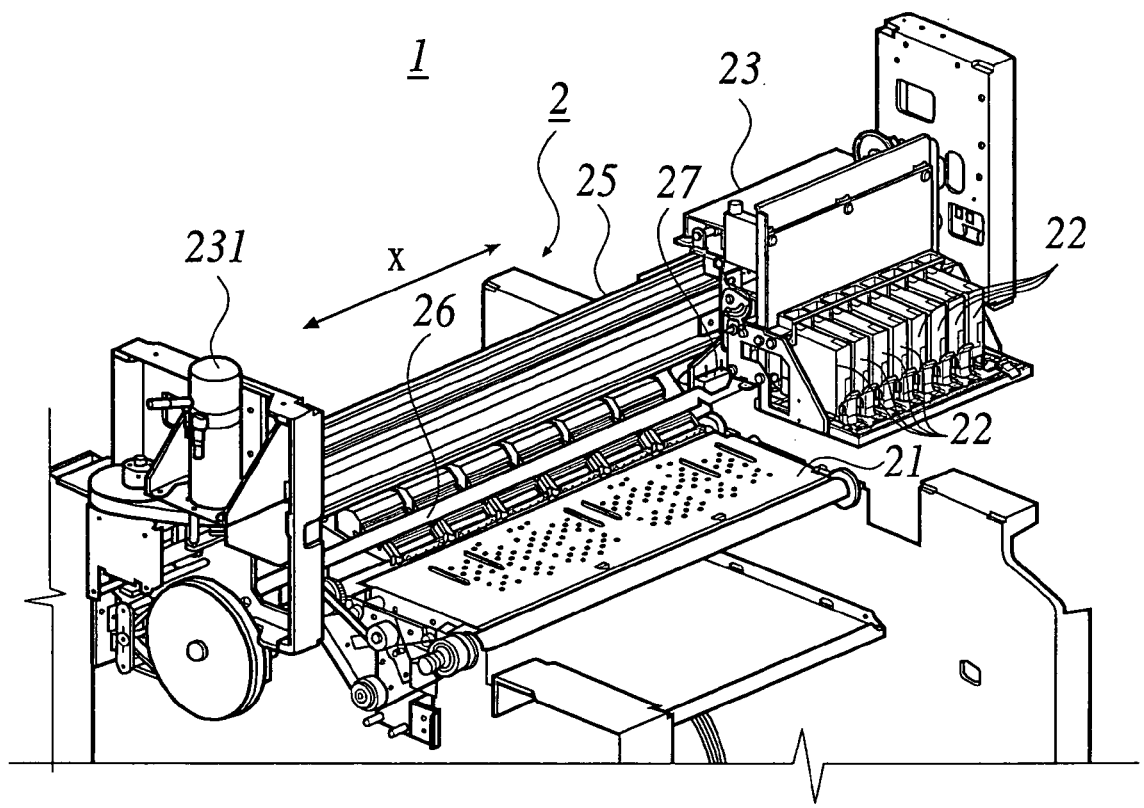
FIG. 1 is a perspective view representing a major configuration section of an inkjet printer.

First, an inkjet printer to which the inkjet recording method of the invention can be applied is illustrated in reference to FIG. 1. FIG. 1 is a perspective view representing a major configuration of the inkjet printer.

As is shown in the figure, an image forming section 2 where inks are jetted onto a recording medium to form an image is installed in the inkjet printer 1. In this image forming section 2, a platen 21 which supports a back face (face opposite to a side of a recorded face) of a recording medium in a given range by its upper face is nearly horizontally arranged. A guiding member 25 which extends along a scanning direction X over the platen 21, for moving a carriage as scanning member 23 which scans in the scanning direction X is installed in the image forming section 2.

In the carriage 23, recording head 22 which jet the inks on the recording medium and a linear encoder sensor 27 which reads an optical pattern of a linear scale 26 where the optical pattern extends along the scanning direction X and is arranged in its longitudinal direction with 300 dpi cycle to output as clock signals are loaded. Meanwhile, dpi referred to in the invention represents a dot number per 2.54 cm. In the present embodiment, printing operation is performed by dividing this encoder signal, for example, by a printing resolution of 1200 dpi. A moving direction of the carriage 23 is changed by a rotation direction of a driving motor for the carriage, and the carriage 23 is moved back and forth in the scanning direction X by this. At the image formation, the carriage 23 moves forth, back or back and forth when the recording medium stops. A moving speed at that time is, for example, 705 mm/sec at the highest speed.

Figure 2:
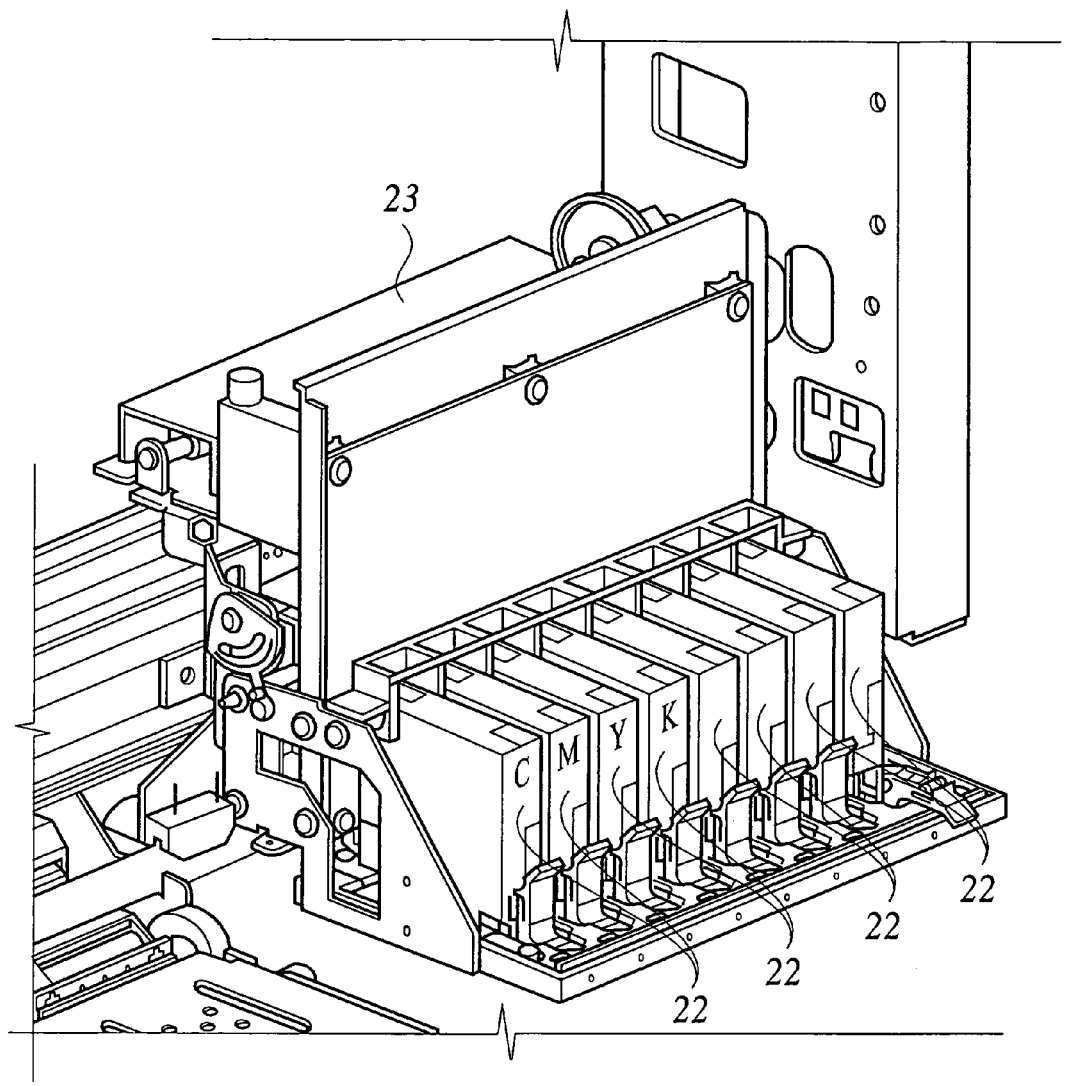
FIG. 2 is a perspective view where a carriage of the inkjet printer is enlarged.
Figure 3:
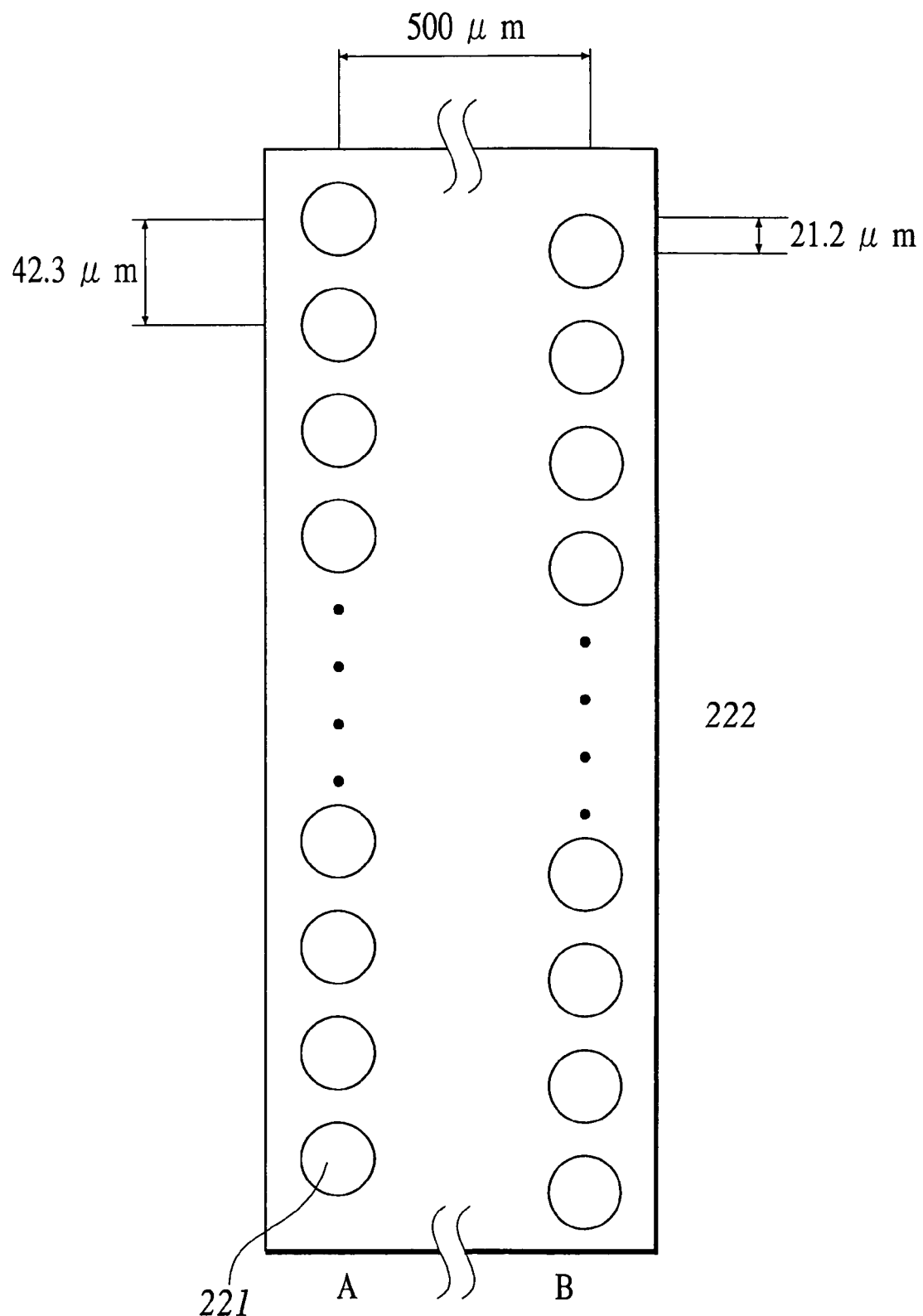
FIG. 3 is a bottom view of recording heads of the inkjet printer.

Next, the recording head 22 are illustrated in reference to FIG. 2 and FIG. 3. FIG. 2 is a perspective view of the enlarged carriage 23, and FIG. 3 is a bottom view of the recording head 22.

The recording head may be a piezo mode or a thermal mode, but is preferably the thermal mode in terms of arranging the nozzles at high density, and the recording heads of thermal mode are used in the present embodiment. This recording head 22 is arranged such that a recording face of the recording medium fed on the platen 21 is faced to a nozzle face 222 at the image recording where the nozzles 221 of the recording heads 22 are formed.

As shown in FIG. 3, total 256 nozzles at a pitch of 42.3 μm (600 dpi) with two rows of each 128 are formed in a feeding direction of the recording medium on the nozzle face 222 of the recording heads. These nozzle rows are arranged with 21.2 μm out of alignment one another. This corresponds to one pixel in 1200 dpi. A distance between two rows is about 500 μm. A thermal inkjet element is installed inside each nozzle 221, and the ink as a droplet is separately jetted by operation of a jetting member.

The ink is supplied to each recording head passing through a tube for piping from a cartridge for recording ink which is not shown in the figure. Four recording heads 22 are disposed side by side along the scanning direction, and are used for 4 color inks of cyan (C), magenta (M), yellow (Y) and black (K), respectively. In the present Examples, 4 type inks of C, M, Y and K are used as the recording inks, but the effects of the invention are the same even in the inkjet printer which records 5 colors or more, for example, 8 colors of dark and light C, M, Y and K using light colors. In FIG. 1, the recording heads for 8 colors are loaded, but the printing is performed using 4 of them in the present Examples.

Figure 4:
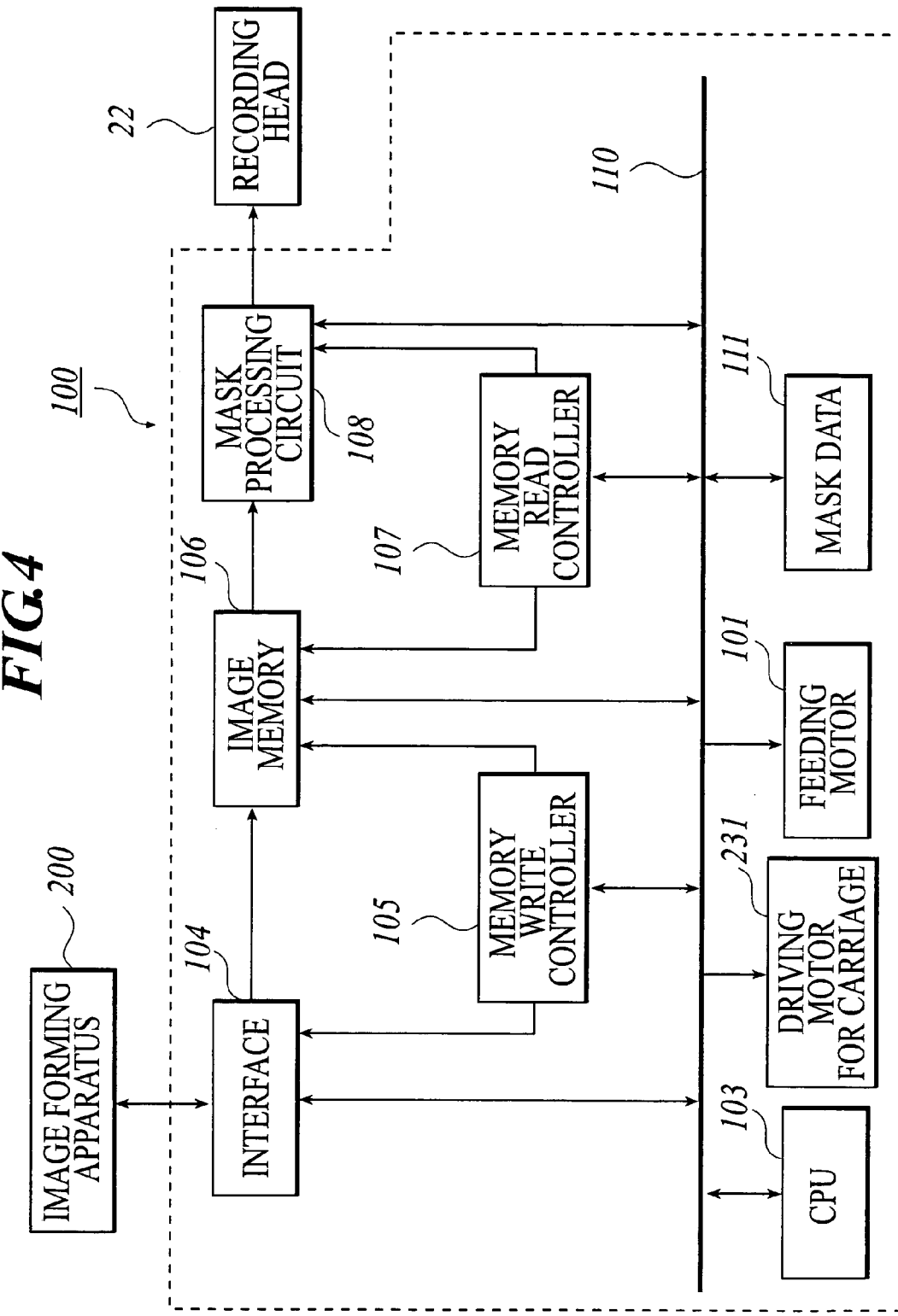
FIG. 4 is a block diagram representing a control section of the inkjet printer.

Next, a control section of the inkjet printer 1 is illustrated in reference to FIG. 4. FIG. 4 is a block diagram representing the control section of the inkjet printer 1.

As shown in FIG. 4, the control section 100 is configured by connecting a feeding motor 101 to feed the recording medium, CPU 103, an interface 104, a driving motor 231 for the carriage, a memory write controller 105, an image memory 106, a memory read controller 107, and a mask processing circuit 108 through a bus 110 as is shown. A detailed configuration of the mask processing circuit 108 is described below. The recording head 22 of the inkjet printer 1, respective driving sections and the like are also connected to the control section 100.

Figure 5:
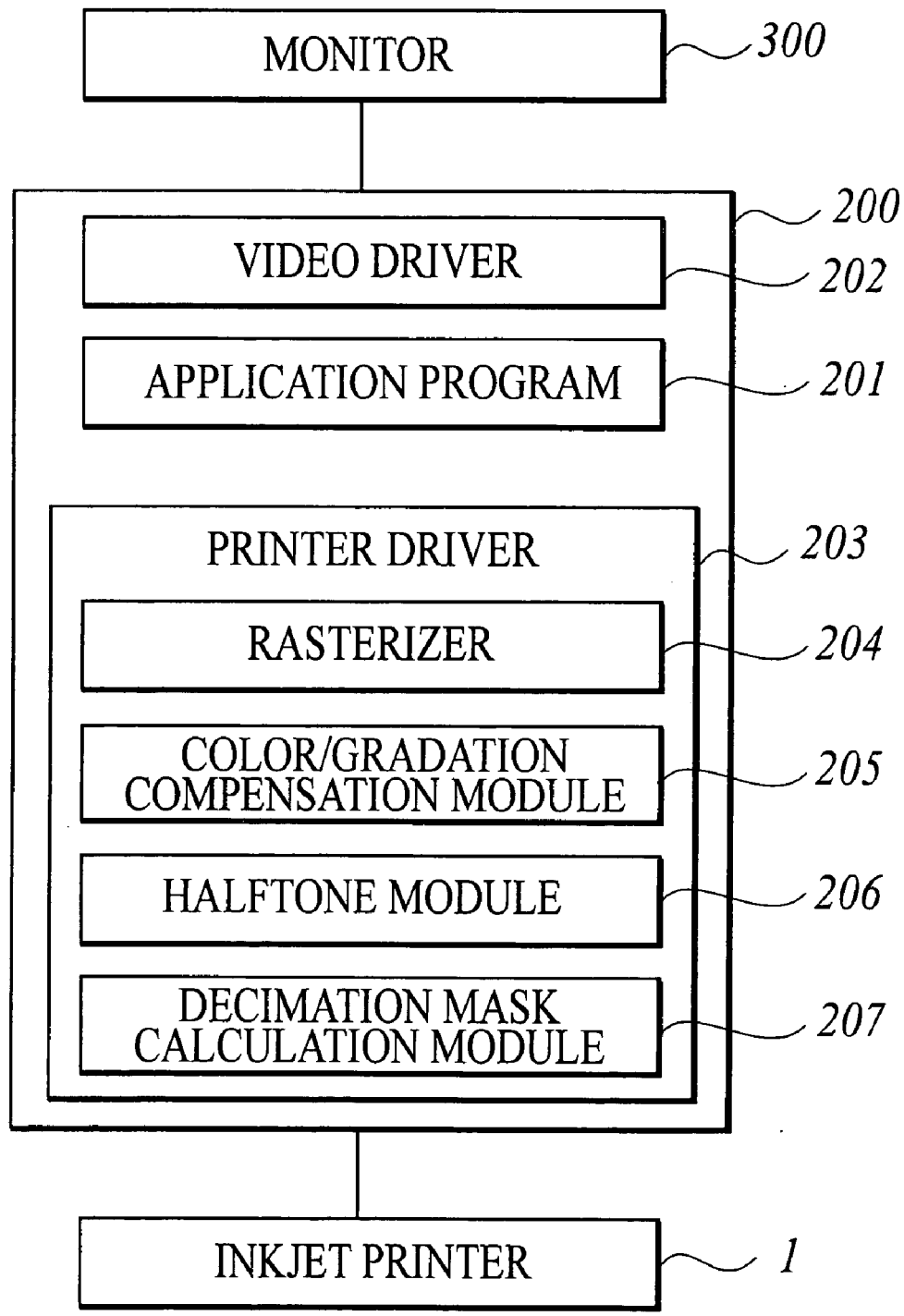
FIG. 5 is a block diagram representing a configuration of an image forming apparatus.

The control section 100 controls feeding of the recording medium, scanning of the carriage 23 and ink jetting of the recording head 22, and the like. As is shown in FIG. 4 and FIG. 5, an image forming apparatus 200 such as computer is connected. The image forming apparatus 200 forms an image with multiple colors based on input signals. In this instance, an application program 201 which operates inside the image forming apparatus 200 displays the image on a monitor 300 through a video driver 202 with processing the image. When this application program 201 puts an image formation direction in motion, the printer driver 203 of the image forming apparatus 200 receives image data for the image formation from the application program 201, and the image data are converted into signals capable of forming the image in the inkjet printer 1.

The printer driver 203 comprises a rasterizer 204 which converts the image data dealt in the application program 201 into image gradation data including color information of dot units, a color gradation compensation module 205 which compensates the image gradation data in accordance with color density property and gradation property of the inkjet printer 1, and a halftone module 206 which produces the image data of so-called halftone where a density at a certain area is expressed by the presence or absence of the recording inks at dot units from the image data after the color compensation. A module 207 which performs the thinning-out mask processing can be also incorporated in this printer driver. In that case, a mask setting can be changed depending on a type of the recording medium used for the printing, and thus more flexible control is possible than the processing in the printer. When the mask processing circuit 108 is used, the processing at the module 207 is not performed. Conversely, when the mask processing is performed at the module 207, the processing at the mask processing circuit 108 is not performed. Also, it is possible to download a mask pattern every printing from the image forming apparatus 200.

Next, multi-pass inkjet recording method is illustrated. As mentioned above, in the inkjet image recording, particularly when a color image picture is formed, various factors such as color density, gradation and uniformity are required. In particular, with respect to the uniformity, slight unevenness of nozzle units which occurs in difference of multihead fabricating influences jetting amounts and jetting directions of inks at respective nozzles, or strip-shaped unevenness occurs due to mechanical accuracy at movement of the recording medium, and as a result, becomes a cause which finally deteriorates image quality as uneven density of a printed image. Thus, in the present embodiment, to solve such problems, the color image is formed using the multi-pass inkjet recording method where the recording head 22 are scanned multiple times onto the same recording area of the inkjet recording medium.

As the multi-pass ink jet recording method, it is possible to use the method, for example, in JP-SHO 60-107975A. That method is illustrated by FIGS. 6A, 6B and 6C, and FIGS. 7A, 7B, and 7C.

This method shows the multihead 1101 is scanned three times to complete a printing area shown in FIGS. 8A, 8B and 8C, and FIGS. 9A, 9B and 9C and a half thereof, 4 pixel unit area is completed by scanning two times. In this case, 8 nozzles of the multihead are divided into upper 4 nozzles and lower 4 nozzles, and dots printed by scanning one nozzle once are those where defined image data are thinned-out to about a half according to given image data alignment. And at the second scanning, dots are filled in the image data of a remaining half to complete the printing in the 4 pixel unit area.

When using such a recording method, even if using the same one as the multihead shown in FIGS. 9A, 9B and 9C influences intrinsic for each nozzle on a printing image are reduced by half, and therefore, the printed image becomes like FIG. 6B, and black lines and white lines observed in FIG. 9B become indistinctive. Therefore, uneven density as shown in FIG. 6C is considerably alleviated compared to the case of FIG. 9C.

When such recording is performed, the image data are divided to offset one another of the certain alignment in the first scanning and the second scanning. Typically, as shown in FIGS. 7A, 7B and 7C it is the commonest to use one like staggered grids every vertical and horizontal one pixel as this image data alignment (thinning-out pattern).

Accordingly, in a unit printing area (here 4 pixel unit), the printing is completed by the first scanning where staggered grids are printed and the second scanning where inverse staggered grids are printed.

Figure 7A:
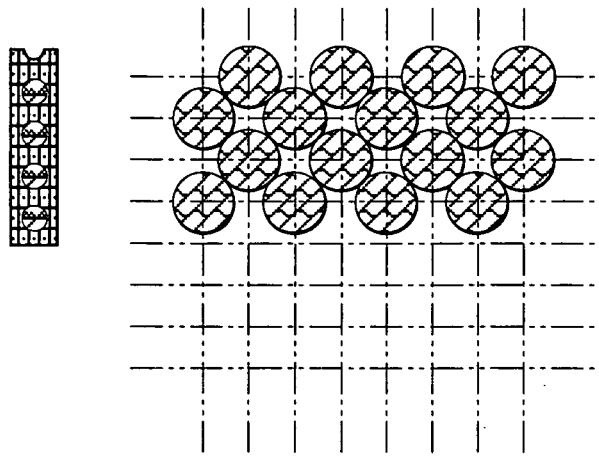
FIG. 7A to 7C are schematic diagrams representing one example of multi-pass printing jet recording methods.
Figure 7B:
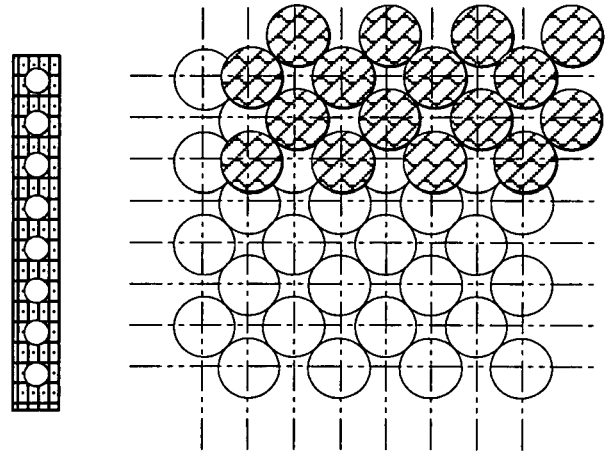
Figure 7C:
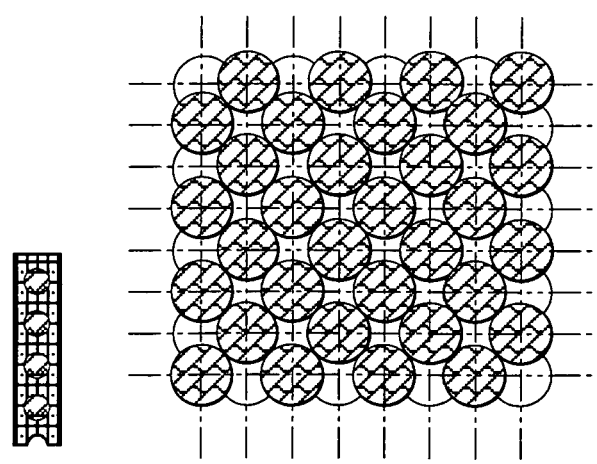

FIGS. 7A, 7B and 7C illustrate how the record in the given area is completed when these staggered and inverse staggered patterns are used, respectively using the multihead with 8 nozzles as with FIGS. 6A, 6B and 6C. First, in the first scanning, the recording of the staggered pattern (shaded circles) is performed using the lower nozzles (FIG. 7A). Next, in the second scanning, paper feeding is performed for 4 pixels (a half of a recording head length) and the recording of the inverse staggered pattern (white circles) is performed (FIG. 7B). Further, in the third scanning, the paper feeding is performed again for 4 pixels (a half of a recording head length) and the recording of the staggered pattern is performed (FIG. 7C).

This way, the recording area of 4 pixel unit every one scanning is completed by alternately performing the paper feeding of 4 pixel unit and the recording of the staggered or inverse staggered pattern in sequence. As illustrated above, it is possible to obtain high-quality image which uneven density is alleviated by completing the printing by the different two types of nozzles in the same area.

However, even when such multi-pass recording is performed, the above uneven density is not sometimes dissolved at all and new uneven density is sometimes affirmed particularly in halftone depending on duties. Such phenomena are illustrated below.

Typically, the image data to be recorded in a certain area, which the printer receives, have been already arrayed regularly. In the side of the recording apparatus, a definite amount of those data is stocked in buffer, new mask (image alignment pattern) of the staggered or inverse staggered pattern is given as is already illustrated, and the printing of that pixels is performed only when both the image data and pattern of the mask become an ON state.

Figure 12:
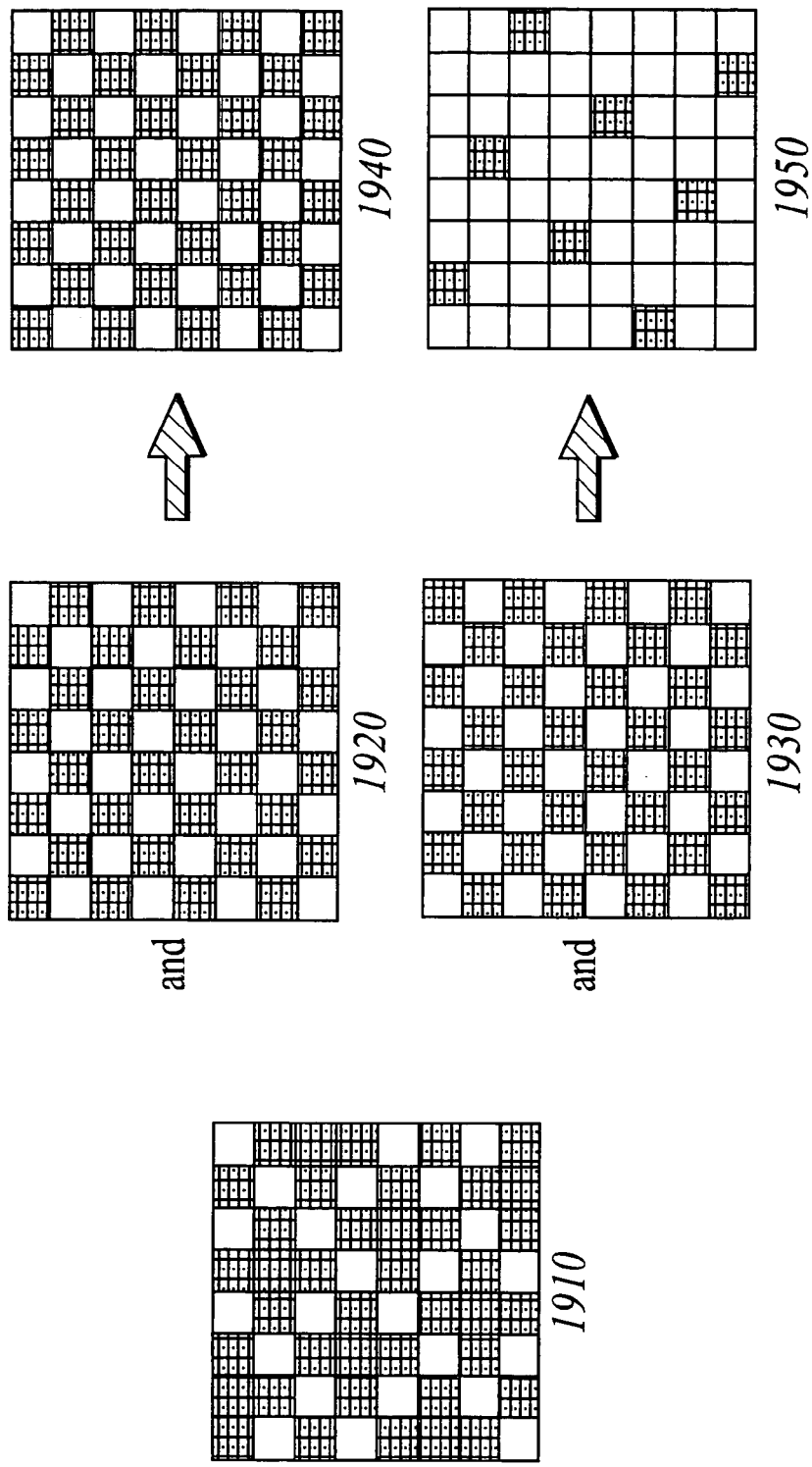
FIG. 12 is a schematic diagram showing a printing condition when arrayed image data in an increased duty were input.

FIGS. 10 to 12 illustrates these appearances. In FIG. 10, 1710 represents already arrayed data stocked in the buffer, 1720 represents the staggered pattern mask indicating pixels which allow the printing in the first scanning, 1730 represents the inverse staggered pattern mask indicating pixels which allow the printing in the second scanning, 1740 and 1750 represent the pixels printed in the first scanning and the second scanning, respectively.

In FIG. 10, the already arrayed data in the case where 25% printing is performed in a certain area are stocked in the buffer. These data uniformly retain the density in an assigned definite area, and thus, it is common that the printing data are disposed in a scattered state as possible. What image alignment these are is dependent on how area gradation method is performed at image processing before being transferred to the printer body. Those shown in 1710 are one instance of the image alignment for 25% data. When masks of 1720 and 1730 are given to such data and the printing is performed, as shown in 1740 and 1750, the data are allocated and recorded in a state where the data are divided equally in the first scanning and the second scanning, respectively.

However, as is shown in FIG. 11, when just 50% data come, it can be easily supposed that the data 1810 of image alignment in the most scattered state are completely coincided with either the staggered pattern mask (1820) or the inverse staggered pattern mask (1830).

When such a phenomenon occurs, the printing of all image data is terminated in the first scanning (1840) and the recording is not performed in the second scanning (1850) at all. Thus, all printing data are printed by the same nozzles. Therefore, the influences of nozzle dispersion are directly reflected upon the uneven density, and original purposes of the above division recording method are not accomplished.

FIG. 12 exhibits a printing state when arrayed image data at a higher duty state than FIGS. 10 and 11 are input. Also in this, it is found that the number of printing dots is considerably different in the first scanning and the second scanning. This way, there has been an adverse effect that the uneven density which has been improved at high duty of around 100% appears again for the data at low to around 50% duty.

When the thinning-out printing is performed using a specified mask pattern, the printing data and the mask pattern have sometimes the same cycle. Amplitude due to an allocation of the printing pixels and non-printing pixels on the mask pattern and an amplitude of the printing data are overlapped and vibrate sympathetically. Dot alignments of the image formed by this have a pattern with a certain orientation. Typically, this phenomenon is called a moire. This is easily remarkable and easily recognized by users when the images using the same mask pattern are in multiple lines. This moire heavily depends on periodicity of the mask pattern.

In addition to the above problems, the following problems occur when bidirectional printing is performed.

FIG. 13A exhibits a state where as the recording head jets an ink droplet on a smooth face of the recording medium at a constant speed v with moving in a forth or back direction at a constant speed V. If the face of the recording medium is smooth as in the figure and a distance d between the face of the recording medium and a nozzle face is constantly retained at a constant value, a dot printed in a forth route and a dot printed in a back route are formed on the same position by primarily adjusting a jet timing in the forth and back routes. However, when the face of the recording medium itself is lifted above an actual position as shown in FIG. 13B for some reason, the distance between the nozzle face and the face of the recording medium is shortened to d', and a time from jetting by the recording head to arrival of the ink droplet onto the face of the recording medium is shortened in both forth and back routes. Therefore, printed dots are formed on the positions out of the aimed position as shown in a lower figure. Likewise, when on the same image area, the distance d between the face of the recording medium and the nozzle face at printing in the forth route and the distance d between the face of the recording medium and the nozzle face at printing in the back route are changed due to local lifting of the paper, jetted positions are sometimes further separated.

Figure 14:
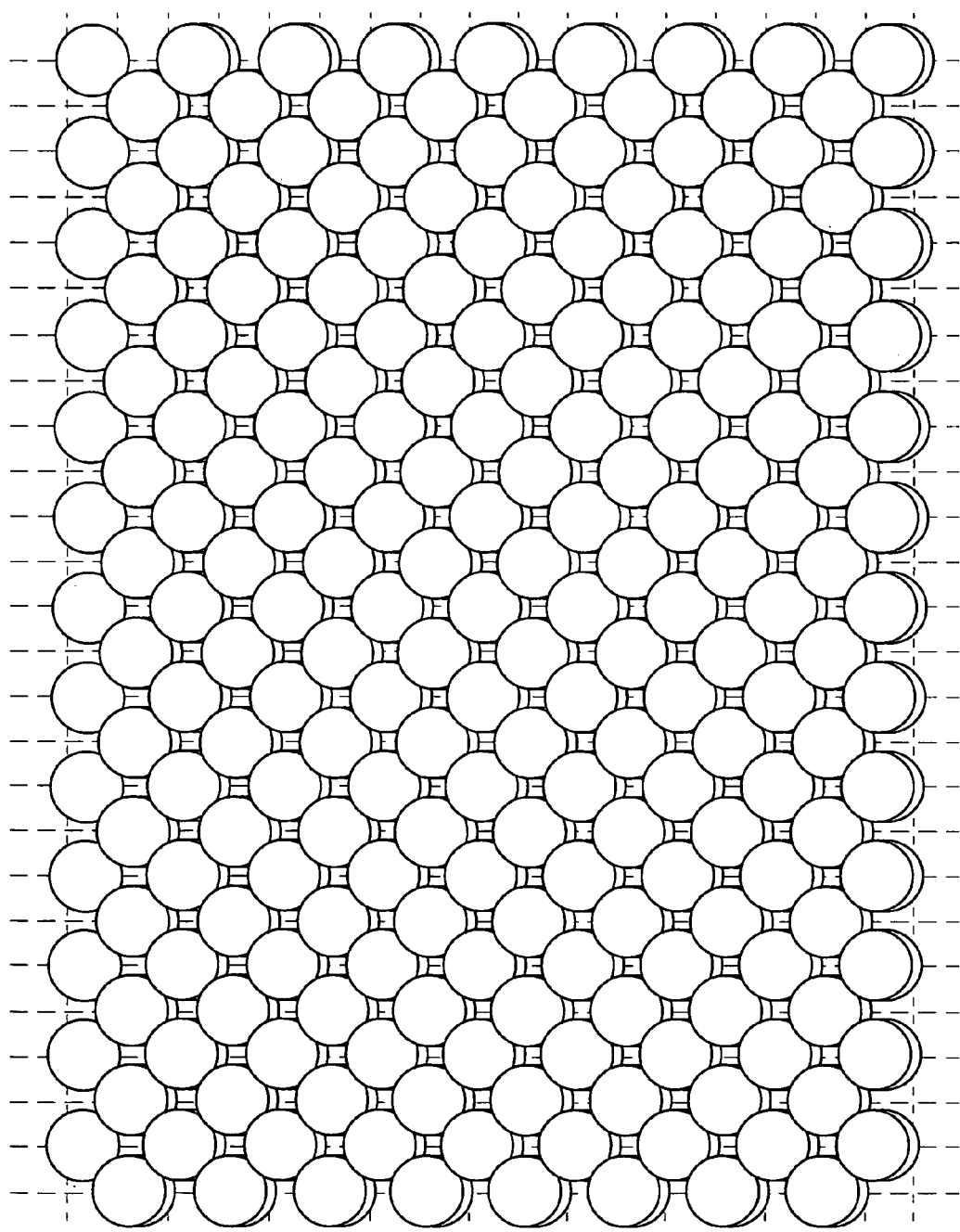
FIG. 14 is a schematic diagram showing a jetted dot condition when an image with 100% duty was bidirectionally printed using staggered thinning-out masks.

In such a state, when the image at duty of 100% is bidirectionally printed using the staggered thinning-out mask, a jetted dot state becomes one like FIG. 14. Here, the state where each dot is ¼ pixel out of a proper position is shown. Portions where adjacent dots are overlapped more than needs and portions where spaces between adjacent dots are excessively large appear in different allocations depending on the thinning-out mask. In FIG. 14, all dots are printed in an inverse direction of adjacent dots, and thus a space of one dot every one dot occurs and the state where the print density is entirely light occurs.

Such total displacement of jetted positions at the bidirectional printing occurs not only due to partial lows and highs of the face of the recording medium as shown in FIG. 13 but also due to various causes such as uneven jetting speed of the recording head 22 and uneven moving speed of the carriage. It is difficult to control the jet timing at the bidirectional printing because values of these factors are not constant for a traveling direction of the carriage. Also, the distance between the recording head 22 and the face of the recording medium in the recording apparatus is sometimes much different depending on individual apparatus, and thus control of jetting positions in the forth and back routes by adjustment of the jet timing has a limitation.

Due to the adverse effects described above, sufficient image quality is not always obtained with respect to the uneven density in the multi-pass recording using the regular thinning-out pattern which has been conventionally performed to compensate the variation of nozzles and the like. These adverse effects for the uneven density has the periodicity where unevenness alternately appears at a certain width of printing area, and thus it facilitates human visual sensation which recognizes as the uneven density.

The present inventors have found that the above issues occur when the regular mask pattern is used. Thus, in the present embodiment, the above problems are solved by performing the multi-pass recording using a thinning-out pattern without regularity, which defines an array of non-record pixel locations and record pixel locations, instead of using the regular mask pattern. As the thinning-out pattern without regularity, for example, it is possible to use a random pattern of a given size prepared using random numbers. Specifically, for example, as described in JP 3176182, multiple random mask patterns with a given size where non-recording pixels and recording pixels are randomly arrayed are produced, the produced random mask patterns can be used as masks for thinning out recording data as thinning-out patterns for each recording area.

By forming the printed image in accordance with such random mask patterns, to have pattern cycles on the thinning-out alignment can be inhibited, that is, the adverse effect of uneven density in the formed image which occurs in the conventional multi-pass recording method using the regular masks can be overcome by eliminating the periodicity of uneven density.

Also, in place of the random mask using such random numbers, a dot allocation pattern with so-called blue noise property may be used as the thinning-out pattern without regularity. This pattern has been developed for quantization processing of halftone. When a dither processing is performed using this pattern, there are characteristics that less low frequency component is contained in the produced dots and the image where a particle feel is reduced is obtained.

In order to perform the image formation according to the thinning-out pattern without regularity, the method is not limited to the method using the random mask using random numbers or the dot allocation pattern with the blue noise property, and the other similar patterns for forming the thinned-out image of the thinning-out pattern without regularity can be used.

Next, with respect to the method of performing the multi-pass recording using the masks without regularity as the above, the case where 4 scanning printing is performed using the dot allocation pattern with the blue noise property as the mask is illustrated below in reference to FIGS. 15 and 16.

In an actual figuration of the nozzles of the recording head 22 used for the recording, as shown in FIG. 3, nozzle rows of 128 nozzles arranged at a pitch of 600 dpi are disposed in the main scanning direction at a distance of 500 μm.

Figure 17:
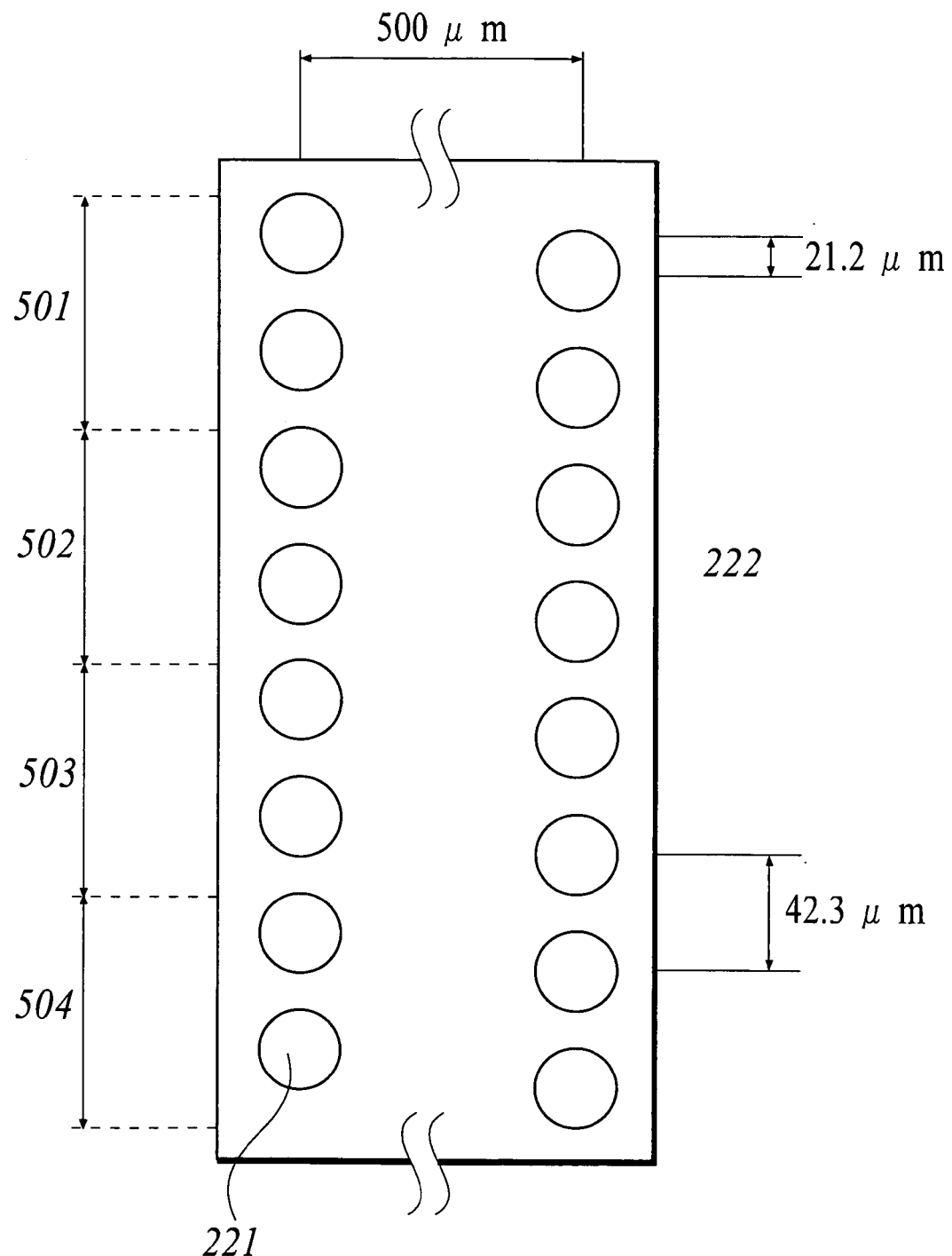
FIG. 17 is a schematic diagram showing one examples of nozzle alignments corresponding to mask patterns.

Hereinafter, to simplify the illustration of the multi-pass recording, the nozzles were 16 per color, this was divided into 4 to make a nozzle number per divided area 4, and a mask size corresponding to it was made 4×16. The divided areas corresponding to this are shown as 501 to 504 in FIG. 17. The 4 scanning printing is realized by making use of the respective divided areas 501 to 504 separately.

In each scanning, a thinning-out mask pattern with about 25% duty, thus, the mask pattern where a printing acceptable rate is about 25% is set for the printing data for each divided area, and a 100% image is made by scanning 4 times. A1 to A4 which are examples of the 4×16 mask patterns used for this are shown in FIG. 15. In each mask pattern A1 to A4, the mask data exist at a position on grids shown by a mesh pattern in the figure, and the mask patterns are configured such that the mask data fill all grids of 4×16 when the respective mask patterns A1 and A4 are overlaid.

Figure 15:
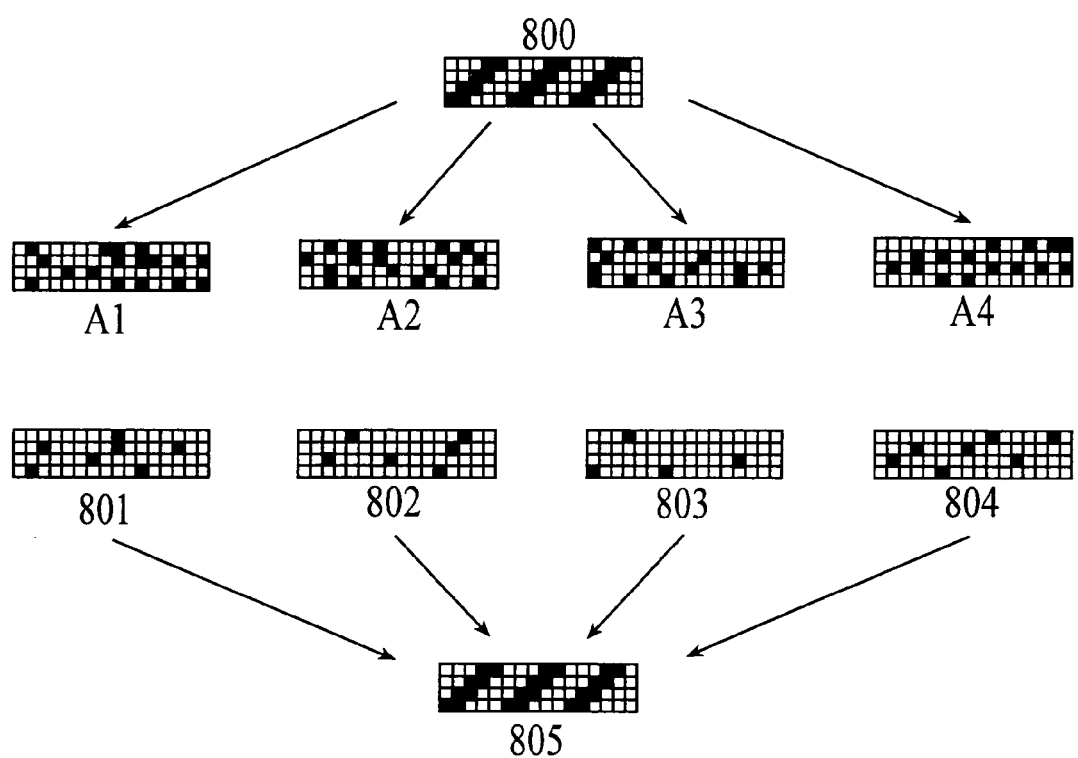
FIG. 15 is a schematic diagram showing one example of methods of performing multi-pass recording using masks without regularity.

For the printing data 800 (hatching portions indicate that there are the printing data) shown in FIG. 15, the above mask patterns A1 to A4 are set. Here, a logical add at the same position of the printing data 800 and each mask pattern A1 to A4 is taken by making the presence of printing data 1 and making the absence of data 0 for the printing data 800 and making the presence of mask data 1 and making the absence of the data 0 for the mask patterns A1 and A4, and jetted data 801 to 804 of the recording heads are produced, respectively. When the 4 jetted data 801 to 804 are overlaid, the same printed image 805 as the original printing data 800 is formed.

Figure 16:
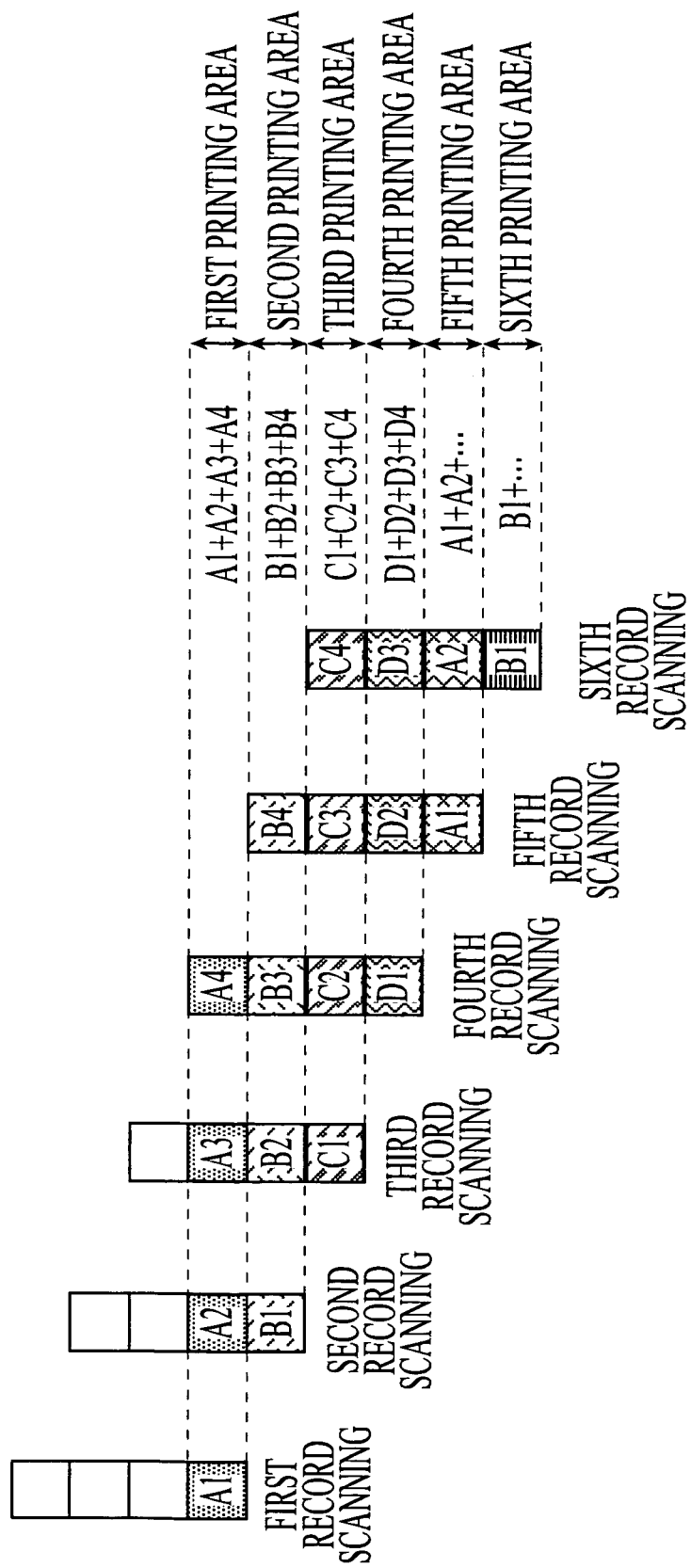
FIG. 16 is a schematic diagram showing another example of methods of performing multi-pass recording using masks without regularity.

FIG. 16 is a view for illustrating the multi-pass printing. Four types of mask data groups of a group of A1 to A4, a group of B1 to B4, a group of C1 and C4 and a group of D1 and D4 are used as one cycle of 4 pass. The pattern in each group is the pattern such that a 100% image is completed when four are overlaid in any cases. In the multi-pass printing, such setting of the mask data is performed in each divided area 501 to 504 of the recording head 22 in each scanning.

Print is performed as follows.

In the first printing area on a print image, the mask pattern A1 is set for the divided area 504 of the recording head 22 and the recording is performed in the first scanning. Subsequently, in the second scanning, in the first printing area, the mask pattern A2 is used for the divided area 503 of the recording head 22, and in the second printing area, the print is performed using the mask pattern B1, of which the group is different from that of the mask pattern used in the first printing area, for the divided area 504 of the recording head 22.

Further, in the third scanning, the print is performed using the mask pattern A3 for the divided area 502 of the recording head in the first printing area, the mask pattern B2 for the divided area 503 of the recording head in the second printing area, and the mask pattern C1, of which the group is different from those of the mask patterns A3 and B2, for the divided area 504 of the recording head in the third printing area.

And in the fourth scanning, the print is performed using the mask pattern A4 for the divided area 501 of the recording head in the first printing area, the mask pattern B3 for the divided area 502 of the recording head in the second printing area, the mask pattern C2 for the divided area 503 of the recording head in the third printing area, and the mask pattern D1, of which the group is different from those of the mask patterns A4, B3 and C2, for the divided area 504 of the recording head in the fourth printing area. At that time, in the first printing area, total four times of scanning are performed using 4 mask patterns, A1, A2, A3 and A4, and the image print for this area is completed.

By the same procedure, the image formation is made using mask pattern B1, B2, B3 and B4 in the second printing area, using mask pattern C1, C2, C3 and C4 in the third printing area, and using mask pattern D1, D2, D3 and D4 in the fourth printing area. Subsequently, the printing is continued by repeatedly making use of the printing using mask pattern A1, A2, A3 and A4 in the fifth printing area and mask pattern B1, B2, B3 and B4 in the sixth printing area, and the patterns of these 4 groups.

Also, as is shown in FIG. 18, these patterns are four mask patterns each having the blue noise property when the patterns are respectively aligned from the upper in sequence of A4B3C2D1, B4C3D2A1, C4D3A2B1 and D4A3B2C1 to configure four 16×16 masks. These four 16×16 masks are those where 0 to 255 are disposed on 16×16 grids to have the blue noise property and the portions corresponding to the values of 0 to 63, 64 to 127, 128 to 191 and 192 to 255 are used as recording acceptable pixels. Those where these four masks are divided into four 4×16 correspond to A1 to A4, B1 to B4, C1 to C4 and D1 to D4. How to make such patterns is described in, for example, JP 2622429.

This way, when the blue noise property is given to the dot pattern itself formed by one scanning, there are effects that occurrence of the repeated pattern and particulate deterioration are reduced compared to the case using the patterns produced by the random numbers. This is described in, for example, Tokukai2002-96461.

If the acceptable printing rate of the mask is changed, the mask after change can be easily obtained by changing the values of these 0 to 255 depending on a printing rate. For example if making two pairs of 40% and 10% masks, the masks could be made by making the pixels corresponding to 0 to 102, 103 to 127, 128 to 230 and 231 to 255 the printing acceptable pixels, respectively. Examples of such masks are shown in FIGS. 19 to 21.

Figure 22:
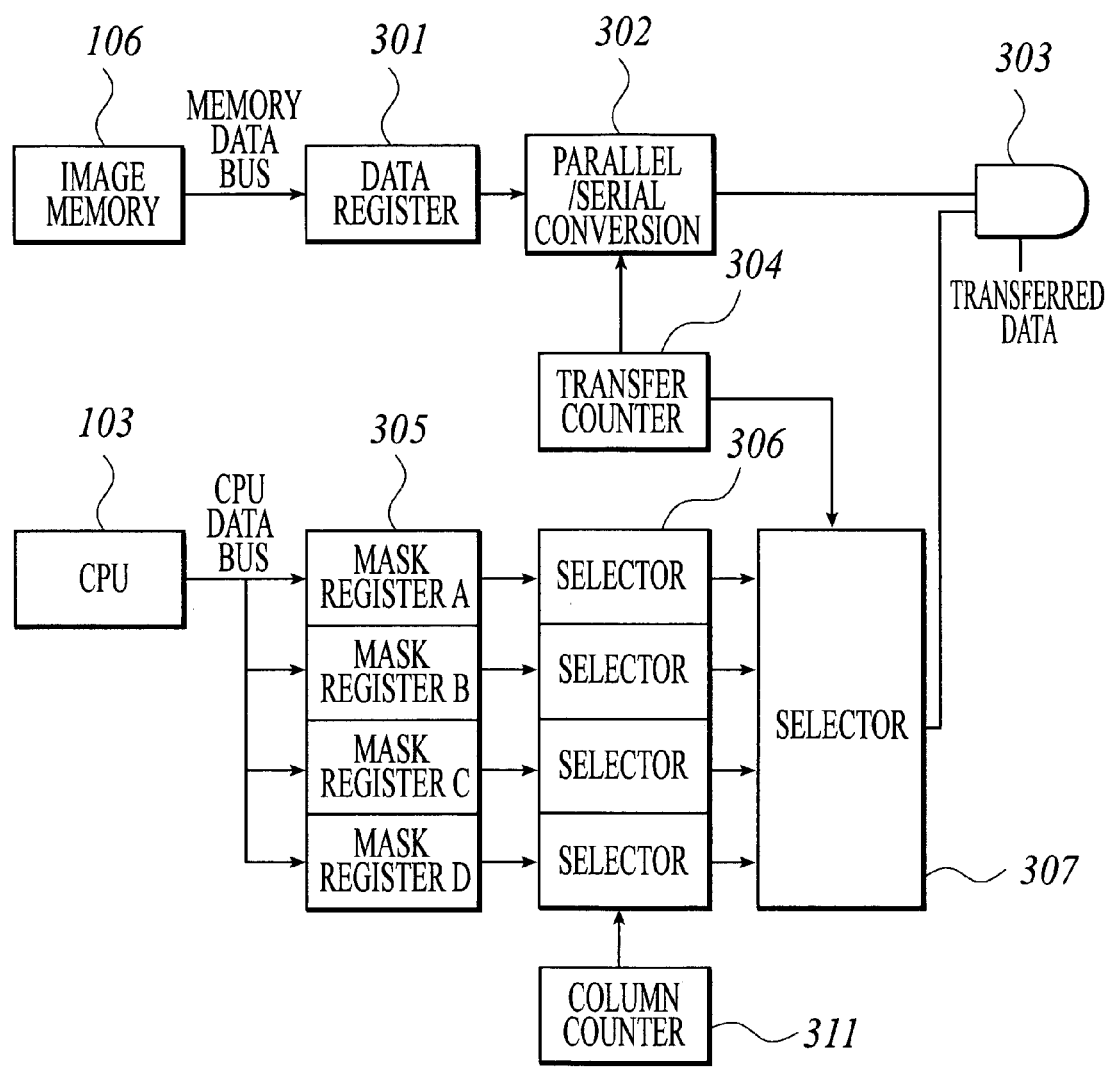
FIG. 22 is a block diagram showing one example of mask processing circuits.

FIG. 22 is a block diagram showing a configuration of the mask processing circuit, and illustrates the mask processing circuit 108 in FIG. 4 in detail. In FIG. 22, 301 is a data register connected to a memory data bus, for reading out the printing data accumulated in an image memory 106 in a memory and temporarily storing, 302 is a parallel/serial converter for converting the data stored in the data register 301 into serial data, 303 is an AND gate for applied the masks to the serial data, and 304 is a counter for managing data transfer numbers.

The reference numeral 305 is a register connected to CPU 103 through CPU data bus, for storing the mask patterns, 306 is a selector for selecting a digit position of the mask pattern, 307 is a selector for selecting a line position of the mask pattern, and 311 is a counter for managing the digit position.

In a transfer circuit shown in FIG. 22, a serial transfer of printing data to the recording head 22 is performed by printing command signals sent from the CPU 103. The printing data accumulated in the image memory 106 in the memory are temporarily stored in the data register 301, and converted into the serial data by the parallel/serial converter 302. The masks are applied to the converted serial data by the AND gate 303, and subsequently the data are transferred to the recording head 22 head. The transfer counter 304 counts a transfer bit number and transfers the data for 16 nozzles.

A mask register 305 is configured by four mask registers, A, B, C and D, mask patterns written by the CPU 103 are housed. Each mask register stores the mask pattern of vertical 16 bits and horizontal 16 bits. A selector 306 selects mask pattern data corresponding to a digit position by making a value of a column counter 111 a selection signal. Also, the selector 307 selects mask pattern data corresponding to a line position by making a value of a transfer counter 304 a selection signal. The masks are applied to the transfer data using the AND gate 303 by the mask pattern data selected by the selectors 306 and 307.

These data are used for injection control of each nozzle of the recording head 22, and an injection is performed by synchronizing with timing signals produced from encoder signals. Hereinafter, these operations are performed in conformity with printing resolution toward to a width direction of the recording medium. In this embodiment, a mask size is 16 in a horizontal direction, and thus, the same mask pattern is repeatedly used every 16 pixels, but it is also possible to make the size in the horizontal direction of the mask the same size as the width of the recording medium. As the present embodiment, it is possible to reduce a capacity of the register which memorizes the masks by repeatedly using the same mask pattern.

In the inkjet recording method and the inkjet recording apparatus of the present embodiment, it is one of characteristics that a nozzle pitch of the recording head is from 10 to 50 µm. If the nozzle pitch is 50 µm or less, when jetted ink droplets are printed side by side one another, the distance between the droplets becomes short, and thus a problem of bronzing by adjacent dots one another easily occurs. Therefore, effects by applying the invention to the case that the nozzle pitch is 50 µm or less are great. Besides, by making the nozzle pitch short such as 50 µm or less, even when multiple nozzles which exceed 500 nozzles per recording head are made, it is possible to keep an entire recording head length short. This can suppress jetted ink out of the position on the recording medium attributed to a change of a flying distance of the ink droplet from the nozzle in a recording head length direction due to a slope between the recording medium surface and the nozzle face, and thus it is possible to retain high printing accuracy. By making the nozzle pitch 10 μm or more, it is possible to suppress disturbance in fabrication aptitude, and consequently, it is possible to suppress the jetted ink out of the position, make it suppress to cause an overlap of dots due to shortening of dot intervals in the recording head length direction, and suppress the problem such as bronzing.

The nozzle pitch referred to here is a separation distance of mutual nozzles in the nozzle group arranged nearly in a line. As FIG. 3, in the case where two rows of the nozzle groups are arranged by shifting at a half pitch, when adjacent dots in a sub scanning direction on the recording medium are formed by nozzles of an A row and a B row, a certain time difference occurs. When the distance between the A row and the B row is relatively long, after a dot which previously adheres is absorbed into the recording medium, then next dot adheres, and thus it is difficult to cause the bronzing due to the aggregation of ink. This way, when the distance between the A row and the B row is relatively long, the nozzle pitch is a pitch in each A row and B row. On the other hand, when the distance between the A row and the B row is relatively short, the nozzle pitch is the distance between adjacent nozzles between the A row and the B row, and typically a half of the pitch in each A row and B row.

Thus, in the invention, when the distance between the most separate nozzle rows (distance between N1 and Nn, i.e., in the case of three rows, the distance between the first row and the third row) of multiple rows (n rows such as N1, N2 . . . Nn) of the nozzle groups is 4 mm or less, the nozzle pitch is 1/n of the pitch in each row, whereas when the distance is more than 4 mm, the nozzle pitch is the pitch in each row because it is preferable to consider influences for aggregation.

In the inkjet recording method of the invention, it is preferred that a printing acceptable rate by the thinning-out pattern is from 15 to 35%. Here, in the invention, the printing acceptable rate is a rate of dot number where jetting of the ink is acceptable in one main scanning based on total dot number in the pattern when using the thinning-out pattern.

When the printing is performed using multiple thinning-out patterns different in printing acceptable rate in one image, the image quality of the image after the printing is frequently attributed to the thinning-out pattern with high printing acceptable rate. Therefore, in the invention, when the multiple thinning-out patterns different in printing acceptable rate are used in one image, the acceptable rate of the thinning-out pattern with the highest printing acceptable rate in the thinning-out patterns used in one image is the printing acceptable rate.

By making the printing acceptable rate by the thinning-out pattern 15% or more, the probability that the jetted ink droplets are printed side by side one another becomes high, and therefore the effects obtained by applying the properties of the inks, the medium and the recording method of the invention are great. Thus, by applying the invention, the high-quality images with less bronzing can be obtained. On the other hand, by making the printing acceptable rate 35% or less, in the portions where adhering liquid amounts are large such as red, blue and dark grey, the high quality images can be obtained.

It is preferred that a dot size formed by the ink jetted from the recording head 22 is from 10 to 50 μm on the recording medium. By making the dot size formed by the ink 10 μm or more, it is possible to maintain a printing efficiency at a certain level or more, and accurately control an ink droplet size. Also, by making it 50 μm or less, it is possible to suppress the bronzing due to the ink droplets one another printed side by side, and obtain the images at high definition.

Next, the inks of the invention are illustrated.

The ink of the invention contains pigments, at least one organic solvent with high boiling point and water, a surface tension is from 30 to 50 mN/m, and the pigments are dispersed by a polymeric dispersant.

As the pigments which can be used for the invention, it is possible to use colored organic or colored inorganic pigments known in the art. For example, azo pigments such as azo lake, insoluble azo pigments, condensed azo pigments and chelate azo pigments, polycyclic pigments such as phthalocyanine pigments, perylene pigments, anthraquinone pigments, quinacridone pigments, dioxazine pigments, thioindigo pigments, isoindolinone pigments and quinophthalone pigments, dye lakes such as basic dye lake and acid dye lake, organic pigments such as nitro pigments, nitroso pigments, aniline black and daylight fluorescent pigments, and inorganic pigments such as carbon black are included but the invention is not limited thereto.

Specific organic pigments are exemplified below.

As the pigments for magenta or red, for example, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. Pigment Red 222, C.I. Pigment Violet 19 and the like are included.

As the pigments for orange or yellow, for example, C.I. Pigment Orange 31, C.I. Pigment Orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138 and the like are included.

As the pigments for green or cyan, for example, C.I. Pigment Blue 15, C.I. Pigment Blue 15:2, C.I. Pigment Blue 15:3, C.I. Pigment Blue 16, C.I. Pigment Blue 60, C.I. Pigment Green 7 and the like are included.

Also, as the pigments for black, for example, C.I. Pigment Black 1, C.I. Pigment Black 6, C.I. Pigment Black 7 and the like are included.

As dispersing method of the pigments, for example, it is possible to use various dispersing machines such as a ball mill, sand mill, attritor, roll mill, agitator, Henschel mixer, colloid mill, ultrasonic homogenizer, pearl mill, wet jet mill and paint shaker. Also, it is preferable to use a centrifuge or use a filter for the purpose of eliminating crude particle contents in a pigment dispersion.

In the ink of the invention, it is one of the characteristics to use a polymeric dispersant for the dispersion of the pigments. The polymeric dispersant of the invention is not particularly limited, and a water-soluble resin or a water-insoluble resin is used. As these polymeric molecules, it is possible to include polymers made up of a single monomer or copolymers made up of two or more monomers selected from styrene, styrene derivatives, vinylnaphthalene derivatives, acrylic acid, acrylate derivatives, methacrylic acid, methacrylate derivatives, maleic acid, maleate derivatives, itaconic acid, itaconate derivatives, fumaric acid and fumarate derivatives, and salts thereof. Also, it is possible to use water-soluble polymeric molecules such as polyvinyl alcohol, polyvinyl pyrrolidone, cellulose derivatives, gelatin, and polyethyleneglycol.

It is preferred that these polymers have both a hydrophilic moiety and a hydrophobic moiety. The hydrophilic moiety has a function to stabilize the dispersion in water which is a major component of the ink, whereas the hydrophobic moiety has a function to enhance adhesion onto pigment surfaces. Among others, acryl type polymeric dispersants are preferably used in terms of the characteristics such as easiness of molecular structure design and easiness to obtain a performance as the dispersant. The acryl type polymeric dispersant is referred to the polymeric dispersant containing an acryl type monomer at least at 30 mol % or more.

As such an acryl type polymeric dispersant, polymers made up of the hydrophobic monomer and hydrophilic monomer shown below, or copolymers made up of two or more of the monomers, and salts thereof are preferable. The hydrophobic monomers include but are not limited to, for example, styrene, α-methylstyrene, methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, hydroxyethyl acrylate, hydroxypropyl acrylate, acrylonitrile, 2-trimethylsiloxyethyl acrylate, glycidyl acrylate, p-tolyl acrylate, sorbyl acrylate, benzyl acrylate, benzyl methacrylate, 2-phenylethyl methacrylate and the like.

As the hydrophobic monomer, styrene, methyl methacrylate, butyl methacrylate, 2-ethylhexyl methacrylate, benzyl methacrylate, 2-phenylethyl methacrylate, or benzyl acrylate is particularly preferable.

The hydrophilic monomers include, but are not limited to, for example, methacrylic acid (MAA), acrylic acid, maleic acid, dimethylaminoethyl methacrylate (DMAEMA), diethylaminoethyl methacrylate, tert-butylaminoethyl methacrylate, dimethylaminoethyl acrylate, diethylaminoethyl acrylate, dimethylaminopropyl methacrylamide, methacrylamide, acrylamide, dimethyl acrylamide and the like.

As the hydrophilic monomer, methacrylic acid acrylic acid or dimethylaminoethyl methacrylate is preferable.

A polymeric molecule containing an acid is manufactured directly from an unsaturated acid or manufactured from a blocked monomer having a blocking group which can be eliminated after polymerization. As examples of the blocked monomer which produces acrylic acid or methacrylic acid after eliminating the blocking group, trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, 2-tetrahydropyranyl methacrylate and the like are included.

Structures of these polymers include random polymer or random copolymer, block copolymer, branched polymer or copolymer, graft polymer or copolymer. Among others, the block copolymer and the branched copolymer are preferable for the object of the invention because the design and control of the hydrophilic and hydrophobic moieties are easy.

The block copolymers include structures such as AB, BAB and ABC types (here, A, B and C schematically represent high molecular blocks different in structure one another), but there is no restriction of the structure so long as the block moiety is present. Particularly, the block copolymer having a hydrophobic block and a hydrophilic block or having a balanced block size which contributes to dispersion stability is preferable. A functional group can be incorporated in the hydrophobic block (block to which a coloring agent is bound) thereby improving the dispersion stability, and thus a specific interaction between the dispersant and the coloring agent is further enforced.

These polymers can be synthesized by conventionally known in the art, and can be synthesized particularly by the methods disclosed in the specification of U.S. Pat. Nos. 5,085,698, 5,221,334, 5,272,201, 5,519,085 and 6,117,921, and the examples in JP HEI 10-279873A, 11-269418A, JP 2001-115065A, 2001-139849A, 2001-247796A and 2003-260348A.

As the hydrophobic monomers which can be used for the block copolymer, for example, it is possible to include the same monomers as the hydrophobic monomers which can be used for the acryl type polymeric dispersant.

As the hydrophobic monomers, methyl methacrylate, butyl methacrylate, 2-ethylhexyl methacrylate, benzyl methacrylate, 2-phenylethyl methacrylate, or benzyl acrylate is particularly preferable. As the hydrophobic high molecular block, the polymer made up of the above single monomer or the copolymer block made up of two or more monomers is preferable.

As the hydrophilic monomers which can be used for the block copolymer, for example, it is possible to include the same monomers as the hydrophilic monomers which can be used for the acryl type polymeric dispersant.

The hydrophilic monomer is preferably methacrylic acid, acrylic acid or dimethylaminoethyl methacrylate, and as the hydrophilic polymer high molecular block, the polymer made up of the above single monomer or homopolymer and copolymer made up of two or more of the monomers are preferable.

As the monomers which can be used for the branched polymer or copolymer and the graft polymer or copolymer, it is possible to use those included as the monomers which can be used for the above block copolymer. The branched polymer or copolymer and the graft polymer or copolymer can be easily synthesized by using a macromer having a polymerizable functional group at one end, for example, silicone macromer, styrene type macromer, polyester type macromer, polyurethane type macromer or polyalkylether macromer. As examples of the above macromer, styrene macromers AS-6 and AN-6 supplied from Toagosei Co., Ltd., silicone macromers FM-0711 and FM-0721 supplied from Chisso Corporation, polyethyleneglycol and polyethyleneglycol methacrylate and the like are included.

A weight average molecular weight of these polymeric molecules is preferably in the range of 1,000 to 30,000, and more preferably in the range of 1,500 to 15,000. An acid value is preferably in the range of 10 to 500, and more preferably in the range of 50 to 250.

In the ink of the invention, a pigment dispersant known in the art, for example, surfactants such as higher fatty acid salts, alkyl sulfate salts, alkyl ester sulfate salts, alkyl sulfonate salts, sulfosuccinate salts, naphthalene sulfonate salts, alkyl phosphate salts, polyoxyalkylenealkylether phosphate salts, polyoxyalkylenealkylphenyl ether, polyoxyethylenepolyoxypropyleneglycol, glycerin ester, sorbitan ester, polyoxyethylene fatty acid amide and amine oxide may be combined along with the above polymeric dispersant.

In the aqueous ink of the invention, a volume average particle size of a pigment dispersion is preferably from 20 to 200 nm in terms of obtaining preferable color tone, high print density or good gloss, and more preferably from 40 to 140 nm in terms of additionally improving light resistance.

In the invention, the volume average particle size of the pigment dispersion can be obtained by a commercially available particle size measuring instrument using a light scattering method, electrophoresis, a laser Doppler method and the like, and as a specific particle size measuring instrument, for example, it is possible to include Zetasizer 1000HS supplied from Malvern Instruments.

The water-soluble organic solvents which can be used in the invention specifically include alcohols (e.g., methanol, ethanol, propanol, isopropanol, butanol, isobutanol, secondary butanol, tertiary butanol, pentanol, hexanol, cyclohexanol, benzyl alcohol, etc.), polyvalent alcohols (e.g., ethyleneglycol, diethyleneglycol, triethyleneglycol, polyethyleneglycol, propyleneglycol, dipropyleneglycol, polypropyleneglycol, butyleneglycol, hexanediol, pentanediol, glycerin, hexanetriol, thiodiglycol, etc.), polyvalent alcohol ethers (e.g., ethyleneglycol monomethylether, ethyleneglycol monoethylether, ethyleneglycol monobutylether, ethyleneglycol monophenylether, diethyleneglycol monomethylether, diethyleneglycol monoethylether, diethyleneglycol monobutylether, diethyleneglycol dimethylether, propyleneglycol monomethylether, propyleneglycol monobutylether, ethyleneglycol monomethylether acetate, triethyleneglycol monomethylether, triethyleneglycol monoethylether, triethyleneglycol monobutylether, triethyleneglycol dimethylether, dipropyleneglycol monopropylether, tripropyleneglycol dimethylether, etc.), amines (e.g., ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine, etc.), amides (e.g., formamide, N-N-dimethylformamide, N,N-dimethylacetamide, etc.), heterocycles (e.g., 2-pyrrolidone, N-methyl-2-pyrrolidone, N-cyclohexyl-2-pyrrolidone, 2-oxazolidone, 3-dimethyl-2-imidazolidinone, etc.), sulfoxides (e.g., dimethylsulfoxide, etc.), sulfones (e.g., sulforane, etc.), sulfonate salts (e.g., sodium sulfonate salt, etc.), acetonitrile, acetone, and the like.

In the ink of the invention, among the above water-soluble organic solvents, it is one of the characteristics to contain the organic solvent with high boiling point where the boiling point under atmospheric pressure is 150° C. or above, which is one of preferred aspects in terms of color tone and dispersion stability. Specific examples of the organic solvent with high boiling point include alcohols such as ethyleneglycol, propyleneglycol, diethyleneglycol, triethyleneglycol, glycerin, diethyleneglycol monomethylether, diethyleneglycol monobutylether, triethyleneglycol monobutylether, glycerin monomethylether, 1,2,3-butanetriol, 1,2,4-butanetriol, 1,2,4-pentanetriol, hexanetriols (e.g., 1,2,6-hexanetriol, 1,2,3-hexanetriol, etc.), thiodiglycol, triethanolamine and polyethyleneglycol (average molecular weight is about 300 or less).

In the ink of the invention, it is preferred that a content of the above water-soluble organic solvent is from 10 to 50% by mass in terms of being capable of obtaining the image where injection stability is good and print density is high and having a preferable gloss.

At least one of the inks of the invention preferably contains the compound represented by the above general formula (I), and more preferably the compound represented by the general formula (I) is urea or a urea derivative.

In the ink of the invention, by containing the compound represented by the general formula (I), it is possible to prevent aggregation of pigment particles in a jetted ink droplet on the medium. Consequently, it is possible to suppress occurrence of bronzing, and thus it is preferable.

In the above general formula (I), $R_1$ represents a hydrogen atom, a substituted or unsubstituted alkyl group (e.g., methyl, ethyl, isopropyl, t-butyl, hexyl, dodecyl, cycloalkyl groups, etc.), a substituted or unsubstituted alkenyl group (e.g., propenyl, butenyl, nonenyl groups, etc.), a substituted or unsubstituted aryl group (e.g., phenyl group, etc.), a substituted or unsubstituted acyl group (e.g., acetyl, propionyl, butanoyl, hexanoly, cyclohexanoyl, benzoyl, pyridinoyl, etc.), a substituted or unsubstituted heterocyclic group (e.g., pyridyl, tiazolyl, oxazolyl, imidazolyl, fulyl, pyrrolyl, pyrazinyl, pyrimidinyl, pyridazinyl, selenazolyl, sulfolanyl, pyperidinyl, pyrazolyl, tetrazolyl, etc.), $NR_4R_5$ or $OR_6$. $R_2$ to $R_6$ are the same as defined $R_1$. $R_1$ and $R_2$, or $R_1$ and $R_3$ may be bound one another to from a ring. X represents an oxygen atom or NH.

In the invention, it is preferred that the compound represented by the general formula (I) has no alcoholic hydroxyl group in terms of exerting the object effects of the invention.

In the general formula (I), the molecular weight is preferably 200 or less, an atom number except the hydrogen atom is preferably 15 or less, and the compound is preferably water-soluble in terms of addition easiness.

Compound examples represented by the general formula (I) of the invention are listed below, but the invention is not limited thereto.

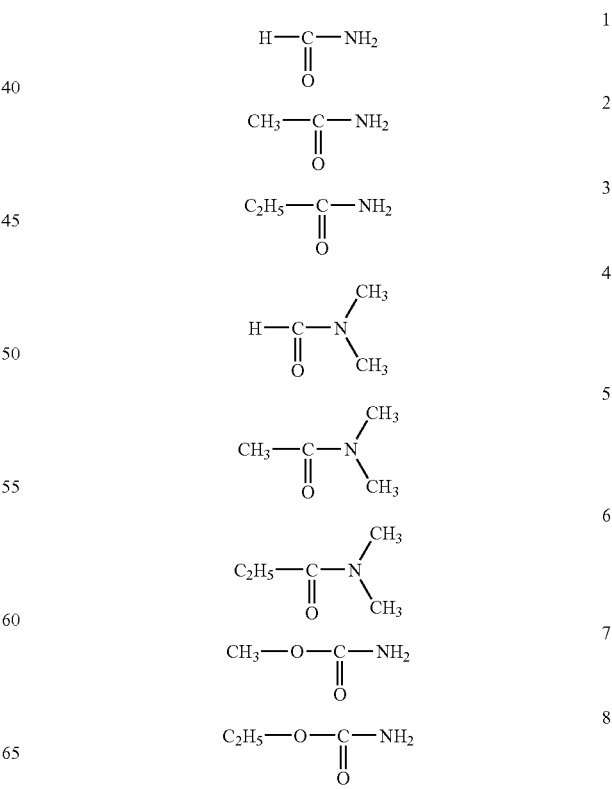

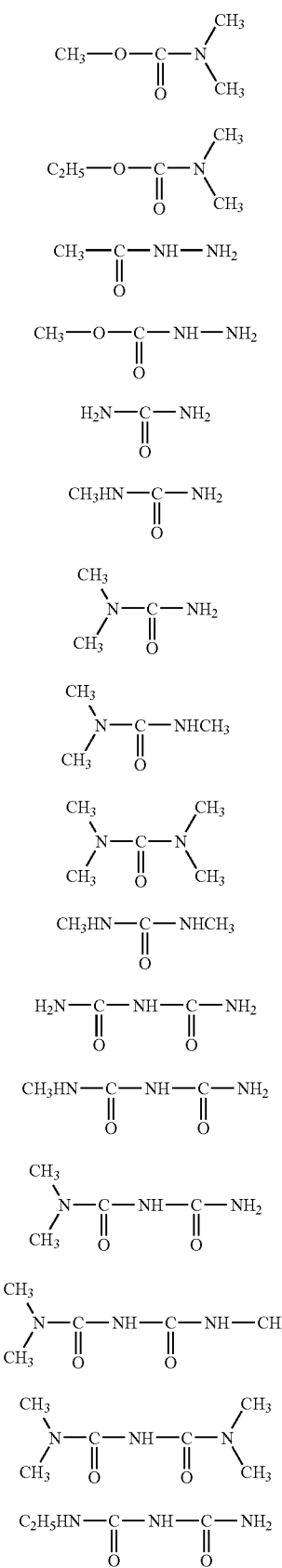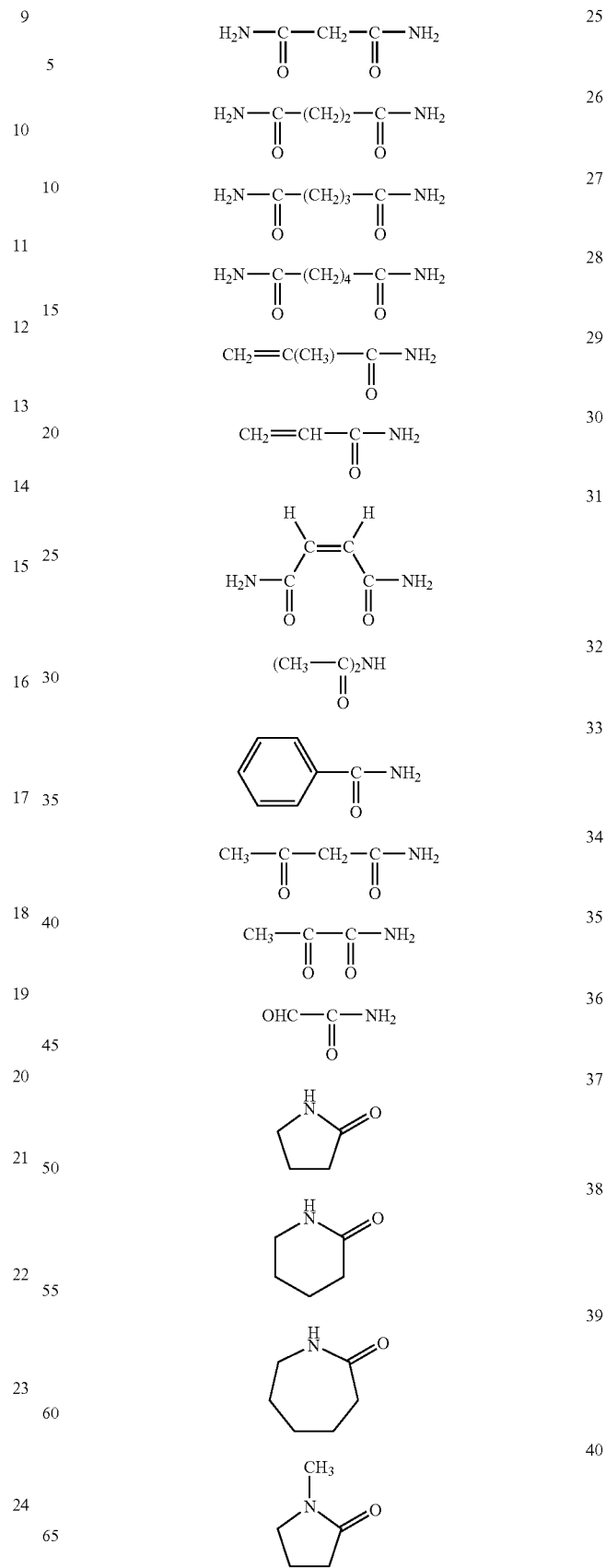

-continued

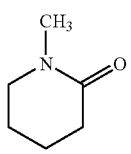
41

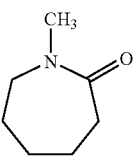
42

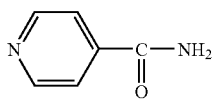
43

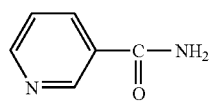
44

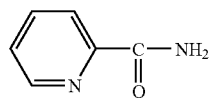
45

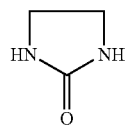
46

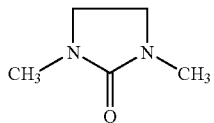
47

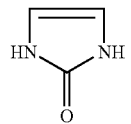
48

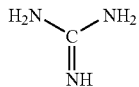
49

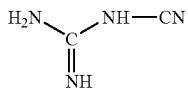
50

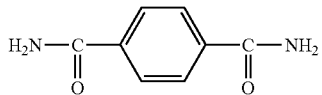
51

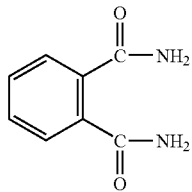
52

The compound represented by the general formula (I) of the invention can be easily synthesized of the methods known by those skilled in the art, and can be obtained as commercially available articles.

In the ink of the invention it is preferred that the compound represented by the general formula (I) is urea or a derivative thereof.

In the aqueous ink of the invention, the content of the compound represented by the general formula (I) is preferably from 1 to 20% by mass in terms of being capable of obtaining the image where injection stability is good and print density is high and having a preferable gloss.

Next, respective constituent factors of the ink other than the above illustration are illustrated below.

In the ink of the invention, pH is preferably 7.0 or above, and more preferably from 8.0 to 10.0. By making the above pH, the image where injection stability is good and print density is high and having a preferable gloss can be obtained, and thus it is preferable.

As a pH adjuster used for the aqueous ink of the invention, for example, various organic amine such as monoethanolamine, diethanolamine and triethanolamine, inorganic alkali agents such as hydroxide of alkali metal such as sodium hydroxide, lithium hydroxide and potassium hydroxide, organic acids and mineral acids.

It is also one of the characteristics that a surface tension of the ink of the invention is from 30 to 50 mN/m. When the surface tension of the ink becomes 30 mN/m or less, a absorption speed to the recording medium becomes fast and aggregation by pigment particles one another occurs resulting in occurrence of bronzing and reduction of gloss and scratch/abrasion resistance. When the surface tension exceeds 50 mN/m, color turbidity due to long retention of jetted ink droplets on the medium occurs, and it becomes impossible to obtain the image at high definition.

For the surface tension defined in the invention, it is possible to adjust to the desired surface tension by appropriately conditioning types and addition amounts using the various water-soluble organic solvents described above and various surfactants described below.

The method of measuring the surface tension is described in general reference books of surface chemistry and colloid chemistry, for example, Shin Jikken Kagaku Kouza, Vol. 18 (Surface and Colloid) edited by the Chemical Society of Japan and published by Maruzen Co., Ltd.: pages 68 to 117 can be referred, and specifically, it can be obtained by a ring method (DuNouy method) or a plate method (Wilhelmy method).

As one of ways to accomplish the above surface tension, various surfactants can be used. Various surfactants which can be used in the invention are not particularly limited, and for example, include anionic surfactants such as dialkyl sulfosuccinate salts, alkylnaphthalene sulfonate salts and fatty acid salts, nonionic surfactants such as polyoxyethylene alkylethers, polyoxyethylene alkylallylethers, acetyleneglycols, block copolymer of polyoxyethylene and polyoxypropylene, and cationic surfactants such as alkylamine salts, and quaternary ammonium salts. Particularly, the anionic surfactants and the nonionic surfactants can be preferably used.

In the invention, it is preferred that acetylene type surfactant is used as the surfactant in terms of being capable of obtaining the image where the injection stability is good with high print density, having preferable gloss and which is excellent in uniformity.

The acetylene type surfactant is not particularly limited, for example, includes acetylene glycols and acetylene alcohols, is more preferably the surfactant having acetylene group and alkylene oxide chain, and for example, can include Surfynol 465 (supplied from Nisshin Chemical Industry Co., Ltd.).

In the ink of the invention, in addition to the above illustration, if necessary, various additives known in the art, for example, a viscosity adjuster, specific resistance adjuster, film forming agent, ultraviolet ray absorbent, anti-oxidant, anti-color fading agent, antimicrobials and fungicides, anti-rusting agent and the like can be used for the purpose of the injection stability, compatibility of the recording head 22 and ink cartridge, storage stability, image permanence, and the other performance improvement. For example, as these additives it is possible to include oil droplet fine particles such as liquid paraffin, dioctyl phthalate, tricresyl phosphate and silicon oil, the ultraviolet ray absorbents described in JP SHO 57-74193A, JP SHO 57-87988A and JP SHO 62-261476A, the anti-color fading agents described in JP SHO 57-74192A, 57-87989A, 60-72785A, 61-146591A, JP HEI 1-95091A and 3-13376A, the fluorescent brightening agents described in JP SHO 59-42993A, 59-52689A, 62-280069A, 61-242871A and JP HEI 4-219266A, and the like.

Then, the inkjet recording medium of the invention is illustrated.

Generally, as an ink absorbing layer, there are a swelling type and a micro-porous type by broadly dividing. As the swelling type, a water-soluble binder, for example, gelatin, polyvinyl alcohol, polyvinyl pyrrolidone, polyethylene oxide and the like are applied alone or in combination, and this is made the ink absorbing layer. However, in the invention, in order to adapt to continuous high speed print, the recording medium where an ink absorption speed is high is more suitable, and thus from this point, the inkjet recording medium having the ink absorbing layer of the micro-porous type is used.

In the recording medium having the ink absorbing layer of the micro-porous type (also referred to as a micro-porous layer) of the invention, it is one of the characteristics that a transferred amount at 0.04 seconds of absorption time by Bristow method is 10 ml/m$^2$ or more, and it is preferably 10 ml/m$^2$ or more and 30 ml/m$^2$ or less. When the transferred amount is less than 10 ml/m$^2$, the ink absorption speed on the recording medium is reduced, color turbidity occurs when the jetted ink droplets are printed side by side, and it becomes impossible to obtain the image at high definition.

In the recording medium of the invention, the method to accomplish the transferred amount defined above is not particularly limited, and the transferred amount can be used by appropriately conditioning a thickness of the micro-porous layer, a mean particle size of inorganic fine particles (F) which configure the micro-porous layer, a type of a hydrophilic binder (B), a ratio (F/B) of the inorganic fine particles to the hydrophilic binder (B), a type of a support used and the like.

Bristow method referred to in the invention is the method of measuring liquid absorption behavior of paper and plate paper in a short time. Particularly, according to J. TAPPI paper pulp test method No. 51-87, a method of testing absorbability of the paper or plate paper (Bristow method), the measurement is performed, and the absorption is represented by the transferred amount (ml/m$^2$) at 0.04 sec of the absorption time. In the above method, purified water (ion-exchange water) is used for the measurement. However, in order to make determination of a measurement area easy, in the invention, the measurement is performed using an aqueous solution of 2% C.I. Acid Red 52.

One example of specific measurement method is illustrated below.

As the method of measuring the transferred amount, after leaving the recording medium under an atmosphere of 25° C. and 50% RH for 12 hours or more, the measurement is performed using a Bristow testing machine II type (press mode) which is a liquid dynamic absorbability testing machine supplied from Kumagai Rikikogyo Co., Ltd. The aqueous solution of 2% C.I. Acid Red 52 is used for the measurement as mentioned above to enhance measurement accuracy, and the transferred amount can be obtained by measuring an area stained on the recording medium after a defined contact time.

Hereinafter, respective constituent factors of the inkjet recording medium of the invention are illustrated.

Conventionally, various methods of forming micro-pores in a membrane have been known, for example, the method of forming micro-pores by applying a uniform coating solution containing two or more polymeric molecules onto a support and causing phase separation of these polymeric molecules in a drying process, the method of making micro-pores by applying a coating solution containing solid fine particles and a hydrophilic or hydrophobic resin onto a support, after drying, immersing an inkjet recording medium in water or a liquid containing an appropriate organic solvent, and dissolving the solid fine particles, the method of forming micro-pores in a membrane by applying a coating solution containing a compound having a nature which foams at the membrane formation, and subsequently foaming this compound in a drying process, the method of forming micro-pores in porous fine particles and between fine particles by applying a coating solution containing porous solid fine particles and a hydrophilic binder on a support, the method of forming micro-pores between solid fine particles by applying a coating solution containing solid fine particles or fine particle oil droplets having a volume nearly equal to or more than that of a hydrophilic binder and the hydrophilic binder on a support, and the like have been known.

The micro-porous layer of the invention indicates an ink receiving layer with a void rate of 25 to 75%, and preferably the void rate of 30 to 70%, mainly formed from the inorganic fine particles and a small amount of the hydrophilic binder.

In the invention, it is the characteristics that the micro-porous layer is formed by containing the inorganic fine particles with a mean particle size of 15 to 100 nm, and preferably the mean particle size is from 20 to 80 nm. When the mean particle size exceeds 100 nm, deterioration of surface gloss of a coating occurs.

As the inorganic fine particles used for the above purpose, it is possible to include white inorganic pigments such as calcium carbonate light, calcium carbonate heavy, magnesium carbonate, kaolin, clay, talc, calcium sulfate, barium sulfate, titanium dioxide, zinc oxide, zinc hydroxide, zinc sulfide, zinc carbonate, hydrotalcite, aluminium silicate, diatomite, calcium silicate, magnesium silicate, synthetic amorphous silica, colloidal silica, alumina, colloidal alumina, pseudoboehmite, aluminium hydroxide, lithopone and magnesium hydroxide.

The mean particle size of the inorganic fine particles in the invention is obtained as the simple mean value (number mean) by observing cross sections and surfaces of the micro-porous layer in the recording medium by an electron microscope and randomly measuring the particle size of 1,000 particles. Here, the particle size of individual particle is a diameter when a circle equal to a projection area thereof is supposed. As the inorganic fine particle, it is preferable to use silica or alumina.

As the silica which can be used in the invention, silica synthesized by a usual wet method, colloidal silica or silica synthesized by a vapor phase method or the like is preferably used, and as the silica preferably used in the invention, colloidal silica or fine particle silica synthesized by the vapor phase method is preferable. Among others, the fine particle silica synthesized by the vapor phase method has characteristics that a so-called soft aggregation structure is formed by coexisting with the hydrophilic binder to give a high void rate. Further this fine particle silica when it is added to a cationic polymer molecule used for the purpose of immobilizing colorants, rough and large aggregation is difficult to be formed, and thus it is preferable.

Alumina or alumina hydrate which can be used in the invention may be crystalline or amorphous, and it is possible to use those with any shape such as undefined shaped particles, spherical particles and needle particles. Among others, the alumina hydrate having a plate shape where an average aspect ratio is from 1 to 4 is preferable. There are those having a fibrous shape and those having a plate shape in the alumina hydrate. When the fibrous alumina hydrate is used, it is prone to orientate in parallel with a substrate surface at the application, and thus formed micropores become small. On the contrary, in the case of the plate alumina hydrate, tendency to orientate to a certain direction by the application is small, and a relatively large void rate can be obtained.

As the hydrophilic binder which can be used in the micro-porous layer of the invention, for example, polyvinyl alcohol, gelatin, polyethylene oxide, polyvinyl pyrrolidone, polyacrylic acid, polyacrylamide, polyurethane, dextran, dextrin, carrageenan (κ, ι, λ, etc.) agar, pullulan, water-soluble polyvinyl butyral, hydroxyethylcellulose, carboxymethylcellulose, and the like are included. It is possible to combine two or more of these water-soluble binders, but polyvinyl alcohol or derivatives thereof are particularly preferable in terms of relatively small moisture absorption property of the binder, smaller curl of the medium and being high binder performance by the use of a small amount with excellent crack and velation.

As polyvinyl alcohol preferably used in the invention, modified polyvinyl alcohol such as polyvinyl alcohol where the end is modified with cation, and anion modified polyvinyl alcohol having anionic group are included in addition to common polyvinyl alcohol obtained by hydrolyzing polyvinyl acetate.

As polyvinyl alcohol obtained by hydrolyzing polyvinyl acetate, those with an average polymerization degree of 300 or more are preferably used, and particularly those with an average polymerization degree of 1,000 to 5,000 are preferably used. A saponification degree is preferably from 70 to 100%, and particularly preferably 80 to 99.8%.

The cation modified polyvinyl alcohol is, for example, the polyvinyl alcohol having primary to tertiary amino groups and quaternary amino groups in a backbone or side chains as described in JP SHO 61-10483A, and this is obtained by saponifying a copolymer of an ethylenic unsaturated monomer having cationic group and vinyl acetate.

As the ethylenic unsaturated monomer having cationic group, for example, trimethyl-(2-acrylamide-2,2-dimethylethyl)ammonium chloride, trimethyl-(3-acrylamide-3,3-dimethylpropyl)ammonium chloride, N-vinylimidazole, N-methylvinylimidazole, N-(3-dimethylaminopropyl)methacrylamide, hydroxyethyltrimethylammonium chloride, trimethyl-(3-methacrylamidepropyl)ammonium chloride and the like are included.

A percentage of cation modified group-containing monomer of the cation modified polyvinyl alcohol is from 0.1 to 10 mol %, and preferably from 0.2 to 5 mol % based on vinyl acetate.

As anion modified polyvinyl alcohol, for example, polyvinyl alcohol having anionic group described in JP HEI 1-206088, copolymers of vinyl alcohol and a vinyl compound having water-soluble group described in JP SHO 61-237681A and 63-307979, and modified polyvinyl alcohol having water-soluble group described in JP HEI 7-285265A are included.

As nonionic modified polyvinyl alcohol, for example, polyvinyl alcohol derivatives where polyalkyleneoxide group is added to a part of vinyl alcohol described in JP HEI 7-9758, block copolymer of a vinyl compound having hydrophobic group and vinyl alcohol described in JP HEI 8-25795, and the like are included.

Polyvinyl alcohol can be also used in combination with two or more depending on difference in polymerization degree and modification type. Particularly when polyvinyl alcohol with a polymerization degree of 2,000 or more, is used, if it is precedently added at 0.05 to 10% by mass, preferably from 0.1 to 5% by mass based on the inorganic fine particles and then polyvinyl alcohol with a polymerization degree of 2,000 or more is added, there is no remarkable thickening and it is preferable.

A ratio of the inorganic fine particles to the hydrophilic binder in the micro-porous layer is preferably from 2 to 20 at a mass ratio. When the mass ratio is 2 times or more, a porous membrane with sufficient void rate is obtained, a sufficient void capacity is easily obtained, micro-pores are not occupied by swelling of retainable hydrophilic binder at the inkjet recording, and thus it becomes a factor capable of retaining a high ink absorption speed. On the other hand, if this ratio is 20 times or less, when the micro-porous layer is formed by applying a thick membrane, it becomes difficult to cause cracks. The particularly preferable ratio of the inorganic fine particles to the hydrophilic binder is from 2.5 to 12 times, and most preferably it is from 3 to 10 times.

It is preferred that a total amount of the micro-pores (void capacity) in the micro-porous layer is 20 ml or more per $m^2$ of the recording medium. By making the void capacity 20 $ml/m^2$ or more, even when an ink amount becomes large, it is possible to make an ink absorbability good, and thus it is possible to improve the image quality and suppress reduction of drying.

The void capacity in the invention indicates a saturated water absorption amount obtained by Bristow method. When the transferred amount obtained by Bristow method is plotted versus a square root of the absorption time, a line with a certain slope is obtained. This represents changes of absorption amounts of the recording medium versus the absorption time. When the ink (here, referred to the aqueous solution of 2% C.I. Acid Red 52) is absorbed to fill up the void capacity, there becomes no room, and thus the slope is 0. The water absorption amount at that time is the saturated water absorption amount, and is considered as a value which represents the void capacity. In the case of the recording medium having an absorbable support preferably used in the invention, it sometimes represents the absorption of the support in addition to the ink absorption by the ink absorbing layer. In the recording medium used in the invention, the absorption speed of the ink in the ink absorbing layer is overwhelmingly much faster than that in the support, and thus, even when the absorption by the support is measured, a curve has double slopes and discrimination of both is easy.

In the invention, the micro-porous layer is referred to the layer with a void rate of 25 to 75%, and the void rate is preferably from 30 to 70%. When the void rate is 25% or more, the desired ink absorption speed can be accomplished without making a membrane thickness thick unnecessarily. When it is 75% or less, the ink absorption speed does not become excessively fast, and additionally it is possible to prevent obstacle (cracks) at a coating and drying steps and stably obtain the image at high definition.

The void rate referred to in the invention indicates the rate of a total volume of the micro-pores in a volume of the micro-porous layer. The void capacity obtained by the above Bristow method can be used as it is for the total volume of the micro-pores. The volume of the micro-porous layer can be obtained as the volume per $m^2$ of the recording medium by measuring the dried membrane thickness. The aimed void rate can be obtained as a ratio of both volumes by calculation. The total volume of the micro-pores can be easily obtained by the saturated transferred amount and the water absorption amount measurement by Bristow method.

For the above micro-porous layer, various additives can be used in addition to the inorganic fine particles and the binder. Among others, a cationic polymeric molecule, hardener, urea or a derivative thereof plays important roles in terms of improving bleeding resistance, bronzing resistance, and scratch/abrasion resistance.

Examples of the cationic polymer molecules include polyethyleneimine, polyallylamine, polyvinylamine, dicyandiamidepolyalkylenepolyamine condensates, polyalkylenepolyaminedicyandiamide ammonium condensates, dicyandiamideformaline condensates, epichlorohydrin/dialkylamine addition polymers, diallyldimethylammonium chloride polymers, diallyldimethylammonium chloride/$SO_2$ copolymers, polyvinylimidazole, vinylpyrrolidone/vinylimidazole copolymers, polyvinylpyridine, polyamidine, chitosan, cationized starch, vinylbenzyltrimethylammonium chloride polymers, (2-methacroyloxyethyl)trimethylammonium chloride polymers, dimethylaminoethyl methacrylate polymers, and the like.

Cationic polymeric molecules described in Kagaku Kogyo Jiho (Aug. 15 and 25, 1998) and polymeric molecular dye fixing agents described in "Kobunshi Yakuzai Nyumon" published by Sanyo Chemical Industries Ltd. are included as the examples.

In the recording medium according to the invention, it is preferable to add the hardener of the water-soluble binder which forms the micro-porous layer.

The hardener which can be used for a hard membrane of the water-soluble binder which forms the micro-porous layer in the invention is not particularly limited so long as it performs a hardening reaction with the water-soluble binder. Boric acid and salts thereof are preferable, but the other known in the art can be also used. Generally it is the compound having groups capable of reacting with the water-soluble binder or the compound which facilitates a reaction of different groups one another which the water-soluble binder has, and is appropriately used depending on the type of water-soluble binder. Specific examples of the hardener include epoxy type hardeners (diglycidylethylether, ethyleneglycol diglycidylether, 1,4-butanediol diglycidylether, 6-diglycidylcyclohexane, N,N-diglycidyl-4-glycidyloxyaniline, sorbitol polyglycidylether, etc.), aldehyde type hardeners (formaldehyde, glyoxazol, etc.), active halogen type hardeners (2,4-dichloro-4-hydroxy-1,3,5-s-triadine, etc.), active vinyl type compounds (1,3,5-trisacryloyl-hexahydros-triadine, bisvinylsulfonylmethylether, etc.), aluminium alum, and the like.

Boric acid and salts thereof are referred to oxyacids where boron atom is a central atom and salts thereof, and specifically, ortho-boric acid, diboric acid, metaboric acid, tetraboric acid, pentaboric acid and octaboric acid and salts thereof are included.

Boric acid having boron atoms and the salts thereof as the hardeners may be used as an aqueous solution thereof alone or in mixture with two or more. Particularly preferable is a mixed aqueous solution of boric acid and borax. Aqueous solutions of boric acid and borax are each added only by relatively diluted aqueous solutions, but it is possible to make a thick aqueous solution by mixing the both, and concentrate the coating solution. Besides there is an advantage that pH of the added aqueous solutions can be controlled relatively freely. A total use amount of the above hardener is preferably from 1 to 600 mg per g of the above water-soluble binder.

It is possible to add polyvalent metal ions to the recording medium according to the invention. The polyvalent metal ion is not particularly limited so long as it is bivalent or more metal ion, and preferable polyvalent ions include aluminium ion, zirconium ion, titanium ion and the like. These polyvalent metal ions can be contained in the micro-porous layer in a water-soluble or water-insoluble salt form.

These polyvalent metal ions may be used alone or in combination with different two or more. The compound comprising the polyvalent metal ions may be added to a coating solution which forms the micro-porous layer or supplied to the micro-porous layer by a over coat method after once applying the micro-porous layer, particularly after once applying and drying the micro-porous layer. As the former, when the compound comprising the polyvalent metal ions is added to the coating solution which forms the ink absorbing layer, it is possible to use the method of adding by uniformly dissolving in water or an organic solvent or a mix solvent thereof or the method of adding by dispersing into fine particles by a wet pulverizing method of a sand mill, an emulsifying dispersion method and the like. When the micro-porous layer is made up of multiple layers, they may be added to the coating solution for only one layer or can be added to the coating solutions for two or more layer or all constitutive layers. As the latter, when they are added by the over coat method after once forming the micro-porous layer, it is preferred that the compound comprising the polyvalent metal ions is uniformly dissolved in the solvent, and subsequently supplied to the micro-porous layer.

These polyvalent metal ions are used in the range of about 0.05 to 20 mmol, and preferably from 0.1 to 10 mmol per $m^2$ of the recording medium.

To the micro-porous layer of the invention, various additives other than the above can be added. For example, it is possible to contain various additives known in the art such as polystyrene, polyacrylate esters, polymethacrylate esters, polyacrylamides, polyethylene, polypropylene, polyvinyl chloride, polyvinylidene chloride, or copolymers thereof, urea resins, or organic latex fine particles of melamine resins, various cationic or nonionic surfactants, ultraviolet ray absorbents described in JP SHO 57-74193A, 57-87988A and 62-261476A, anti-color fading agents described in JP SHO 57-74192A, 57-87989A, 60-71785A, 61-146591A, JP HEI 1-95091A and 3-13376A, fluorescent brightening agents described in JP SHO 59-42993A, 59-52689A, 62-280069A, 61-242871A and JP HEI 4-219266, pH adjusters such as sulfuric acid, phosphoric acid, citric acid sodium hydroxide, potassium hydroxide and potassium carbonate, ant-foaming agent, preservative, thickening agent, anti-electrostatic agent and matting agent.

Both an absorbable support and non-absorbable support can be used as the support of the recording medium of the invention. In terms of exerting objective effects of the invention with no obstacle, for example, it is preferable to use the absorbable support which is a paper support such as plain paper, baryta paper, art paper, coated paper and cast-coated paper.

The absorbable support of the invention can include, for example, sheet, plate and the like having common paper, synthetic paper, fabrics, wood materials and the like, and particularly the paper is the most preferable because it is excellent in absorbability of the substrate itself and cost. The paper support is illustrated below.

As basic materials of the paper support, it is possible to use those where a major basic material is wood pulps such as chemical pulps such as LBKP and NBKP, mechanical pulps such as GP, CGP, RMP, TMP, CTMP, CMP and PGW, and used paper pulps such as DIP, and it is preferable to use hardwood pulps. As the hardwood pulps, kraft pulp, sulfate pulp, chemithermomechanical pulp, chemimechanical pulp and the like may be used alone or in combination with several types. If necessary, paper making is performed by using synthetic pulp such as polypropylene or synthetic fibers such as nylon and polyester in addition to the wood pulps.

In terms of improving whiteness degree, it is preferred that a bleaching treatment by peroxide and the like is given to the pulp which is a basic material. It is preferred that the bleaching treatment is given after digesting the pulp, subsequent chlorine treatment, alkali treatment or extraction, hypochlorite bleaching, chlorine dioxide bleaching, and multistage bleaching by combination thereof, further if necessary reduction bleaching by hydrosulfite and sodium borohydride. More preferably, peroxide bleaching treatment in alkali could be given as the final pulp bleaching treatment after the pulp bleaching treatments known in the art after digesting the pulp, but the alkali treatment or extraction or purification may be further given.

Various additives conventionally known in the art such as a sizing agent, pigments, paper power enhancer, fixing agents, fluorescent brightening agent, wet paper power agent and cationizing agent can be added to the paper support if necessary. As the sizing agent, the sizing agents such as a higher fatty acid, alkylketene dimer, rosin, paraffin wax, alkenylsuccinic acid and petroleum resin emulsion can be added if necessary. The pigments include calcium carbonate, talc, titanium oxide, urea resin fine particles and the like, the paper power enhancers include starch, polyacrylamide, polyvinyl alcohol and the like, and the fixing agents include sulfate band and cationic polymeric molecular electrolytes, but they are not limited thereto.

The paper support can be manufactured by mixing the above fiber substances such as wood pulps and various additives and using various paper making machines such as a fourdrinier machine, cylinder machine and twin wire paper making machine. If necessary, it is also possible to give a size press treatment by starch, polyvinyl alcohol and the like, various coating treatments and calendar treatment in the paper making stage or after the paper making.

A paper density is generally from 0.7 to 1.2 $g/cm^3$ (JIS-P-8118). A base paper stiffness is preferably from 20 to 200 g under the condition defined in JIS-P-8143.

A paper pH is preferably from 5 to 9 when measured a hot water extraction method defined in JIS-P-8113.

In the invention, for the purpose of increasing an adhesion strength of the support and the ink receiving layer, it is possible to give corona discharge treatment, undercoating treatment and application of an intermediate layer prior to the application of the ink receiving layer.

Next, the method of manufacturing the inkjet recording medium of the invention is illustrated.

As the method of manufacturing the inkjet recording medium of the invention, it is possible to manufacture by appropriately selecting an application mode from the application modes known in the art and applying and drying respective constituent layers comprising the ink absorbing layer onto the support separately or simultaneously. As the application mode, for example, a roll coating method, rod bar coating method, air knife coating method, spray coating method, curtain application method, or a slide bead application method using a hopper described in U.S. Pat. Nos. 2,761,419 and 2,761,791, an extrusion coat method and the like are preferably used.

As a viscosity when a simultaneous overlaying application is performed, in the case of using the slide bead application mode, it is preferably in the range of 5 to 100 mPa·s, and more preferably from 10 to 70 mPa·s. In the case of using the curtain application mode, it is preferably in the range of 5 to 1200 mPa·s, and more preferably from 25 to 500 mPa·s.

The viscosity of the coating solution at 15° C. is preferably 100 mPa·s or more, more preferably from 100 to 30,000 mPa·s, still preferably from 3,000 to 30,000 mPa·s, and most preferably from 10,000 to 30,000 mPa·s.

As the applying and drying methods, it is preferred that the coating solution is heated to 30° C. or above, the simultaneous overlaying application is performed, subsequently a temperature of a formed coating film is once cooled to 1 to 15° C., and the drying is performed at 10° C. or above. More preferably, a drying condition is that the drying is performed at the condition in the range of a wet bulb temperature of 5 to 50° C. and a membrane surface temperature of 10 to 50° C. Cooling immediately after the application is preferably performed by a horizontal set mode in terms of formed coating film uniformity.

EXAMPLES

Hereinafter, the present invention is specifically illustrated by referring to Examples, but the invention is not limited thereto.

<<Manufacture of Recording Medium>>

[Manufacture of Recording Medium (1)]

[Manufacture of Support]

Base paper was made by preparing a slurry solution containing 1 part of polyacrylamide, 4 parts of ash (talc), 2 parts of cationized starch, 0.5 parts of polyamide epichlorohydrin resin and various addition amounts of alkylketene dimer (sizing agent) for 100 parts of wood pulp (LBKP/NBSP=50/50) and using a fourdrinier machine such that a weighing is 170 $g/m^2$. A support (1) which was an absorbable support was made by giving a calendar treatment to this base paper.

After giving corona discharge to this support (1), a hardener-containing gelatin undercoating layer was applied at 0.04 $g/m^2$ in terms of a solid content, and on a back face, a styrene/acryl type emulsion containing silica fine particles (matting agent) with a mean particle size of 1 μm and a small amount of a cationic polymeric molecule (conducting agent) was applied such that a dried film thickness is about 0.5 μm.

[Preparation of Coating Solution for Ink Absorbing Layer]

A coating solution for an ink absorbing layer (microporous layer) was prepared of the following procedure.

[Preparation pf Titanium Oxide Dispersion]

Titanium oxide (20 kg) (W-10 supplied from Ishihara Sangyo Co., Ltd.) with a mean particle size of 0.25 μm was added to 90 L of an aqueous solution at pH 7.5 containing 150 g of sodium tripolyphosphate, 500 g of polyvinyl alcohol (PVA235 supplied from Kuraray Co., Ltd.), 150 g of cationic polymeric molecule P-1 (refer to the following Chemical formula) and 10 g of anti-foaming agent SN 381 supplied from San nobuko KK, dispersed by a high pressure homogenizer (Sanwa Industries Co., Ltd.), and subsequently a total amount was filled up to 100 L to yield a uniform titanium oxide dispersion.

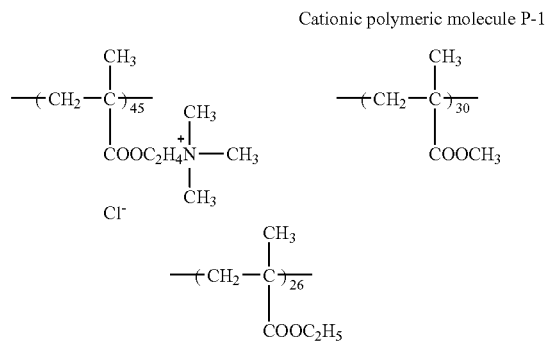

Cationic polymeric molecule P-1

(Preparation of Silica Dispersion (1))

| | |
|---|---|
| Water | 71 L |
| Boric acid | 0.27 kg |
| Borax | 0.24 kg |
| Ethanol | 2.2 L |
| Aqueous solution of 25% cationic polymeric molecule P-1 | 17 L |
| Aqueous solution of 10% anti-color fading agent (AF1*1) | 8.5 L |
| Aqueous solution of fluorescent brightening agent (*2) | 0.1 L |

A total amount was filled up to 100 L with purified water.

As inorganic fine particles, 50 kg of silica fine particles (mean primary particle size: about 35 nm) were prepared, the above additives were added thereto, and subsequently the dispersion was performed by a dispersion method described in Example 5 of JP 2002-47454A to yield a silica dispersion (1).

*1: Anti-color fading agent (AF-1) HO—N($C_2H_4SO_3$Na)$_2$

*2: UVITEX NFW LIQUID supplied from Ciba Specialty Chemicals Inc.

(Preparation of Silica Dispersion (2))

A silica dispersion (2) was prepared as is the case with the preparation of the above silica dispersion (1) except that the cationic polymeric molecule P-1 was changed to a cationic polymeric molecule P-2(refer to the following chemical formula).

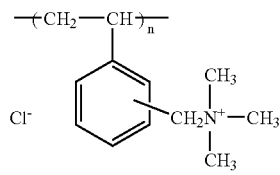

Cationic polymeric molecule P-2

(Preparation of Coating Solution)

Respective coating solutions of the first, second, third and fourth layers were prepared by the following procedures.

<Coating Solution for First Layer>

The following additives were sequentially added to 610 ml of the silica dispersion (1) at 40° C. with stirring.

| | |
|---|---|
| Aqueous solution of 5% polyvinyl alcohol (PVA235 supplied from Kuraray Co., Ltd.) | 220 ml |
| Aqueous solution of 5% polyvinyl alcohol (PVA245 supplied from Kuraray Co., Ltd.) | 80 ml |
| Titanium oxide dispersion | 30 ml |
| Polybutadiene dispersion (mean particle size: about 0.5 μm, solid concentration: 40%) | 15 ml |
| Aqueous solution of 5% surfactant (SF1) | 1.5 ml |

A total amount was filled up to 1000 ml with purified water.

<Coating Solution for Second Layer>

The following additives were sequentially added to 630 ml of the silica dispersion (1) at 40° C. with stirring.

| | |
|---|---|
| Aqueous solution of 5% polyvinyl alcohol (PVA235 supplied from Kuraray Co., Ltd.) | 180 ml |
| Aqueous solution of 5% polyvinyl alcohol (PVA245 supplied from Kuraray Co., Ltd.) | 80 ml |
| Polybutadiene dispersion (mean particle size: about 0.5 μm, solid concentration: 40%) | 15 ml |

A total amount was filled up to 1000 ml with purified water.

<Coating Solution for Third Layer>

The following additives were sequentially added to 650 ml of the silica dispersion (2) at 40° C. with stirring.

| | |
|---|---|
| Aqueous solution of 5% polyvinyl alcohol (PVA235 supplied from Kuraray Co., Ltd.) | 180 ml |
| Aqueous solution of 5% polyvinyl alcohol (PVA245 supplied from Kuraray Co., Ltd.) | 80 ml |

A total amount was filled up to 1000 ml with purified water.

<Coating Solution for Fourth Layer>

The following additives were sequentially added to 650 ml of the silica dispersion (2) at 40° C. with stirring.

| | |
|---|---|
| Aqueous solution of 5% polyvinyl alcohol (PVA235 supplied from Kuraray Co., Ltd.) | 180 ml |

-continued

| | |
|---|---|
| Aqueous solution of 5% polyvinyl alcohol (PVA245 supplied from Kuraray Co., Ltd.) | 80 ml |
| Aqueous solution of 50% saponin | 4 ml |
| Aqueous solution of 5% surfactant (SF1) (refer to the following Chemical formula) | 6 ml |

A total amount was filled up to 1000 ml with purified water.

Surfactant (SF1)

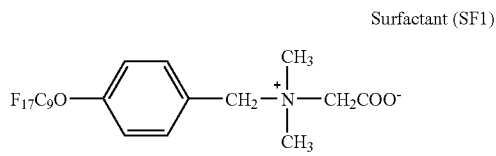

The two step filtration of the respective coating solutions prepared as above was performed with a 20 μm filter capable of collecting.

All of the above coating solution exhibited viscosity property of 30 to 80 mPa·s at 40° C. and 30,000 to 100,000 mPa·s at 15° C.

(Application)

The respective coating solutions obtained in this way were simultaneously applied on an upper side of the above support (1) made above to arrange in order of the first layer (35 μm), the second layer (45 μm), the third layer (45 μm) and the fourth layer (40 μm). A number in a parenthesis indicates a wet film thickness. The application was simultaneously performed at an application width of about 1.5 m at an application speed of 100 m/min using each coating solution at 40° C. and using a 4 layer type curtain coater.

Immediately after the application, cooling was performed in a cooling zone retained at 8° C. for 20 sec, and subsequently drying was performed by blowing respective drying winds at 20 to 30° C. and a relative humidity of 20% or less for 30 sec, at 60° C. and a relative humidity of 20% or less for 120 sec, and at 55° C. and a relative humidity of 20% or less for 60 sec. A coating temperature in a constant rate drying period was from 8 to 30° C., after the coating temperature was gradually raised in a falling rate drying period, a recording medium (1) was obtained by performing air conditioning in an air conditioning zone at 23° C. and relative humidity of 40 to 60%, and rolling up in a roll shape. The obtained recording medium (1) was then stored in a roll shape at 40° C. for 5 days with being humidified, and subsequently cut into a given size. As a result of measuring by the method described below, the void rate of the recording medium (1) was 55%. Also as a result of measuring by the method described below, the transferred amount at 0.04 sec of absorption time by Bristow method was 20 ml/m².

[Manufacture of Recording Medium (2)]

A recording medium 2 where the transferred amount at 0.04 sec of absorption time by Bristow method was 8 ml/m² was made by changing the support 1 to the following support 2 and appropriately changing a constituent ratio (F/B) of silica fine particles (F) to polyvinyl alcohol (B) in the respective ink absorbing layers in the manufacture of the above recording medium 1.

(Manufacture of Support (2))

Base paper was made by preparing a slurry solution containing 1 part of polyacrylamide, 4 parts of ash (talc), 2 parts of cationized starch, 0.5 parts of polyamide epichlorohydrin resin and various addition amount of alkylketene dimer (sizing agent) for 100 parts of wood pulp (LBKP/NBSP=50/50) and using a fourdrinier machine such that a weighing is 170 g/m². After giving a calendar treatment to this base paper, a low density polyethylene resin with a density of 0.92 containing 7% anatase type titanium oxide and a small amount of a color tone adjuster was coated on a single side of the base paper by a melting extrusion coating method such that a thickness is 28 μm at 320° C. Immediately after the melting extrusion application, various fine particle typing treatments was given to the surface of polyethylene by pressing/cooling a cooling roll having various regular concavoconvex height. Difference of the typing was made by conditioning the density and the concavoconvex height.

Then, a support (2) which was non-absorbable support was made by coating a melted matter where high density polyethylene with a density of 0.96 and low density polyethylene with a density of 0.92 were mixed at 70/30 on an opposite side face similarly by the melting extrusion coating method such that a thickness was 32 μm.

After giving corona discharge to a face side of the layer containing titanium oxide of this support (2), a hardener-containing gelatin undercoating layer was applied at 0.04 g/m² in terms of a solid content, and on a back face, a styrene/acryl type emulsion containing silica fine particles (matting agent) with a mean particle size of 1 μm and a small amount of a cationic polymeric molecule (conducting agent) was applied such that a dried film thickness was about 0.5 μm.

[Manufacture of Recording Medium (3)]

A recording medium (3) where the transferred amount at 0.04 sec of absorption time by Bristow method was 20 ml/m² was made by appropriately changing a constituent ratio (F/B) of silica fine particles to polyvinyl alcohol in the respective ink absorbing layers in the manufacture of the above recording medium (2).

[Manufacture of Recording Medium (4)]

A recording medium (4) where the transferred amount at 0.04 sec of absorption time by Bristow method was 11 ml/m² was made by appropriately changing a constituent ratio (F/B) of silica fine particles to polyvinyl alcohol in the respective ink absorbing layers in the manufacture of the above recording medium (1). The void rate was measured by the method described below, and it was 35%.

[Manufacture of Recording Medium (5)]

| | |
|---|---|
| Alumina hydrate (Disperal HP18 supplied from Sasol Ltd.) | 0.50 kg |
| Purified water | 10 L |

Hydrochloric acid at 1 mol/L was added to the above dispersion to adjust pH to 4, and this was stirred at 95° C. for 2 hours. Then, an aqueous solution of sodium hydroxide at 1 mol/L was added to adjust pH to 10, and further stirred for 8 hours. After stirring, the solution was cooled to room temperature, pH was adjusted to 7 to 8, desalting treatment was given, and further acetic acid was added to deflocculate. After concentrating until a solid content became 17%, an aqueous solution of 9% polyvinyl alcohol (PVA117 supplied from Kuraray Co., Ltd.) was mixed such that a solid content ratio of alumina to polyvinyl alcohol was 10:1 at a weight ratio, and stirred to yield a coating solution.

The coating solution prepared as the above was filtrated with a 20 μm filter capable of collecting. This coating solution was applied onto a baryta layer of a substrate (Bekk smoothness: 420 sec; whiteness degree: 89%) having the baryta layer by a die coater such that a dried film thickness was 30 g/m². An applying speed at that time was 50 m/min and the drying was performed at a temperature of 150° C. to make a recording medium (5).

The mean particle size of the alumina particles in the recording medium (5) was 30 nm. The transferred amount at 0.04 sec of absorption time by Bristow method was 20 ml/m², and the void rate was 55%.

[Manufacture of Recording Media (6) to (9)]

Recording media (6) to (9) were made as the manufacture of the recording medium (1), except that the silica particles (mean particle size: about 35 nm) used for the preparation of the respective ink absorbing layer coating solutions were changed to silica particles with mean particle size described in Table 1. The transferred amounts and the void rates of these recording media were as shown in table 1.

[Manufacture of Recording Medium (10)]

A recording medium (10) was made as the manufacture of the recording medium (1), except that boric acid and borax used for the preparation of the respective ink absorbing layer coating solutions were removed.

[Manufacture of Recording Media (11) and (12)]

Recording media (11) and (12) were made as the manufacture of the recording medium (1), except that the void rates of the ink absorbing layer were 25% and 75%, respectively by appropriately changing the constituent ratio (F/B) of the silica fine particles to polyvinyl alcohol in the respective ink absorbing layers. The void rates in these recording media were as shown in table 1.

<<Preparation of Inks>>

[Preparation of Polymeric Dispersant SA-1]

A 3 L four-necked flask was equipped with a three one motor, a thermometer, a nitrogen charging tube and a dropping funnel with a drying tube. With running dried nitrogen gas, tetrahydrofuran (780.0 g) and p-xylene (3.6 g) were charged into this. With stirring, tetrabutylammonium m-benzoate (solution at 1 mol/L, 3.2 ml) was added, and further 1,1-bis(trimethylsiloxy)-2-methylpropene (144.0 g) was added.

Next, tetrabutylammonium m-benzoate (solution at 1 mol/L, 3.2 ml) was dripped from the dropping funnel over 130 min with stirring. After dripping, a mixture of benzyl methacrylate (272.6 g) and trimethylsilyl methacrylate (489.8) was dripped from the dropping funnel over 40 min with stirring. After stirring for 30 min, benzyl methacrylate (545.4 g) was dripped from the dropping funnel over 30 min with stirring.

After stirring as it was for 240 min, absolute methanol (216 g) was added and stirred. The dropping funnel was changed to Liebig condenser, an entire vessel was heated, and a fraction of distillate at a boiling point of 55° C. or below was eliminated. Distillation was further continued, at the time point when the boiling point was 76° C., 2-propanol (900 g) was added, and heating and distillation were further continued. Heating was continued until a solvent at a total amount of 1,440 g was run out to yield a solution (1) of an aimed block copolymer (BzMA//BzMA/MAA=5//2.5/5). A part was dried, a molecular weight and an acid value were measured, and they were 1,500 and 70, respectively.

This solution 1 was neutralized by adding N,N-dimethylethanolamine to yield an aimed polymeric dispersant SA-1.

[Preparation of Polymeric Dispersant SA-2]

A polymeric dispersant SA-2 was prepared as the preparation of the polymeric dispersant SA-1, except that neutralization was performed using potassium hydroxide in place of N,N-dimethylethanolamine.

[Preparation of Polymeric Dispersant SA-3]

A 1 L four-necked flask was equipped with a three one motor, a thermometer, a reflux tube with a nitrogen charging tube and a dropping funnel. With running dried nitrogen gas, the following monomer mixture 1 was charged into this, and a temperature was raised to 65° C.

Next, the following monomer mixture 2 was dripped over 2.5 hours with stirring. Further, a mix solution of azobis-dimethylvaleronitrile (0.8 g) and methylethylketone (22 ml) was dripped over 0.5 hours. Azobisdimethylvaleronitrile (0.8 g) was added and further heated and stirred for one hour.

After completion of the reaction, methylethylketone (450 ml) was added to yield a solution of a polymeric dispersant SA-3 with solid content of 50%. A part was dried, a molecular weight and an acid value were measured, and they were 15,000 and 55, respectively.

(Monomer Mixture (1))

| | |
|---|---|
| Styrene | 11.2 g |
| Lauryl methacrylate | 12.0 g |
| Polyethyleneglycol methacrylate (Light Ester 130 MA supplied from Kyoeisha Chemical Co., Ltd.) | 4.0 g |
| Styrene macromer (Macromonomer AS-6 supplied from Toagosei Co., Ltd.) | 4.0 g |
| Acrylic acid | 2.8 g |
| Mercaptoethanol | 0.4 g |

(Monomer Mixture (2))

| | |
|---|---|
| Styrene | 100.8 g |
| Lauryl methacrylate | 108.0 g |
| Hydroxyethyl methacrylate | 60.0 g |
| Polyethyleneglycol methacrylate (Light Ester 130 MA supplied from Kyoeisha Chemical Co., Ltd.) | 36.0 g |
| Styrene macromer (Macromonomer AS-6 supplied from Toagosei Co., Ltd.) | 36.0 g |
| Acrylic acid | 25.2 g |
| Mercaptoethanol | 3.6 g |
| Azobisdimethylvaleronitrile | 2.4 g |
| Methylethylketone | 22 ml |

[Preparation of Ink Set (1)]

<Preparation of Yellow Pigment Dispersion (1)>

| | |
|---|---|
| C.I. Pigment Yellow 74 | 20% by mass |
| Polymeric dispersant SA-1 | 10% by mass (as a solid content) |
| Glycerin | 15% by mass |
| Ion-exchange water | 55% by mass |

The above additives were mixed and dispersed using a horizontal type bead mill (System Zeta mill supplied from Ashizawa Finetech Ltd.) in which zirconia beads of 0.3 mm were filled at a volume rate of 60% to yield a yellow pigment dispersion (1). A mean particle size of the obtained yellow pigments was 112 nm.

<Preparation of Magenta Pigment Dispersion (1)>

| | |
|---|---|
| C.I. Pigment Red 122 | 25% by mass |
| Polymeric dispersant SA-2 | 16% by mass |
| | (as a solid content) |
| Glycerin | 15% by mass |
| Ion-exchange water | 44% by mass |

The above additives were mixed and dispersed using a horizontal type bead mill (System Zeta mill supplied from Ashizawa Finetech Ltd.) in which zirconia beads of 0.3 mm were filled at a volume rate of 60% to yield a magenta pigment dispersion (1). A mean particle size of the obtained magenta pigments was 105 nm.

<Preparation of Cyan Pigment Dispersion (1)>

| | |
|---|---|
| C.I. Pigment Blue 15:3 | 25% by mass |
| Polymeric dispersant SA-1 | 13% by mass |
| | (as a solid content) |
| Diethyleneglycol | 10% by mass |
| Ion-exchange water | 52% by mass |

The above additives were mixed and dispersed using a horizontal type bead mill (System Zeta mill supplied from Ashizawa Finetech Ltd.) in which zirconia beads of 0.3 mm were filled at a volume rate of 60% to yield a cyan pigment dispersion (1). A mean particle size of the obtained cyan pigments was 87 nm <Preparation of Black Pigment Dispersion (1)>

| | |
|---|---|
| Carbon black | 20% by mass |
| Polymeric dispersant SA-1 | 9% by mass |
| | (as a solid content) |
| Glycerin | 10% by mass |
| Ion-exchange water | 61% by mass |

The above additives were mixed and dispersed using a horizontal type bead mill (System Zeta mill supplied from Ashizawa Finetech Ltd.) in which zirconia beads of 0.3 mm were filled at a volume rate of 60% to yield a black pigment dispersion (1). A mean particle size of the obtained black pigments was 75 nm.

[Preparation of Pigment Ink Set]

Using the respective pigment dispersions prepared above, an ink set 1 composed of a yellow ink (1), a magenta ink (1), a cyan ink (1) and a black ink (1) was prepared.

<Preparation of Yellow Ink (1)>

| | |
|---|---|
| Yellow pigment dispersion (1) | 15% by mass |
| Ethyleneglycol | 4% by mass |
| Glycerin | 3.75% by mass |
| 2-Pyrrolidone | 5% by mass |
| Surfactant (Surfynol 465 supplied from Nisshin Chemical Industry Co., Ltd.) | the following required quantity |
| Ion-exchange water | residual quantity |

The surfactant was added such that the surface tension was 38 mN/m and a quantity was adjusted with ion-exchange water such that a total quantity was 100% by mass. A yellow ink 1 was prepared by mixing the above compositions, stirring and filtrating with a 1 μm filter. A mean particle size of pigments in the ink was 122 nm.

<Preparation of Magenta Ink (1)>

| | |
|---|---|
| Magenta pigment dispersion (1) | 15% by mass |
| Glycerin | 8% by mass |
| Diethyleneglycol | 1.75% by mass |
| 2-Pyrrolidone | 3% by mass |
| Surfactant (Surfynol 465 supplied from Nisshin Chemical Industry Co., Ltd.) | the following required quantity |
| Ion-exchange water | residual quantity |

The surfactant was added such that the surface tension was 38 mN/m and a quantity was adjusted with ion-exchange water such that a total quantity was 100% by mass. A magenta ink (1) was prepared by mixing the above compositions, stirring and filtrating with a 1 μm filter. A mean particle size of pigments in the ink was 122 nm.

<Preparation of Cyan Ink (1)>

| | |
|---|---|
| Cyan pigment dispersion (1) | 10% by mass |
| Ethyleneglycol | 8% by mass |
| Diethyleneglycol | 4% by mass |
| Glycerin | 5% by mass |
| 2-Pyrrolidone | 2% by mass |
| Surfactant (Surfynol 465 supplied from Nisshin Chemical Industry Co., Ltd.) | the following required quantity |
| Ion-exchange water | residual quantity |

The surfactant was added such that the surface tension was 38 mN/m and a quantity was adjusted with ion-exchange water such that a total quantity was 100% by mass. A cyan ink (1) was prepared by mixing the above compositions, stirring and filtrating with a 1 μm filter. A mean particle size of pigments in the ink was 88 nm.

<Preparation of Black Ink (1)>

| | |
|---|---|
| Black pigment dispersion (1) | 10% by mass |
| Glycerin | 5% by mass |
| Ethyleneglycol | 7% by mass |
| 2-Pyrrolidone | 2% by mass |
| Surfactant (Surfynol 465 supplied from Nisshin Chemical Industry Co., Ltd.) | the following required quantity |
| Ion-exchange water | residual quantity |

The surfactant was added such that the surface tension was 38 mN/m and a quantity was adjusted with ion-exchange water such that a total quantity was 100% by mass. A black ink (1) was prepared by mixing the above compositions, stirring and filtrating with a 1 μm filter. A mean particle size of pigments in the ink was 93 nm.

[Preparation of Ink Set (2)]

An ink set (2) was prepared as the above preparation of the ink set (1), except that the polymeric dispersants (SA-1, SA-2) used for the preparation of the respective pigment dispersions were changed to SA-4 (acryl type random polymerization polymeric dispersant: Joncryl 61 supplied from Johnson Polymer Corporation).

[Preparation of Ink Set (3)]

An ink set (3) was prepared as the above preparation of the ink set (1), except that the polymeric dispersants (SA-1, SA-2) used for the preparation of the respective pigment dispersions were changed to SA-5 (polyvinyl alcohol: PVA210 supplied from Kuraray Co., Ltd.) and the addition amount was made two times.

[Preparation of Ink Set (4)]

An ink set (4) was prepared as the above preparation of the ink set (1), except that the polymeric dispersants (SA-1, SA-2) used for the preparation of the respective pigment dispersions were changed to SA-6 (sodium naphthalene sulfonate).

[Preparation of Ink Sets (5) to (8)]

Ink sets (5) to (8) were prepared as the above preparation of the ink set (1), except that the surface tension of the respective color inks was made 28 mN/m, 32 mN/m, 48 mN/m, and 55 mN/m, respectively by appropriately conditioning the addition amounts of the polymeric dispersants used for the preparation of the respective pigment dispersions and the surfactant used for the preparation of the ink.

[Preparation of Ink Set (9)]

An ink set (9) was prepared as the above preparation of the ink set (1), except that the cyan ink (1) was changed to the cyan ink (2) prepared of the following procedure.

(Preparation of Pigment Dispersion)

<Preparation of Cyan Pigment Dispersion 2>

| | |
|---|---|
| C.I. Pigment Blue 15:3 | 26 g |
| SA-3 solution | 28 g |
| Aqueous solution of potassium hydroxide at 1 mol/L | 13.6 g |
| Methylethylketone | 20 g |
| Ion-exchange water | 30 g |

The above additives were mixed and kneaded 20 times using a three roll mill. The obtained paste was added into ion-exchange water (200 g), stirred thoroughly, and subsequently methylethylketone and water were distilled off using a rotary evaporator such that the solid content was 20% to yield a cyan pigment dispersion (2).

The above additives were mixed and dispersed using a horizontal type bead mill (System Zeta mill supplied from Ashizawa Finetech Ltd.) in which zirconia beads of 0.3 mm were filled at a volume rate of 60% to yield a cyan pigment dispersion (1). A mean particle size of the obtained cyan pigments was 87 nm.

<Preparation of Cyan Ink (2)>

| | |
|---|---|
| Cyan pigment dispersion (2) | 10% by mass |
| Ethyleneglycol | 8% by mass |
| Diethyleneglycol | 6% by mass |
| Glycerin | 4% by mass |
| 2-Pyrrolidone | 3% by mass |
| Surfactant (Surfynol 465 supplied from Nisshin Chemical Industry Co., Ltd.) | the following required quantity |
| Ion-exchange water | residual quantity |

The surfactant was added such that the surface tension was 38 mN/m and a quantity was adjusted with ion-exchange water such that a total quantity was 100% by mass. A cyan ink (2) was prepared by mixing the above compositions, stirring and filtrating with a 1 μm filter. A mean particle size of pigments in the ink was 98 nm.

[Preparation of Ink Set (10)]

An ink set (10) composed of a yellow ink (2), a magenta ink (2), a cyan ink (3) and a black ink (2) prepared according to the following procedures was prepared in the above preparation of the ink set (1).

(Preparation of Pigment Dispersion)

<Preparation of Yellow Pigment Dispersion (2)>

A yellow dispersion (2) was prepared as was the case with the preparation of the yellow dispersion (1), except that the yellow pigment was changed from C.I. Pigment Yellow 74 to C.I. Pigment Yellow 128.

<Preparation of Yellow Pigment Ink (2)>

| | |
|---|---|
| Yellow pigment dispersion (2) | 15% by mass |
| Ethyleneglycol | 4% by mass |
| Glycerin | 3.75% by mass |
| 2-Pyrrolidone | 5% by mass |
| Example compound 46 | 5% by mass |
| Surfactant (Surfynol 465 supplied from Nisshin Chemical Industry Co., Ltd.) | the following required quantity |
| Ion-exchange water | residual quantity |

The surfactant was added such that the surface tension was 37 mN/m and a quantity was adjusted with ion-exchange water such that a total quantity was 100% by mass. A yellow ink (2) which was a pigment ink was prepared by mixing the above compositions, stirring and filtrating with a 1 μm filter. A mean particle size of pigments in the ink was 122 nm.

<Preparation of Magenta Ink (2)>

| | |
|---|---|
| Magenta pigment dispersion (1) | 15% by mass |
| Glycerin | 8% by mass |
| 1,2,6-Hexanetriol | 1.75% by mass |
| 2-Pyrrolidone | 3% by mass |
| Example compound 46 | 5% by mass |
| Surfactant (Surfynol 465 supplied from Nisshin Chemical Industry Co., Ltd.) | the following required quantity |
| Ion-exchange water | residual quantity |

The surfactant was added such that the surface tension was 37 mN/m and a quantity was adjusted with ion-exchange water such that a total quantity was 100% by mass. A magenta ink (2) which was a pigment ink was prepared by mixing the above compositions, stirring and filtrating with a 1 μm filter. A mean particle size of pigments in the ink was 122 nm.

<Preparation of Cyan Ink (3)>

| | |
|---|---|
| Cyan pigment dispersion (1) | 10% by mass |
| Ethyleneglycol | 8% by mass |
| Diethyleneglycol | 4% by mass |
| Glycerin | 5% by mass |
| 2-Pyrrolidone | 2% by mass |
| Example compound 46 | 5% by mass |

-continued

| | |
|---|---|
| Surfactant (Surfynol 465 supplied from Nisshin Chemical Industry Co., Ltd.) | the following required quantity |
| Ion-exchange water | residual quantity |

The surfactant was added such that the surface tension was 37 mN/m and a quantity was adjusted with ion-exchange water such that a total quantity was 100% by mass. A cyan ink (3) which was a pigment ink was prepared by mixing the above compositions, stirring and filtrating with a 1 μm filter. A mean particle size of pigments in the ink was 88 nm.

<Preparation of Black Ink (2)>

| | |
|---|---|
| Black pigment dispersion (1) | 10% by mass |
| Glycerin | 5% by mass |
| Ethyleneglycol | 7% by mass |
| 2-Pyrrolidone | 2% by mass |
| Example compound 46 | 5% by mass |
| Surfactant (Surfynol 465 supplied from Nisshin Chemical Industry Co., Ltd.) | the following required quantity |
| Ion-exchange water | residual quantity |

The surfactant was added such that the surface tension was 37 mN/m and a quantity was adjusted with ion-exchange water such that a total quantity was 100% by mass. A black ink (2) which was a pigment ink was prepared by mixing the above compositions, stirring and filtrating with a 1 μm filter. A mean particle size of pigments in the ink was 93 nm.

[Preparation of Ink Set (11)]

(Preparation of Pigment Dispersion)

<Preparation of Yellow Pigment Dispersion (2)>

Anthranilic acid (1.5 g) was added to 10 g of a hydrochloric acid solution (6 mol/L), subsequently cooled to 5° C., 1.8 g of sodium nitrite was added, and stirred. Powder of C.I. Pigment Yellow 74 (5 g) was added thereto, a liquid temperature was raised to 80° C. with stirring, heating was continued until production of nitrogen gas stopped, and cooled. Then, acetone was added, and a yellow dispersion (2) was yielded by filtrating pigment particles, washing with ion-exchange water, subsequently adding ion-exchange water, performing respective operations of ion exchange, ultrafiltration and centrifugation and adjusting with ion-exchange water such that a pigment content was 20% by mass.

<Preparation of Magenta Pigment Dispersion (2)>

Anthranilic acid (1.5 g) was added to 10 g of a hydrochloric acid solution (6 mol/L), subsequently cooled to 5° C., 1.8 g of sodium nitrite was added, and stirred. Powder of C.I. Pigment Red 122 (5 g) (PV East Pink EB-trans, Clariant GmbH) was added thereto, a liquid temperature was raised to 80° C. with stirring, heating was continued until production of nitrogen gas stopped, and cooled. Then, acetone was added, and a magenta dispersion (2) was yielded by filtrating pigment particles, washing with ion-exchange water, subsequently adding ion-exchange water, performing respective operations of ion exchange, ultrafiltration and centrifugation and adjusting with ion-exchange water such that a pigment content was 25% by mass.

<Preparation of Cyan Pigment Dispersion (3)>

Anthranilic acid (1.5 g) was added to 10 g of a hydrochloric acid solution (6 mol/L), subsequently cooled to 5° C., 1.8 g of sodium nitrite was added, and stirred. Powder of C.I. Pigment Blue 15:3 (5 g) was added thereto, a liquid temperature was raised to 80° C. with stirring, heating was continued until production of nitrogen gas stopped, and cooled. Then, acetone was added, and a cyan dispersion (3) was yielded by filtrating pigment particles, washing with ion-exchange water, subsequently adding ion-exchange water, performing respective operations of ion exchange, ultrafiltration and centrifugation and adjusting with ion-exchange water such that a pigment content was 25% by mass.

<Preparation of Black Pigment Dispersion (2)>

Anthranilic acid (1.5 g) was added to 10 g of a hydrochloric acid solution (6 mol/L), subsequently cooled to 5° C., 1.8 g of sodium nitrite was added, and stirred. Powder of Carbon black (5 g) was added thereto, a liquid temperature was raised to 80° C. with stirring, heating was continued until production of nitrogen gas stopped, and cooled. Then, acetone was added, and a black dispersion (2) was yielded by filtrating pigment particles, washing with ion-exchange water, subsequently adding ion-exchange water, performing respective operations of ion exchange, ultrafiltration and centrifugation and adjusting with ion-exchange water such that a pigment content was 20% by mass.

[Preparation of Pigment Ink Set]

An ink set (11) was prepared as was the case with the above preparation of the ink set (1), except that the yellow pigment dispersion (2), the magenta pigment dispersion (2), the cyan pigment dispersion (3) and the black pigment dispersion (2) in place of the yellow pigment dispersion (1), the magenta pigment dispersion (1), the cyan pigment dispersion (1) and the black pigment dispersion (1).

<<Measurement of Property Values of Recording Media and Inks>>

[Recording Medium: Measurement of Transferred Amount]

The transferred amount at 0.04 sec of absorption time by Bristow method was measured as the following method in each recording medium made above.

As the method of measuring the transferred amount, after leaving the recording medium under an atmosphere at 25° C. and 50% RH for 12 hours or more, the measurement was performed using a Bristow testing machine II type (press mode) which was a liquid dynamic absorbability testing machine supplied from Kumagai Rikikogyo Co., Ltd. The aqueous solution of 2% C.I. Acid Red 52 was used for the measurement and the transferred amount can be obtained by measuring an area stained with magenta on the recording medium after 0.04 sec of absorption time.

[Calculation of Void Rate]

The void rate of each recording medium made above was calculated by calculation from a void capacity obtained from Bristow method and a total volume of the micro-porous layer obtained from a dried film thickness.

[Ink Set: Measurement of Surface Tension]

For the surface tension of the ink which composes the ink set, a surface tension value (mN/m) at an ink temperature of 25° C. was measured by a platinum plate method using a tensiometer (CBVP-Z supplied from Kyowa Interface Science Co., Ltd.)

<<Printing Methods>>

[Printing Method (1)]

Each ink set prepared above was set in an on-demand type inkjet printer with a maximum recording density main scanning 1200×sub scanning 1200 dpi having thermal type heads which arrange two rows with 1 mm distance of nozzle rows and enable to effectively form 256 dots with 1200 dpi pitch by arraying the nozzles in two rows with a shift of 21.2 μm in a sub scanning direction, where a nozzle pore size was 15 μm, a driving frequency was 20 kHz, an amount of an ink droplet was 3 pl, a dot size after jetted on the recording medium was 35 μm, a nozzle number in one row was 128 and a nozzle pitch was 42.3 μm and one-scanning printing was performed without using the thinning-out pattern. Here, dpi referred to represents a dot number per 2.54 cm.

[Printing Method (2)]

Each ink set prepared above was set in an on-demand type inkjet printer with a maximum recording density main scanning 1200×sub scanning 1200 dpi having thermal type heads which arrange two rows with 1 mm distance of nozzle rows and enable to effectively form 256 dots with 1200 dpi pitch by arraying nozzles in two rows with a shift of 21.2 μm in a sub scanning direction where a nozzle pore size was 15 μm, a driving frequency was 20 kHz, an amount of an ink droplet was 3 pl, a dot size after jetted on the recording medium was 35 μm, a nozzle number in one row was 128 and a nozzle pitch was 42.3 μm, and the formation of thinned-out image was performed by four-scanning printing using the regular thinning-out pattern at a printing acceptable rate of 25%. The masks used are shown in FIG. 23.

[Printing Method (3)]

Each ink set prepared above was set in an on-demand type inkjet printer with a maximum recording density main scanning 1200×sub scanning 1200 dpi having thermal type heads which arrange two rows with 1 mm distance of nozzle rows and enable to effectively form 256 dots with 1200 dpi pitch by arraying nozzles in two rows with a shift of 21.2 μm in a sub scanning direction where a nozzle pore size was 15 μm, a driving frequency was 20 kHz, an amount of an ink droplet was 3 pl, a dot size after jetted on the recording medium was 35 μm, a nozzle number in one row was 128 and a nozzle pitch was 42.3 μm, and the formation of thinned-out image was performed by four-scanning printing using the thinning-out pattern without regularity at a printing acceptable rate of 25%. The masks used are shown in FIG. 18.

[Printing Method (4)]

A printing method (4) was performed as the above printing method (3), except that effectively heads of 2400 dpi were made to make printing resolution of the maximum recording density main scanning 2400×sub scanning 2400 dpi by appropriately changing the nozzle pore size to make the ink droplet (about 0.75 pl) such that the dot size after jetted on the recording medium was 15 μm, making the nozzle pitch of one row 21.2 μm and making the shift between the two rows 10.6 μm.

[Printing Method (5)]

A printing method (5) was performed as the above printing method (3), except that the nozzle pore size was appropriately changed such that the ink droplet amount was about 5 pl which corresponded to the dot size of 40 μm after jetted on the recording medium. The image data were precedently conditioned such that ink adherent amounts on the medium were nearly identical to those in the printing method (3).

[Printing Method (6)]

A printing method (6) was performed as the above printing method (3), except that the nozzle pore size was appropriately changed such that the ink droplet amount was about 14 pl which corresponded to the dot size of 60 μm after jetted on the recording medium. The image data were precedently conditioned such that ink adherent amounts on the medium were nearly identical to those in the printing method (3).

[Printing Method (7)]

A printing method (7) was performed as the above printing method (3), except that the heads were changed to the heads where the nozzle pitch is 15 μm and 256 nozzles were arranged in one row to make the maximum recording density main scanning 850×sub scanning 1690 dpi. The sub scanning resolution corresponded to the head nozzle pitch, and the main scanning resolution was changed depending on this such that other printing method and the ink adherent amounts on the medium were nearly identical to those in the printing method (3).

[Printing Method (8)]

A printing method (8) was performed as the above printing method (3), except changing to the maximum recording density main scanning 1570×sub scanning 920 dpi by changing to the nozzle heads where the nozzle groups where 256 nozzles were arranged in one row with a nozzle pitch of 55 μm were separated by 2 cm, two rows for each color were arranged with a shift of 27.5 μm in the subscanning direction, and 512 nozzles per color were arranged. In this case, the nozzle pitch is 55 μm. The sub scanning resolution corresponded to the dot pitch on the medium, and the main scanning resolution was changed depending on this such that the ink adherent amounts on the medium were nearly identical to those in the printing method (3).

[Printing Method (9)]

A printing method (9) was performed as the above printing method (3), except changing the printing acceptable rate to a repeat of four types of 40%, 40%, 10% and 10% (thus the printing acceptable rate was 40%).

[Printing Method (10)]

A printing method (10) was performed as the above printing method (3), except changing to the maximum recording density main scanning 1200×sub scanning 1200 dpi by changing to the nozzle heads where the nozzle groups where 256 nozzles were arranged in one row with a nozzle pitch of 42.3 μm were separated by 2 cm, two rows for each color were arranged with a shift of 21.2 μm in the subscanning direction, and 512 nozzles per color were arranged. In this case, the nozzle pitch is 42.3 μm.

<<Formation of Inkjet Recording Image>>

Solid image printing of the respective colors was performed by combining the above printing method, the recording medium and the ink set made above as described in TABLE 1A and TABLE 1B to make the images (1) to (31), and the obtained images were evaluated as follows.

TABLE 1A

| IMAGE NUMBER | PRINTING MODE | | | | RECORDING MEDIUM | | INORGANIC FINE PARTICLE | | |
|---|---|---|---|---|---|---|---|---|---|
| | NOZZLE PITCH (μm) | PRINTING DOT SIZE (μm) | PRINTING ACCEPTABLE RATE (%) | | NUMBER | SUPPORT | TYPE | MEAN PARTICLE SIZE (nm) | *2 |
| 1 | 1 | 21.2 | 35 | — | 1 | WATER-ABSORBABLE | SILICA | 35 | 20 |
| 2 | 2 | 21.2 | 35 | 25 | 1 | WATER-ABSORBABLE | SILICA | 35 | 20 |
| 3 | 3 | 21.2 | 35 | 25 | 1 | WATER-ABSORBABLE | SILICA | 35 | 20 |
| 4 | 3 | 21.2 | 35 | 25 | 2 | NON WATER-ABSORBABLE | SILICA | 35 | 8 |
| 5 | 3 | 21.2 | 35 | 25 | 3 | NON WATER-ABSORBABLE | SILICA | 35 | 20 |
| 6 | 3 | 21.2 | 35 | 25 | 4 | WATER-ABSORBABLE | SILICA | 35 | 11 |
| 7 | 3 | 21.2 | 35 | 25 | 5 | WATER-ABSORBABLE | ALUMINA | 30 | 20 |
| 8 | 3 | 21.2 | 35 | 25 | 6 | WATER-ABSORBABLE | SILICA | 15 | 20 |
| 9 | 3 | 21.2 | 35 | 25 | 7 | WATER-ABSORBABLE | SILICA | 20 | 20 |
| 10 | 3 | 21.2 | 35 | 25 | 8 | WATER-ABSORBABLE | SILICA | 80 | 20 |
| 11 | 3 | 21.2 | 35 | 25 | 9 | WATER-ABSORBABLE | SILICA | 120 | 20 |
| 12 | 3 | 21.2 | 35 | 25 | 10 | WATER-ABSORBABLE | SILICA | 35 | 20 |
| 13 | 3 | 21.2 | 35 | 25 | 11 | WATER-ABSORBABLE | SILICA | 35 | 4 |
| 14 | 3 | 21.2 | 35 | 25 | 12 | WATER-ABSORBABLE | SILICA | 35 | 28 |
| 15 | 3 | 21.2 | 35 | 25 | 1 | WATER-ABSORBABLE | SILICA | 35 | 20 |
| 16 | 3 | 21.2 | 35 | 25 | 1 | WATER-ABSORBABLE | SILICA | 35 | 20 |

| IMAGE NUMBER | RECORDING MEDIUM | | INK SET | | | | | |
|---|---|---|---|---|---|---|---|---|
| | HARDENER PRESENCE OR ABSENCE | VOID RATE (%) | NUMBER | PIGMENT DISPERSANT | UREA PRESENCE OR ABSENCE | Y PIGMENT | SURFACE TENSION *3 | REMARKS |
| 1 | PRESENCE | 55 | 1 | SA-1, 2 | ABSENCE | 74 | 38 | COMPARATIVE EXAMPLE |
| 2 | PRESENCE | 55 | 1 | SA-1, 2 | ABSENCE | 74 | 38 | COMPARATIVE EXAMPLE |
| 3 | PRESENCE | 55 | 1 | SA-1, 2 | ABSENCE | 74 | 38 | PRESENT INVENTION |
| 4 | PRESENCE | 55 | 1 | SA-1, 2 | ABSENCE | 74 | 38 | COMPARATIVE EXAMPLE |
| 5 | PRESENCE | 55 | 1 | SA-1, 2 | ABSENCE | 74 | 38 | PRESENT INVENTION |
| 6 | PRESENCE | 35 | 1 | SA-1, 2 | ABSENCE | 74 | 38 | PRESENT INVENTION |
| 7 | PRESENCE | 55 | 1 | SA-1, 2 | ABSENCE | 74 | 38 | PRESENT INVENTION |
| 8 | PRESENCE | 48 | 1 | SA-1, 2 | ABSENCE | 74 | 38 | PRESENT INVENTION |
| 9 | PRESENCE | 51 | 1 | SA-1, 2 | ABSENCE | 74 | 38 | PRESENT INVENTION |
| 10 | PRESENCE | 61 | 1 | SA-1, 2 | ABSENCE | 74 | 38 | PRESENT INVENTION |
| 11 | PRESENCE | 68 | 1 | SA-1, 2 | ABSENCE | 74 | 38 | COMPARATIVE EXAMPLE |
| 12 | ABSENCE | 55 | 1 | SA-1, 2 | ABSENCE | 74 | 38 | PRESENT INVENTION |
| 13 | PRESENCE | 25 | 1 | SA-1, 2 | ABSENCE | 74 | 38 | COMPARATIVE EXAMPLE |
| 14 | PRESENCE | 75 | 1 | SA-1, 2 | ABSENCE | 74 | 38 | PRESENT INVENTION |
| 15 | PRESENCE | 55 | 2 | SA-4 | ABSENCE | 74 | 38 | PRESENT INVENTION |
| 16 | PRESENCE | 55 | 3 | SA-5 | ABSENCE | 74 | 38 | PRESENT INVENTION |

*2: TRANSPORTED AMOUNT(ml/m$^2$)
*3: mN/m

TABLE 1B

| | PRINTING MODE | | | RECORDING MEDIUM | | | INORGANIC FINE PARTICLE | |
|---|---|---|---|---|---|---|---|---|
| IMAGE NUMBER | NOZZLE NUMBER | PITCH (μm) | PRINTING DOT SIZE (μm) | PRINTING ACCEPTABLE RATE (%) | NUMBER | SUPPORT | TYPE | MEAN PARTICLE SIZE(nm) | *2 |

| IMAGE NUMBER | NOZZLE NUMBER | PITCH (μm) | PRINTING DOT SIZE (μm) | PRINTING ACCEPTABLE RATE (%) | NUMBER | SUPPORT | TYPE | MEAN PARTICLE SIZE(nm) | *2 |
|---|---|---|---|---|---|---|---|---|---|
| 17 | 3 | 21.2 | 35 | 25 | 1 | WATER-ABSORBABLE | SILICA | 35 | 20 |
| 18 | 3 | 21.2 | 35 | 25 | 1 | WATER-ABSORBABLE | SILICA | 35 | 20 |
| 19 | 3 | 21.2 | 35 | 25 | 11 | WATER-ABSORBABLE | SILICA | 35 | 20 |
| 20 | 3 | 21.2 | 35 | 25 | 1 | WATER-ABSORBABLE | SILICA | 35 | 20 |
| 21 | 3 | 21.2 | 35 | 25 | 1 | WATER-ABSORBABLE | SILICA | 35 | 20 |
| 22 | 3 | 21.2 | 35 | 25 | 1 | WATER-ABSORBABLE | SILICA | 35 | 20 |
| 23 | 3 | 21.2 | 35 | 25 | 5 | WATER-ABSORBABLE | ALUMINA | 30 | 20 |
| 24 | 3 | 21.2 | 35 | 25 | 1 | WATER-ABSORBABLE | SILICA | 35 | 20 |
| 25 | 4 | 21.2 | 15 | 25 | 1 | WATER-ABSORBABLE | SILICA | 35 | 20 |
| 26 | 5 | 21.2 | 40 | 25 | 1 | WATER-ABSORBABLE | SILICA | 35 | 20 |
| 27 | 6 | 21.2 | 60 | 25 | 1 | WATER-ABSORBABLE | SILICA | 35 | 20 |
| 28 | 7 | 15.0 | 35 | 25 | 1 | WATER-ABSORBABLE | SILICA | 35 | 20 |
| 29 | 8 | 55.0 | 35 | 25 | 1 | WATER-ABSORBABLE | SILICA | 35 | 20 |
| 30 | 9 | 21.2 | 35 | *1 | 1 | WATER-ABSORBABLE | SILICA | 35 | 20 |
| 31 | 10 | 42.3 | 35 | 25 | 1 | WATER-ABSORBABLE | SILICA | 35 | 20 |

| | RECORDING MEDIUM | | INK SET | | | | |
|---|---|---|---|---|---|---|---|
| IMAGE NUMBER | HARDENER PRESENCE OR ABSENCE | VOID RATE (%) | NUMBER | PIGMENT DISPERSANT | UREA PRESENCE OR ABSENCE | Y PIGMENT | SURFACE TENSION *3 | REMARKS |

| IMAGE NUMBER | HARDENER PRESENCE OR ABSENCE | VOID RATE (%) | NUMBER | PIGMENT DISPERSANT | UREA PRESENCE OR ABSENCE | Y PIGMENT | SURFACE TENSION *3 | REMARKS |
|---|---|---|---|---|---|---|---|---|
| 17 | PRESENCE | 55 | 4 | SA-6 | ABSENCE | 74 | 38 | COMPARATIVE EXAMPLE |
| 18 | PRESENCE | 55 | 5 | SA-1, 2 | ABSENCE | 74 | 28 | COMPARATIVE EXAMPLE |
| 19 | PRESENCE | 55 | 6 | SA-1, 2 | ABSENCE | 74 | 32 | PRESENT INVENTION |
| 20 | PRESENCE | 55 | 7 | SA-1, 2 | ABSENCE | 74 | 48 | PRESENT INVENTION |
| 21 | PRESENCE | 55 | 8 | SA-1, 2 | ABSENCE | 74 | 55 | COMPARATIVE EXAMPLE |
| 22 | PRESENCE | 55 | 9 | SA-1-3 | ABSENCE | 74 | 38 | PRESENT INVENTION |
| 23 | PRESENCE | 55 | 10 | SA-1, 2 | PRESENCE | 128 | 37 | PRESENT INVENTION |
| 24 | PRESENCE | 55 | 11 | — | ABSENCE | 74 | 38 | COMPARATIVE EXAMPLE |
| 25 | PRESENCE | 55 | 1 | SA-1, 2 | ABSENCE | 74 | 38 | PRESENT INVENTION |
| 26 | PRESENCE | 55 | 1 | SA-1, 2 | ABSENCE | 74 | 38 | PRESENT INVENTION |
| 27 | PRESENCE | 55 | 1 | SA-1, 2 | ABSENCE | 74 | 38 | PRESENT INVENTION |
| 28 | PRESENCE | 55 | 1 | SA-1, 2 | ABSENCE | 74 | 38 | PRESENT INVENTION |
| 29 | PRESENCE | 55 | 1 | SA-1, 2 | ABSENCE | 74 | 38 | COMPARATIVE EXAMPLE |
| 30 | PRESENCE | 55 | 1 | SA-1, 2 | ABSENCE | 74 | 38 | PRESENT INVENTION |
| 31 | PRESENCE | 55 | 1 | SA-1, 2 | ABSENCE | 74 | 38 | PRESENT INVENTION |

*1: 40, 40, 10, 10(CORRESPONDING TO 40%)
*2: TRANSPORTED AMOUNT(ml/m$^2$)
*3: mN/m

<<Evaluation of Inkjet Recording Images>>

[Evaluation of Bronzing Resistance]

After the black solid image formed above was stored under an atmosphere at 23° C. and relative humidity of 80% for a week, a condition (occurrence of bronzing) of the print image was visually observed and bronzing resistance was evaluated as the following criteria.

A: No occurrence of bronzing
B: Occurrence of slight bronzing but no problem
C: Occurrence of partial bronzing but practically no problem
D: Occurrence of intensive bronzing

[Evaluation of Gloss]

For the solid image face of each color, 60 degree specular glossiness was measured of the method defined in JIS-Z-8741, an average value of each color was obtained, and the gloss was evaluated as the following criteria. A declination glossmeter VGS-10001DP supplied from Nippon Denshoku Industries Co., Ltd. was used for the measurement.

A: 60 Degree specular glossiness is 90 or more
B: 60 Degree specular glossiness is 80 or more and less than 90
C: 60 Degree specular glossiness is 70 or more and less than 80
D: 60 Degree specular glossiness is less than 70.

[Evaluation of Image Quality]

High Definition Color Digital Standard Image Data "N5 Bicycle" (published in December, 1995) published by Japan Standards Association was printed by combining the above (printing method, recording medium and inks), and the image quality of the obtained image was evaluated as the following criteria.

A: Image at extremely high definition with no occurrence of color turbidity

B: Image at high definition with occurrence of slight color turbidity

C: Image with occurrence of moderate color turbidity which moderately lacks definition D: Image with occurrence of clear color turbidity which lacks definition

[Evaluation of Scratch/Abrasion Resistance]

For the cyan solid image made above, back and forth abrasion was performed 10 times on the surface with an office eraser (MONO supplied from Tombow Pencil Co., Ltd.), and the presence or absence of occurrence of stain on the printed portion was visually determined.

A: No stain on the printed portion is observed
B: Slight stain on the printed portion is observed
C: Stain on the printed portion is clearly observed
D: Density reduction is clearly observed on the printed portion

[Evaluation of Image Uniformity]

The presence or absence of occurrence of uneven density on the solid image of each color made above was visually observed, and the image uniformity was evaluated as the following criteria.

A: Image with high uniformity and no occurrence of uneven density for solid images of all colors B: Nearly uniform image with uneven density for one of solid images C: Image with slight lack of uniformity and uneven density for one of solid images, but practically no problem D: Image with no uniformity and uneven density for two or more of solid images

[Evaluation of Printing Efficiency]

The printing efficiency (time required for printing) was evaluated by making the printing efficiency of 100 or more A, that of 90 to less than 100 B, and that of less than 90 C, when the printing efficiency of the combination used for the manufacture of the image (3) was made 100.

The results obtained above are shown in TABLE 2.

TABLE 2

| IMAGE NUMBER | PRINTING MODE NUMBER | RECORDING MEDIUM NUMBER | INK SET NUMBER | RESULTS OF RESPECTIVE EVALUATIONS ||||
|---|---|---|---|---|---|---|
| | | | | BRONZING RESISTANCE | 60 RELATIVE-SPECULAR GLOSSINESS | IMAGE QUALITY |
| 1 | 1 | 1 | 1 | D | D | D |
| 2 | 2 | 1 | 1 | B | C | D |
| 3 | 3 | 1 | 1 | B | B | A |
| 4 | 3 | 2 | 1 | C | C | D |
| 5 | 3 | 3 | 1 | B | B | C |
| 6 | 3 | 4 | 1 | B | B | C |
| 7 | 3 | 5 | 1 | B | A | A |
| 8 | 3 | 6 | 1 | B | B | C |
| 9 | 3 | 7 | 1 | B | B | B |
| 10 | 3 | 8 | 1 | B | C | B |
| 11 | 3 | 9 | 1 | D | D | D |
| 12 | 3 | 10 | 1 | B | C | C |
| 13 | 3 | 11 | 1 | C | C | D |
| 14 | 3 | 12 | 1 | C | C | B |
| 15 | 3 | 1 | 2 | B | B | B |
| 16 | 3 | 1 | 3 | B | C | C |
| 17 | 3 | 1 | 4 | D | D | C |
| 18 | 3 | 1 | 5 | D | D | B |
| 19 | 3 | 1 | 6 | C | B | B |
| 20 | 3 | 1 | 7 | B | B | C |
| 21 | 3 | 1 | 8 | C | C | D |
| 22 | 3 | 1 | 9 | B | B | A |
| 23 | 3 | 5 | 10 | A | A | A |
| 24 | 3 | 1 | 11 | D | D | C |
| 25 | 4 | 1 | 1 | B | B | B |
| 26 | 5 | 1 | 1 | B | B | A |
| 27 | 6 | 1 | 1 | C | C | B |
| 28 | 7 | 1 | 1 | B | B | B |
| 29 | 8 | 1 | 1 | D | D | C |
| 30 | 9 | 1 | 1 | B | B | B |
| 31 | 10 | 1 | 1 | C | C | B |

TABLE 2-continued

RESULTS OF RESPECTIVE EVALUATIONS

| IMAGE NUMBER | SCRATCH/ ABRASION RESISTANCE | IMAGE UNIFORMITY | PRINTING EFFICIENCY | REMARKS |
|---|---|---|---|---|
| 1 | D | D | A | COMPARATIVE EXAMPLE |
| 2 | C | D | B | COMPARATIVE EXAMPLE |
| 3 | B | A | B | PRESENT INVENTION |
| 4 | C | D | B | COMPARATIVE EXAMPLE |
| 5 | B | C | B | PRESENT INVENTION |
| 6 | B | C | B | PRESENT INVENTION |
| 7 | B | A | B | PRESENT INVENTION |
| 8 | B | C | B | PRESENT INVENTION |
| 9 | B | C | B | PRESENT INVENTION |
| 10 | B | B | B | PRESENT INVENTION |
| 11 | B | C | B | COMPARATIVE EXAMPLE |
| 12 | C | C | B | PRESENT INVENTION |
| 13 | D | D | B | COMPARATIVE EXAMPLE |
| 14 | C | B | B | PRESENT INVENTION |
| 15 | C | B | B | PRESENT INVENTION |
| 16 | C | B | B | PRESENT INVENTION |
| 17 | D | C | B | COMPARATIVE EXAMPLE |
| 18 | D | B | B | COMPARATIVE EXAMPLE |
| 19 | B | B | B | PRESENT INVENTION |
| 20 | B | C | B | PRESENT INVENTION |
| 21 | C | D | B | COMPARATIVE EXAMPLE |
| 22 | B | A | B | PRESENT INVENTION |
| 23 | A | A | B | PRESENT INVENTION |
| 24 | D | C | B | COMPARATIVE EXAMPLE |
| 25 | B | C | B | PRESENT INVENTION |
| 26 | B | B | B | PRESENT INVENTION |
| 27 | C | C | B | PRESENT INVENTION |
| 28 | B | B | C | PRESENT INVENTION |
| 29 | D | C | B | COMPARATIVE EXAMPLE |
| 30 | B | C | B | PRESENT INVENTION |
| 31 | B | B | B | PRESENT INVENTION |

As is obvious from the results in TABLE 2, it is shown that the good printing efficiency is obtained, the obtained images are excellent in bronzing resistance, gloss, scratch/abrasion resistance and image uniformity, and the images at high definition are obtained in the inkjet recording method comprising the combination of the recording heads, inks and the recording medium defined in the invention compared to Comparative Examples.

By the inkjet recording method or the inkjet recording apparatus of the present embodiment, it is possible to obtain an image at high definition with less color turbidity where bronzing resistance, gloss and scratch/abrasion resistance are improved even when a color image is formed by printing pigment inks on a recording medium where an absorption speed is relatively fast of an thinning-out pattern without regularity.

What is claimed is:

1. An inkjet recording method comprising the step of:
forming a color image with respective inks of at least cyan, magenta, yellow and black on a recording medium by while scanning a recording head multiple times on a same recording area of the recording medium, forming a thinned out image according to a thinning-out pattern without regularity in each scanning, the recording head having a plurality of nozzle sections for jetting inks,
wherein a nozzle pitch of the recording head is 10 to 50 µm,
the respective inks contain pigments, at least one organic solvent with high boiling point and water,
a surface tension of the respective inks as from 30 to 50 mN/m,
the pigments are dispersed by a polymeric dispersant,
in the recording medium, a transferred amount at 0.04 sec of time by Bristow method is 10ml/m$^2$ or more,
the recording medium has a micro-porous layer containing inorganic fine particles with a mean particle size of 15 to 100 nm and a hydrophilic binder,
a printing acceptable rate of the thinning-out pattern is from 15 to 35%, and
dot sizes formed by the ink jetted from the recording head are from 10 to 50µm on the recording medium.

2. The method of claim 1, wherein in the recording medium, the microporous layer is provided on an absorbable support.

3. The method of claim 1, wherein the hydrophilic binder is polyvinyl alcohol or a derivative thereof.

4. The method of claim 1, wherein the hydrophilic binder is hardened.

5. The method of claim 1, wherein a void rate of the microporous layer is from 30 to 70%.

6. The method of claim 1, wherein the inorganic fine particle contains silica or alumina.

7. The method of claim 1, wherein a mean particle size of the inorganic fine particles is from 20 to 80 nm.

8. The method of claim 1, wherein at least one of the respective inks contains a compound represented by the following general formula (I), where a molecular weight is 200 or less

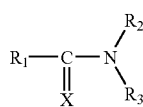

General formula (I)

wherein $R_1$ to $R_3$ are individually selected from the group consisting of a hydrogen atom, a substituted or unsubstituted alkyl, alkenyl, aryl, acyl, heteroaryl, heterocyclic group, $NR_4R_5$ and $OR_6$; $R_4$ to $R_6$ are individually selected from the group consisting of a hydrogen atom, a substituted or unsubstituted alkyl, alkenyl, aryl, acyl, heteroaryl, heterocyclic group, $NR_4R_5$ and $OR_6$;

$R_1$ and $R_2$, or $R_1$ and $R_3$ may be bound to one another to form a ring; and X represents an oxygen atom or NH.

9. The method of claim 8, wherein the compound represented by the general formula (I) is urea or a urea derivative.

10. The method of claim 1, wherein the polymeric dispersant is an acryl type polymeric dispersant.

11. An inkjet recording apparatus for forming a color image on a recording medium by jetting respective inks of at least cyan, magenta, yellow and black on a recording medium comprising:

a recording head in which a plurality of nozzle sections for jetting the inks are arrayed at a pitch of 10 to 50 μm;

a scanning section to make the recording head scan multiple times on a same recording area of the recording medium; and a control section to jet the inks from the plurality of nozzle sections such that a thinned-out image according to the thinning-out pattern without regularity in each scanning is formed on the recording medium, wherein the respective inks contain pigments, at least one organic solvent with high boiling point and water, a surface tension of the respective inks is from 30 to 50 mN/m, the pigments are dispersed by a polymeric dispersant, in the recording medium, a transferred amount at 0.04 sec of time by Bristow method is 10 ml/m² or more, the recording medium has a micro-porous layer containing inorganic fine particles with a mean particle size of 15 to 100 nm and a hydrophilic binder, a printing acceptable rate of the thinning-out pattern is from 15 to 35%, and dot sizes formed by the ink jetted from the recording head are from 10 to 50 μm on the recording medium.

12. The apparatus of claim 11, wherein in the recording medium, the microporous layer is provided on an absorbable support.

13. The apparatus of claim 11, wherein the hydrophilic binder is polyvinyl alcohol or a derivative thereof.

14. The apparatus of claim 11, wherein the hydrophilic binder is hardened.

15. The apparatus of claim 11, wherein a void rate of the micro-porous layer is from 30 to 70%.

16. The apparatus of claim 11, wherein the inorganic fine particle contains silica or alumina.

17. The apparatus of claim 11, wherein a mean particle size of the inorganic fine particles is from 20 to 80 nm.

18. The apparatus of claim 11, wherein at least one of the respective inks contains a compound represented by the following general formula (I), where a molecular weight is 200 or less

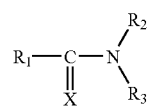

General formula (I)

wherein $R_1$ to $R_3$ are individually selected from the group consisting of a hydrogen atom, a substituted or unsubstituted alkyl, alkenyl, aryl, acyl, heteroaryl, heterocyclic group, $NR_4R_5$ and $OR_6$; $R_4$ to $R_6$ are individually selected from the group consisting of a hydrogen atom, a substituted or unsubstituted alkyl, alkenyl, aryl, acyl, heteroaryl, heterocyclic group, $NR_4R_5$ and $OR_6$;

$R_1$ and $R_2$, or $R_1$ and $R_3$ may be bound to one another to form a ring; and X represents an oxygen atom or NH.

19. The apparatus of claim 18, wherein the compound represented by the general formula (I) is urea or a urea derivative.

20. The apparatus of claim 11, the polymeric dispersant is an acryl type polymeric dispersant.

21. An inkjet recording apparatus for forming a color image on a recording medium by jetting respective inks of at least cyan, magenta, yellow and black on a recording medium comprising:

a recording means in which a plurality of nozzle sections for jetting the inks are arrayed at a pitch of 10 to 50 μm;

a scanning means for making the recording means scan multiple times on a same recording area of the recording medium; and a control means for jetting the inks from the plurality of nozzle sections such that a thinned out image according to the thinning-out pattern without regularity in each scanning is formed on the recording medium, wherein the respective inks contain pigments, an organic solvent with high boiling point and water, a surface tension of the respective inks is from 30 to 50 mN/m, the pigments are dispersed by a polymeric dispersant, in the recording medium, a transferred amount at 0.04 sec of time by Bristow method is 10 ml/m² or more, and the recording medium has a micro-porous layer containing inorganic fine particles with a mean particle size 15 to 100 μm and a hydrophilic binder, a printing acceptable rate of the thinning-out pattern is from 15 to 35%, and dot size formed by the ink jetted from the recording head are from 10 to 50 μm on the recording medium.

22. The apparatus of claim 21, wherein in the recording medium, the mIcroporous layer is provided on an absorbable support.

23. The apparatus of claim 21, wherein the hydrophilic binder is polyvinyl alcohol or a derivative thereof.

24. The apparatus of claim 21, wherein the hydrophilic binder is hardened.

25. The apparatus of claim 21, wherein a void rate of the microporous layer is from 30 to 70%.

26. The apparatus of claim 21, wherein the inorganic fine particle contains silica or alumina.

27. The apparatus of claim 21, wherein a mean particle size of the inorganic fine particles is from 20 to 80 nm.

28. The apparatus of claim 21, wherein at least one of the respective inks contains a compound represented by the following general formula (I), where a molecular weight is 200 or less

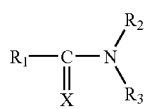

General formula (I)

wherein $R_1$ to $R_3$ are individually selected from the group consisting of a hydrogen atom, a substituted or unsubstituted alkyl, alkenyl, aryl, acyl, heteroaryl, heterocyclic group, $NR_4R_5$ and $OR_6$; $R_4$ to $R_6$ are individually selected from the group consisting of a hydrogen atom, a substituted or unsubstituted alkyl, alkenyl, aryl, acyl, heteroaryl, heterocyclic group, $NR_4R_5$ and $OR_6$;

$R_1$ and $R_2$, or $R_1$ and $R_3$ may be bound to one another to form a ring; and X represents an oxygen atom or NH.

29. The apparatus of claim 28, wherein the compound represented by the general formula (I) is urea or a urea derivative.

30. The apparatus of claim 21, the polymeric dispersant is an acryl type polymeric dispersant.

* * * * *